US006587885B1

(12) United States Patent
Nakayama et al.

(10) Patent No.: US 6,587,885 B1
(45) Date of Patent: *Jul. 1, 2003

(54) FIXED LENGTH CELL HANDLING TYPE IMAGE COMMUNICATION METHOD AS WELL AS TRANSMISSION APPARATUS FOR FIXED LENGTH CELL HANDLING TYPE IMAGE COMMUNICATION AND RECEPTION APPARATUS FOR FIXED LENGTH CELL HANDLING TYPE IMAGE COMMUNICATION

(75) Inventors: Mikio Nakayama, Kawasaki (JP);
Miyuki Kawataka, Kawasaki (JP);
Naoya Matsumura, Tachikawa (JP);
Takayuki Takeda, Tachikawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,244

(22) Filed: Oct. 9, 1996

(30) Foreign Application Priority Data

Oct. 9, 1995 (JP) .............................. 7-261903
Apr. 9, 1996 (JP) .............................. 8-86941

(51) Int. Cl.⁷ .............................................. G06F 15/16
(52) U.S. Cl. ...................................... 709/236; 709/247
(58) Field of Search .............................. 348/405, 420, 348/423; 395/200.06, 200.77, 501, 555, 556; 358/426, 135; 386/111; 709/236, 247; 713/400, 500, 501

(56) References Cited

U.S. PATENT DOCUMENTS 5,040,060 A * 8/1991 Owada et al. ............... 358/135
5,510,903 A * 4/1996 Matsumura .................. 358/335
5,555,261 A * 9/1996 Nakayama et al. .......... 370/103
5,565,992 A * 10/1996 Enari ........................ 358/261.3
5,657,399 A * 8/1997 Iwabuchi et al. ........... 382/248

(List continued on next page.)

FOREIGN PATENT DOCUMENTS

EP         0 562 221       9/1993
EP         0 599 258       6/1994
WO         WO 94/01824     1/1994

OTHER PUBLICATIONS

A QoS Selector for Multimedia Applications on ATM Networks. Publication Date: May 1, 1994.

*Primary Examiner*—Glenton B. Burgess
*Assistant Examiner*—Tod Kupstas
(74) *Attorney, Agent, or Firm*—Katten Muchin Zavis Rosenman

(57) ABSTRACT

The invention provides a fixed length cell handling image communication method wherein moving picture data are compressed to data having a fixed transmission rate using a compression method for still pictures and then converted into fixed length cells so that image processing such as compression/decompression of the moving picture data can be performed at a high rate while keeping a high compression ratio and a high picture quality. A transmission apparatus for use with the method includes an image data compression section for performing still picture compression processing for moving picture data, which define information of a plurality of screens individually divided into a plurality of fields to be successively transmitted per unit time, in response to field timing information representative of a compression timing of each field to convert the moving picture data into variable length data which are independent of each other, a transmission buffer section for converting the variable length data into fixed length data having a fixed transmission rate, and a fixed length cell transmission section for placing the fixed length data and the field timing information into data parts of fixed length cells and transmitting the fixed length cells.

58 Claims, 66 Drawing Sheets

U.S. PATENT DOCUMENTS 5,717,705 A * 2/1998 Shikakura et al. .......... 382/232
5,801,841 A * 9/1998 Suzuki ....................... 358/433
5,821,885 A * 10/1998 Wise et al. ................... 341/67
5,832,128 A * 11/1998 Suzuki ....................... 382/246

* cited by examiner

FIG. 7(a)  HS
FIG. 7(b)  VS
FIG. 7(c)  NTSCALM

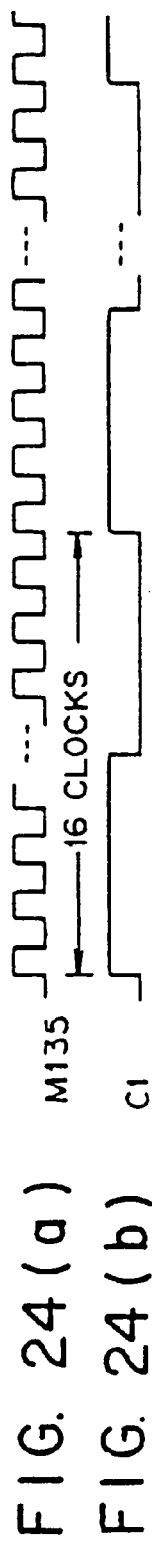
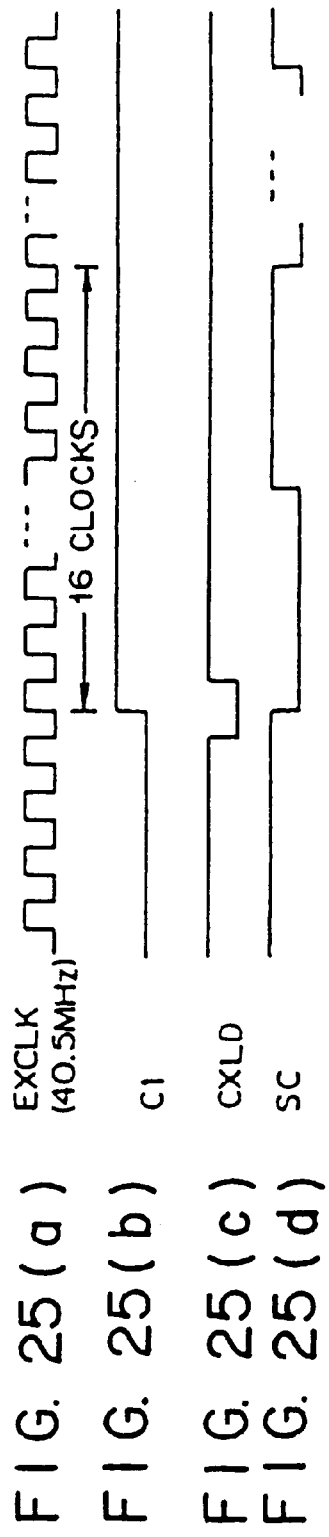

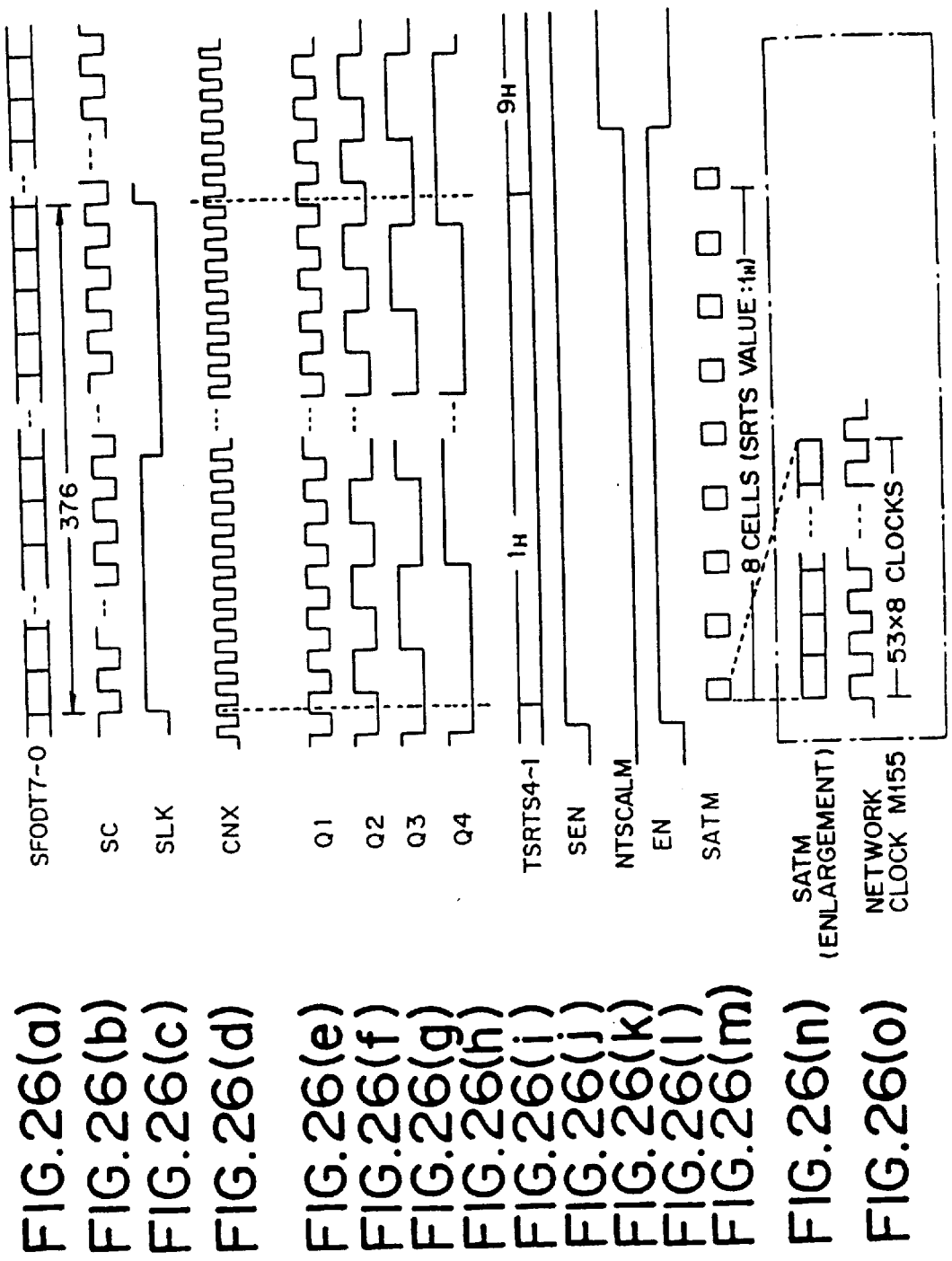

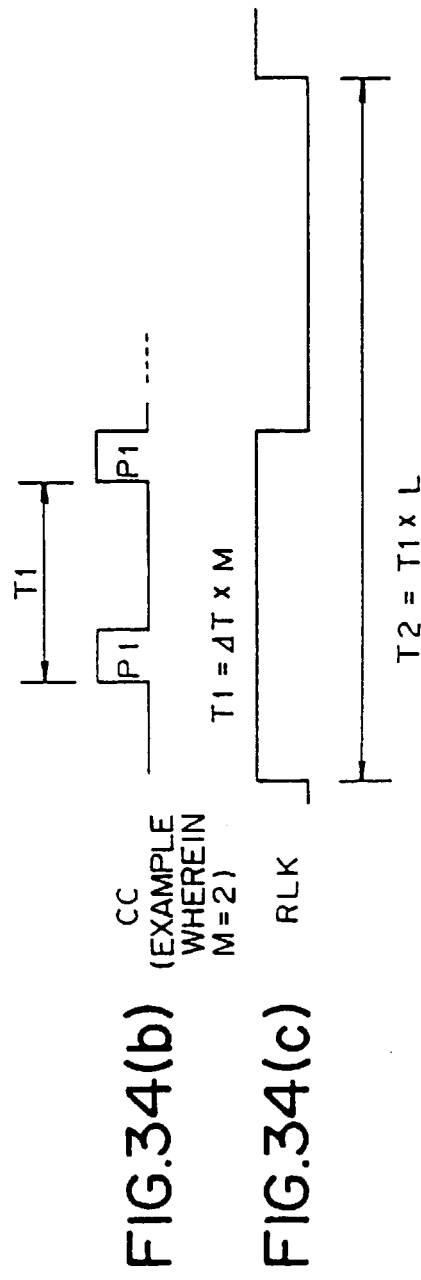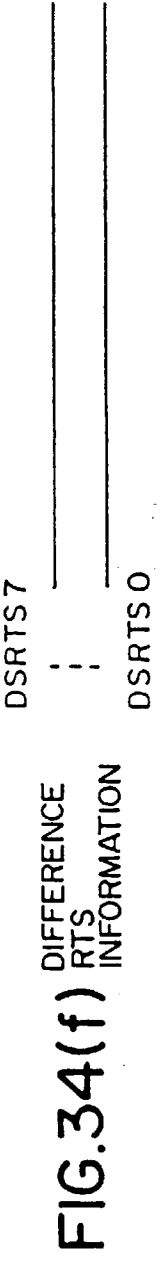

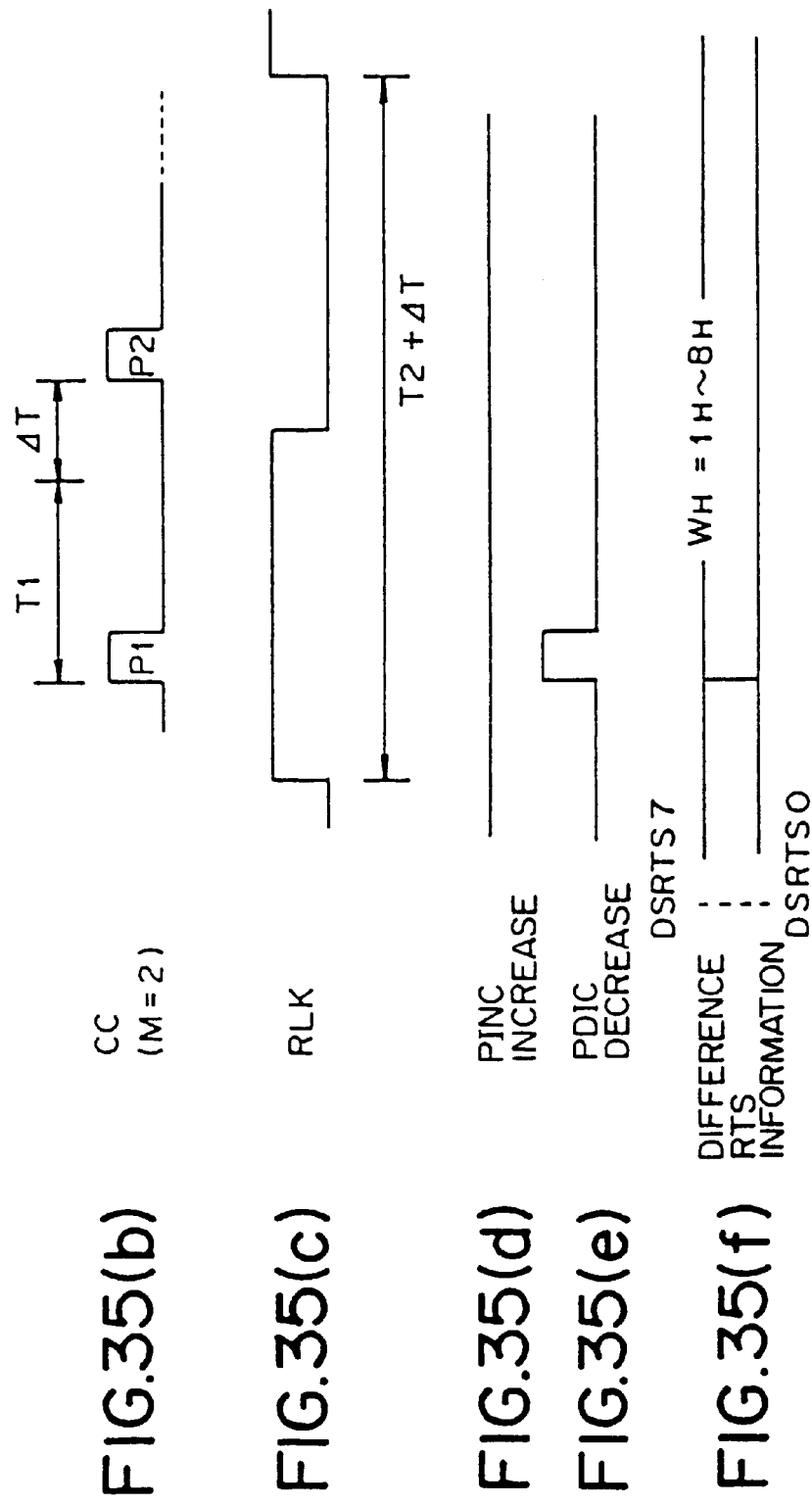

FIG.36(a) EXCLK

FIG.36(b) C (EXAMPLE WHEREIN M=2) RCK

FIG.36(d) PINC INCREASE

FIG.36(e) PDIC DECREASE

FIG.36(f) DIFFERENCE RTS INFORMATION

WHEN NO INCREASE/DECREASE INSTRUCTION IS RECEIVED

WHEN INCREASE INSTRUCTION IS RECEIVED
FIG.37(a) EXCLK 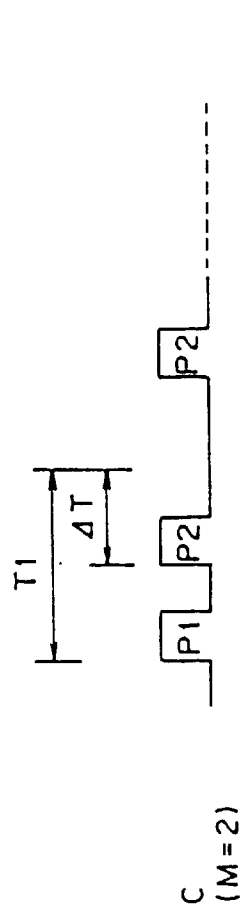
FIG.37(b) C (M=2) 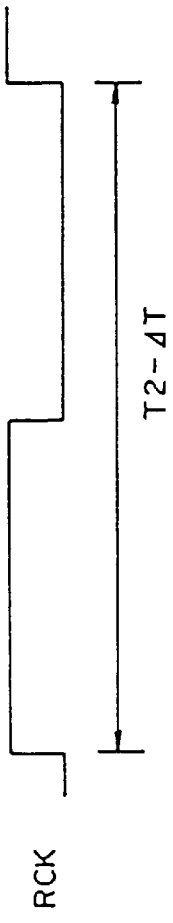
FIG.37(c) RCK 
FIG.37(d) PINC INCREASE 
FIG.37(e) PDIC DECREASE
FIG.37(f) DSRTS 7 DIFFERENCE RTS INFORMATION DSRTS 0 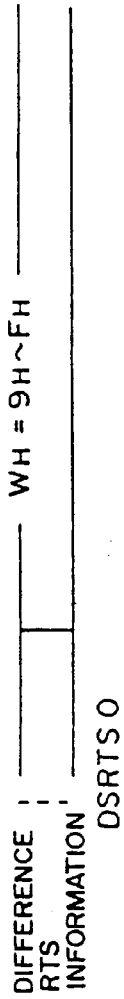
WH = 9H~FH FIG.44(a) RHSYN
FIG.44(b) RVSYN
FIG.44(c) RARDT
FIG.44(d) NTSCOUT
FIG.44(e) OXEA Source Image Samples : $S_{yx}$

STANDARD QUANTIZATION TABLE qvu — 118'

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG.64
PRIOR ART
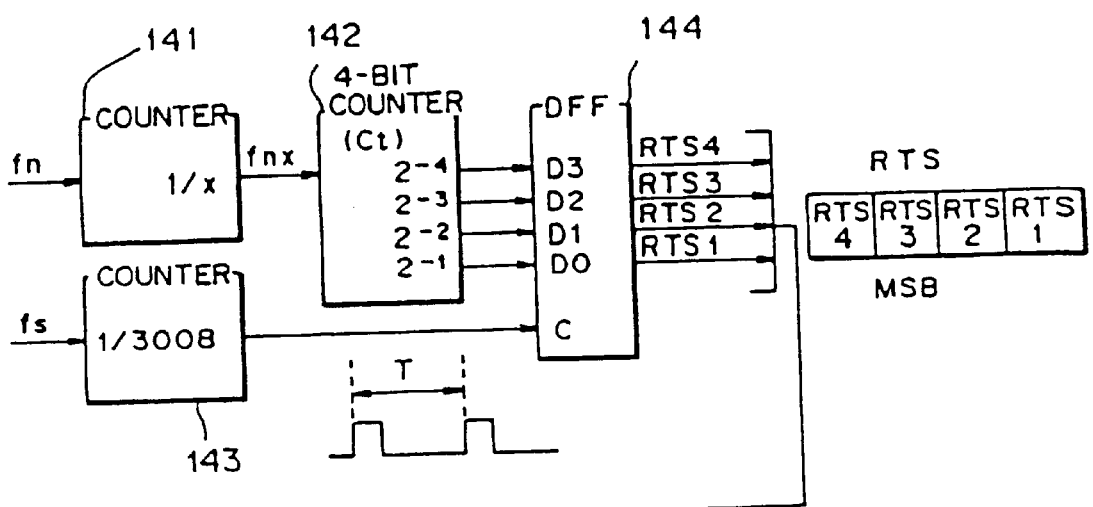
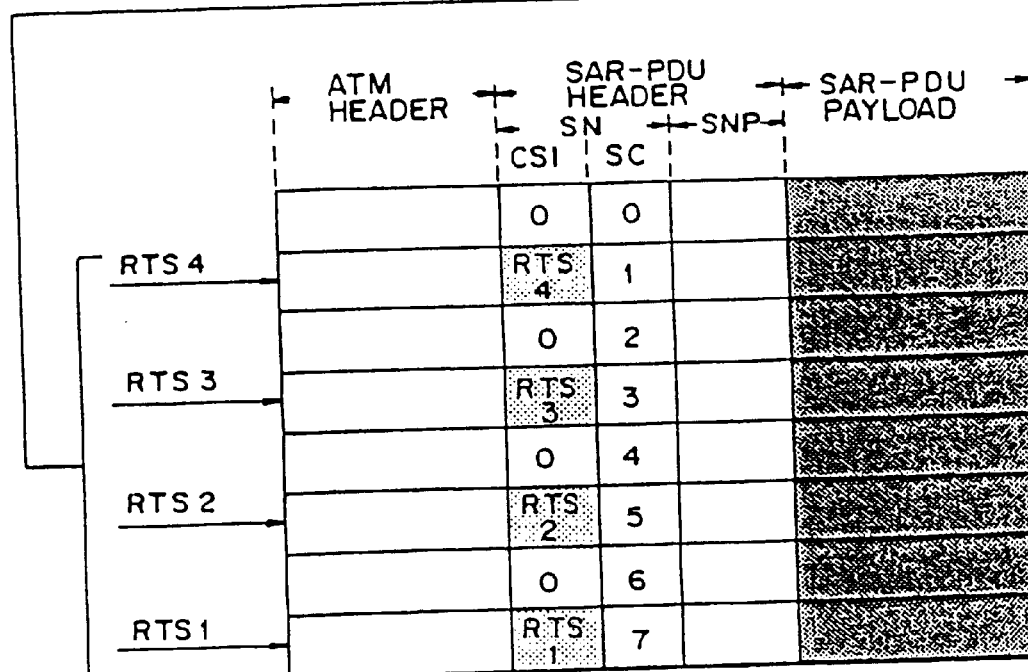

FIG.66(a) NTSC SIGNAL
PRIOR ART

FIG.66(b) HORIZONTAL SYNCHRONIZING HSYN
PRIOR ART

FIG.66(c) VSYN VERTICAL SYNCHRONIZING
PRIOR ART

FIXED LENGTH CELL HANDLING TYPE IMAGE COMMUNICATION METHOD AS WELL AS TRANSMISSION APPARATUS FOR FIXED LENGTH CELL HANDLING TYPE IMAGE COMMUNICATION AND RECEPTION APPARATUS FOR FIXED LENGTH CELL HANDLING TYPE IMAGE COMMUNICATION

BACKGROUND OF THE INVENTION

1. Field of the Invention

This invention relates to a fixed length cell handling type image communication method as well as a transmission apparatus for fixed length cell handling type image communication and a reception apparatus for fixed length cell handling type image communication, and more particularly to a fixed length cell handling type image communication method as well as a transmission apparatus for fixed length cell handling type image communication and a reception apparatus for fixed length cell handling type image communication suitable for use with image communication which makes use of an ATM network which handles a fixed length cell called ATM (Asynchronous Transfer Mode) cell.

2. Description of the Related Art

FIG. 53 shows in block diagram an example of an image communication system which makes use of an ATM network. Referring to FIG. 53, the image communication system shown includes an ATM exchange 101, a plurality of (two in FIG. 53) ATM image communication apparatus 102, a plurality of (two in FIG. 53) cameras 104 for image communication, and a plurality of (two in FIG. 53) television sets 105.

The cameras 104 and the television sets 105 are normally connected to the respective ATM image communication apparatus 102 and accommodated in the ATM exchange 101 via respective user network interfaces (UNIs) including a plurality of channels. However, they may be accommodated directly in the ATM exchange 101 via an ATM image communication section 1012 in the ATM exchange 101, for example, like a camera 104' and a television set 105'.

In the image communication system constructed in such a manner as described above, an image from each camera 104 (or 104') is first subject to required processing such as image compression, conversion into an ATM cell (fixed length cell) and so forth by a corresponding one of the ATM image communication apparatus 102 (or ATM image communication section 1012) and then sent out as an ATM cell 106 to the ATM exchange 101. Then, an ATM switch section 1011 of the ATM exchange 101 is switched in response to a portion of a frame format of the ATM cell 106 which represents information of a destination of data so that the data are outputted to the desired transfer destination (in this instance, to one of the television sets 105 and 105').

In the following, an image compression process (system), an ATM cell transferring process and so forth of the ATM image communication apparatus 102 or the ATM image communication section 1012 described above will be described in detail.

1. Image Compression Method

1-1. Outline

Generally, a compression method which utilizes a JPEG (Joint Photograph coding Experts Group) algorithm is well known as an image compression method. The JPEG algorithm has been produced as standards for image compression of the international standardization group JPEG.

FIG. 54 shows in block diagram an example of a construction of the ATM image communication apparatus 102 (or ATM image communication section 1012) which utilizes a JPEG system. Referring to FIG. 54, the ATM image communication apparatus 102 shown includes a transmission section 111 and a reception section 112. The transmission section 111 includes an 8×8 blocking section 113, a discrete cosine transform section 114, a quantization section 115, a quantization table 116 and a JPEG coding section 117. The reception section 112 includes a JPEG decoding section 121, a dequantization section 122, a quantization table 123, an inverse discrete cosine transform section 124 and an 8×8 deblocking section 125.

In the transmission section 111, the 8×8 blocking section 113 performs 8×8 blocking of image information for one field, that is, for image information for one screen. The discrete cosine transform section 114 performs discrete cosine transform (DCT) for extracting frequency components representative of characteristics of fineness of an image for each block of image information blocked by the 8×8 blocking section 113. It is to be noted that image information generally includes higher frequencies at portions of finer patterns and includes lower frequencies at portions of rougher patterns.

The quantization section 115 performs quantization for each block, for which discrete cosine transform has been performed by the discrete cosine transform section 114, using the quantization table 116. Upon such quantization, the compression ratio of image data can be adjusted using a parameter called scaling factor SF. The JPEG coding section 117 performs JPEG coding processing by coding each block quantized by the quantization section 115 and outputs compressed data.

Meanwhile, in the reception section 112, the JPEG decoding section 121, dequantization section 122, quantization table 123, inverse discrete cosine transform section 124 and 8×8 deblocking section 125 perform processing reverse to that performed by the JPEG coding section 117, quantization table 116, quantization section 115, discrete cosine transform section 114 and 8×8 blocking section 113 described above, respectively. Consequently, the reception section 112 can regenerate original image data from compressed data transmitted thereto as JPEG coded compressed data as described above.

In the ATM image communication apparatus 102 (or ATM image communication section 1012) having the construction described above, input image data for one field, that is, original image information for one screen, is subject to blocking processing in units of vertical and horizontal 8×8 pixels (8×8 blocking) by the 8×8 blocking section 113. Further, each block obtained by such blocking is subject to discrete cosine transform by the discrete cosine transform section 114 so that frequency components included in the block are extracted.

Thereafter, each block discrete cosine transformed in this manner is quantized by the quantization section 115 using the quantization table 116 so that the image is compressed. The scaling factor SF is adjusted to adjust the compression ratio then. It is to be noted that, where an input image is the same, generally a decrease of the scaling factor SF decreases the compression ratio and increases the amount of image data after compression, but an increase of the scaling factor SF increases the compression ratio and decreases the amount of image data after compression.

Further, when image compression is performed, generally the amount of data after compression is large with an image of a fine pattern, but is small with an image of a rough pattern. Further, where an image is the same, if the compression ratio is raised to decrease the amount of data after compression by means of the scaling factor SF, then the picture quality after decompression (regeneration) is deteriorated, but if the compression ratio is lowered to increase the amount of data after compression, then the picture quality after regeneration is improved.

Then, each block quantized in such a manner as described above is coded by the JPEG coding section 117 and outputted as JPEG compressed image data.

On the other hand, JPEG image data received by the reception section 112 are subject to processing reverse to that of the transmission section 111 by the JPEG decoding section 121, dequantization section 122, quantization table 123, inverse discrete cosine transform section 124 and 8×8 deblocking section 125 so that original image data are regenerated.

It is to be noted that FIG. 55 shows an example of a frame format employed in the JPEG system mentioned above. Referring to FIG. 55, the JPEG frame format shown includes an SOI (Start Of Image marker), a quantization table 118, a compressed image data part 119 and an EOI (End Of Image marker). The SOI is a code indicating the beginning of an image data frame, and a fixed value of, for example, "FFD8" is placed in the code. Meanwhile, the EOI is a code indicating the end of the image data frame, and another fixed value of, for example, "FFD9" is placed in the code.

The quantization table 118 represents data including a scaling factor SF described above which defines a compression ratio and is used as the quantization table 116 or 123 shown in FIG. 54 upon quantization by the quantization section 115 during image compression or upon dequantization by the dequantization section 122 during image decompression. The compressed image data part 119 can include image data for one screen after compression.

1-2. 8×8 Blocking/Deblocking

Subsequently, 8×8 blocking/deblocking by the 8×8 blocking section 113 and the inverse discrete cosine transform section 124 described above will be described in detail.

First, in order to allow quantization processing by the quantization section (DCT-Based Encoder) 115 when an image is inputted, input image data for one field are subject to blocking (8×8 blocking) processing in units of vertical and horizontal 8×8 pixels to form blocks (Block) by the 8×8 blocking section 113, for example, as seen in FIG. 56. On the other hand, upon decoding of an image, since the output of the dequantization section (DCT-Based Decoder) 122 is in units of a block, 8×8 deblocking is performed by the 8×8 deblocking section 125 to regenerate original (source) image data for one field.

It is to be noted that, in this instance, 8×8 pixels of each block (Block$_i$) can individually be represented by $S_{yx}$ as seen, for example, in FIG. 57.

1-3. Discrete Cosine Transform

The discrete cosine transform section 114 performs, for original image data (Source Image Samples) $S_{yx}$ blocked in 8×8 pixels, two-dimensional discrete cosine transform (FDCT: Forward Discrete Cosine Transform) given by the equation (1) given below so that DCT coefficients $S_{VU}$ representative of frequency components included in each block are determined in units of one pixel as seen, for example, in FIG. 58.

$$S_{VU} = \left(\frac{\sqrt{2}}{\sqrt{N}}\right)^2 C_U C_V \sum_{X=0}^{N-1}\sum_{X=0}^{N-1} S_{yx}\cos\left(\frac{(2x+1)U\pi}{2N}\right)\cos\left(\frac{(2x+1)V\pi}{2N}\right) \quad (1)$$

where U', V=0, 1, . . . , N−1, and $C_U$, $C_V$=1√2 (when U, V=0) or $C_U$, $C_V$=1 (when U, V≠0). In this instance, since image data are processed in units of 8×8 blocks, N=8. Accordingly, the equation (1) above is re-written as the following equation (2):

$$S_{VU} = \left(\frac{1}{4}\right) C_U C_V \sum_{X=0}^{7}\sum_{X=0}^{7} S_{yx}\cos\left(\frac{(2x+1)U\pi}{16}\right)\cos\left(\frac{(2x+1)V\pi}{16}\right) \quad (2)$$

On the other hand, the inverse discrete cosine transform section 124 performs inverse DCT transform represented by the equation (3) given below for the output of the dequantization section 122 to determine quantized DCT coefficients $Sq_{VU}$ as seen, for example, in FIG. 59.

$$S_{VU} = \left(\frac{\sqrt{2}}{\sqrt{N}}\right)^2 \sum_{X=0}^{N-1}\sum_{X=0}^{N-1} C_U C_V R_{VU}\cos\left(\frac{(2x+1)U\pi}{2N}\right)\cos\left(\frac{(2x+1)V\pi}{2N}\right) \quad (3)$$

Also in this instance, since image data are processed in units of 8×8 blocks, N=8, and accordingly, the equation (3) above is re-written as the following equation (4):

$$S_{VU} = \left(\frac{1}{4}\right)\sum_{X=0}^{7}\sum_{X=0}^{7} C_U C_V R_{VU}\cos\left(\frac{(2x+1)U\pi}{16}\right)\cos\left(\frac{(2x+1)V\pi}{16}\right) \quad (4)$$

1-4. Quantization

The quantization table 116 (118) used by the quantization section 115 described above is provided for quantization of 64 DCT coefficients $S_{VU}$ which are a result of calculation of FDCT transform for each block by the JPEG coding section 117, and includes quantization step sizes $Q_{VU}$ (Quantization Table) for 64 DCT coefficients $S_{VU}$ set therein as seen, for example, in FIG. 58.

The quantization section 115 thus performs calculation defined by the equation (5) given below based on the DCT coefficients $S_{VU}$ and the quantization step sizes $Q_{VU}$ corresponding to the DCT coefficients $S_{VU}$ to determine quantized DCT coefficients $Sq_{VU}$ representative of a compressed image data amount as seen in FIG. 58.

$$Sq_{VU} = \text{round}(S_{VU}/Q_{VU}) \quad (5)$$

where round( ) represents a function which assumes a value nearest to the value of ( ) (half-adjust).

1-5. Dequantization

On the other hand, the quantization table 123 (118) in the dequantization section 122 is the same as the quantization table 116 (118) of the quantization section 115 on the other party side of image communication. In this instance, based on quantized DCT coefficients (Received Quantized DCT Coefficients) $Sq_{VU}$ received via the JPEG decoding section 121 and the quantization step sizes $Q_{VU}$ corresponding to the quantized DCT coefficients $Sq_{VU}$, calculation defined by the equation (6) given below is performed to obtain dequantized DCT coefficients $R_{VU}$.

$$R_{VU} = Sq_{VU} \times Q_{VU} \quad (6)$$

1-6. Quantization Table

By the way, the quantization step sizes $Q_{VU}$ of the quantization table 118 described above are calculated based on values $q_{VU}$ of, for example, such a standard quantization table 118' as shown in FIG. 60 and a scaling factor SF by calculation defined by the following equation (7):

$$Q_{VU} = 2557\triangledown[\text{round}(q_{VU} \cdot SF)] \qquad (7)$$

where round( ) represents conversion into an integer by half-adjust similarly as in the equation (5), and $2557\triangledown$ [ ] represents a function of rounding an integer higher than 255 to 255. It is to be noted that, since the standard quantization table 118' shown in FIG. 60 presents higher values $q_{VU}$ in the directions of V and U, upon quantization, comparatively high frequencies included in each block (image portions having comparatively fine patterns) are liable to be rounded.

Then, the values $Q_{VU}$ of the quantization table 118 calculated using the equation (7) given above are outputted as data for the quantization table 118 of the JPEG frame format described hereinabove with reference to FIG. 55.

In order to obtain a good picture quality, the scaling factor SF mentioned above should normally be set to a value approximately equal to 1, and where the scaling factor SF is lower than 1, the picture quality is improved, but image data after compression exhibit an increased amount. On the contrary, where the scaling factor SF is higher than 1, the picture quality is deteriorated, but image data after compression exhibit a decreased amount. Accordingly, in order to keep a good picture quality, it is necessary to use a scaling factor SF having a value as low as possible within an allowable range of the amount of image data.

2. ATM Cell

In the following, an ATM cell in which image data after compression are included will be described in detail.

2-1. Format of ATM Cell

FIG. 61 shows an example of the format of an ATM cell. Referring to FIG. 61, the ATM cell includes an ATM header (logic channel information part) 131 of 5 bytes in which an address (connection address) of a transfer destination of data is included, and a data part 132 of 48 bytes called SAR-PDU (Segmentation and Reassembly-Protocol Data Unit). The last one byte of the ATM header 131 includes an HEC (Header Error Control) for detecting a bit error of the header.

By the way, a service by provision of the AAL (ATM Adaptation Layer) type 1 is used to provide a constant information rate (CBR: Constant Bit Rate) service of voice, an image or the like by an ATM. In the AAL type 1, the SAR-PDU mentioned above has, for example, such a format as seen in FIG. 62. Referring to FIG. 62, the first 1 byte of the SAR-PDU is a SAR header, and the remaining 47 bytes are a SAR-SDU (Segmentation And Reassembly-Service Data Unit).

The SAR header is used to indicate a sending out order of a cell and is used, on the reception side, for detection of a missing cell. Meanwhile, the SAR-SDU is used as an information field and includes information of the CBR service of sound, an image or the like to be sent out. It is to be noted that the data are successively sent out in the order from the left to the right and from above to below in FIG. 62.

FIG. 63 shows an example of the format of the SAR header mentioned above. Referring to FIG. 63, the SAR header includes an SNF (Sequence Number Field) of 4 bits and an SNPF (Sequence Number Protect Field) of 4 bits.

Further, the SNF includes a CS bit indicating a CS (Conversience Sub-layer) and a SN (Sequence Number) of 3 bits which represents a number from 0 to 7 in a binary number and is cyclically incremented to indicate a sending out order of the cell. The SNPF includes a CRC (Cyclic Redundancy Check) indicating a CRC calculation value for error detection and correction of the SN, and an EP (Even Parity) bit representing an even parity.

Then, in the CBR service, data of sound, an image or the like to be transmitted at a fixed rate are divided for each 47 bytes to produce such an SAR-SDU as described above, and an SAR header for indication of a sending out order of the cell is added to the SAR-SDU. Further, an ATM header indicating a destination address is added to the SAR-SDU, and a resulting SAR-SDU is sent out to a network.

On the reception side, the SAR-SDU (data part) of 47 bytes is extracted from the received ATM cell to regenerate data of sound, an image or the like at a fixed rate.

2-2. SRTS (Synchronous Residual Time Stamp) Method

The SRTS method is a kind of a Source Clock Frequency Recovery Method and uses an RTS (Residual Time Stamp) obtained by sampling a reference clock (Common Reference Clock) signal obtained by dividing a network clock (Network Clock) signal extracted from reception data received from a UNI using a service clock (Service Clock) signal extracted from reception data received from a service interface. It is to be noted that the same clock signal from the UNI is used commonly by the transmission section 111 and the reception section 112.

FIG. 64 illustrates an example of RTS data production and transfer processing. Referring to FIG. 64, for example, a network clock frequency fn is divided to $\frac{1}{2}^X$ (X is an integer) by a binary counter 141 so that a reference clock frequency fnx is produced. Here, the integer X is set so that the relationship thereof to a transmission user clock frequency fs may satisfy $1 \leq \text{fnx/fs} < 2$.

Further, a counter (Ct) 142 is a P-bit counter (in this instance, P=4) and operates in synchronism with successive clocks extracted from a network clock signal by the binary counter 141. An output of the counter 142 is sampled for each N (N=3,008) service clock cycles from a binary counter 143 by a DFF 144. As a result, a 4-bit output of the DFF 144 is produced as the RTS described above.

Then, the 4-bit RTS is transferred by the CSI bits in successive SAR-PDU headers. It is to be noted that a frame construction for each 8 bits is provided by an SC value of the modulo (mod) 8. Here, the four bits of SC=1, 3, 5 and 7 from among 8 bits of the SCI bits described above are allocated to the RTS while the remaining 4 bits are "0". In other words, the SAR-PDU headers of the odd-numbered SC values=1, 3, 5 and 7 are used for RTS transfer. The MSB (most significant bit) of the RTS (that is, RTS4) is positioned at the CSI bit of the SAR-PDU header of SC=1, and the remaining bits of the RTS are positioned similarly in order as seen in FIG. 64.

3. NTSC Signal

Subsequently, an NTSC signal will be described in detail.

The NTSC signal is an image signal of international standards determined by the National Television System Committee and is generally used also as input/output signals of a television set or a video apparatus for public welfare.

One frame which is information for one screen usually includes 525 lines, and screen information of approximately 30 frames is transmitted for one second. In this instance, however, since a frame of information of each screen is divided into and transmitted in an even-numbered field and an odd-numbered field as seen, for example, in FIG. 65, the number of fields transmitted for one second is approximately 60. By successively transmitting still pictures of approximately 60 fields for one second as an NTSC signal, transmission and display of moving pictures are performed.

FIG. 66(a) illustrates an example of an NTSC signal. Referring to FIG. 66(a), the NTSC signal shown is an analog signal in which an image signal (field image signal), such a vertical synchronizing signal (VSYN) as shown in FIG. 66(b) and such a horizontal synchronizing signal (HSYN) as shown in FIG. 66(c) are frequency multiplexed.

It is to be noted that, for the natural frequency of image data, the following frequency is usually used.

The basic sampling clock frequency $f_e$ in "Encoding parameters of digital television for studios: CCIR REC. 601.2 (1993.7)" is $f_e$=13.5 (MHz)

Further, the frequency $f_H$ of the horizontal synchronizing signal, the frequency $f_V$ of the vertical synchronizing signal and the basic sampling clock $f_e$ have the following relationship:

$f_H=f_e/858$ $f_V=2f_H/525$

4. Various Image Compression Methods

In the following, various image compression methods which may be used by the ATM image communication apparatus 102 (or ATM image communication section 1012) will be described in detail. It is to be noted that, for the convenience of description, description will be given also of a non-compression method by which image data are not compressed.

① Non-Compression Method

FIG. 67 shows in block diagram of the ATM image communication apparatus 102 (or ATM image communication section 1012) where a non-compression method is employed. Referring to FIG. 67, the ATM image communication apparatus 102 shown includes, as a transmission section 111A thereof, an NTSC reception section 151A for receiving an NTSC signal from a camera 104 (or 104'), an analog to digital (A/D) conversion section 152A, an image data production section 153A and an ATM transmission section 154A. The ATM image communication apparatus 102 further includes, as a reception section 112A thereof, an ATM reception section 155A, an image data separation section 156A, a digital to analog (D/A) conversion section 157A and an NTSC transmission section 158A for transmitting an NTSC signal for a television set 105 (105').

In the ATM image communication apparatus 102 (or ATM image communication section 1012) having the construction described above, an NTSC signal from the camera 104 (or 104') is received by the NTSC reception section 151A, by which timing signals such as a horizontal synchronizing signal are extracted. Then, the NTSC signal is converted into a digital signal by the analog to digital conversion section 152A, and digital image data are produced from an output of the analog to digital conversion section 152A by the image data production section 153A.

Since no image compression has been performed for the image data, the amount of data for one field does not vary among different fields. Accordingly, the ATM transmission section 154A can transmit the image data by ATM cells of the AAL type 1. In particular, transmission image data are divided into SAR-SDUs in units of 47 bytes, and an SAR header and an ATM header are added to each SAR-SDU to produce an ATM cell. The thus produced ATM cells are transmitted to an ATM-UNI. In the reception section 112A, processing reverse to that performed by the transmission section 111A is performed by the ATM reception section 155A, image data separation section 156A, digital to analog conversion section 157A and NTSC transmission section 158A.

In the non-compression method described above, since moving picture data are converted directly into ATM cells without compressing the same in this manner, the circuit construction is simple comparing with other methods which will be described below, and besides a good picture quality can be realized. Further, since compression is not involved, the time for image compression processing is not required. Accordingly, the end-to-end transmission delay time including image compression is as short as approximately several ms, and the non-compression method is suitable for real-time communication.

However, since the non-compression method involves no compression of image data, the transmission rate of image data must be approximately 100 Mbit/s to 200 Mbit/s and cannot make effective use of an ATM-UNI line, and besides is much disadvantageous in terms of the communication cost. Therefore, the following various compression methods have been proposed.

② Differential Compression (Decompression) Method

FIG. 68 shows in block diagram a construction of the ATM image communication apparatus 102 (or ATM image communication section 1012) where a differential compression method is employed. Referring to FIG. 68, the ATM image communication apparatus 102 shown includes, as a transmission section 111B thereof, an NTSC reception section 151B for receiving an NTSC signal from a camera 104 (or 104'), an analog to digital (A/D) conversion section 152B, a differential compression section 153B, an image data production section 154B and an ATM transmission section 155B. The ATM image communication apparatus 102 further includes, as a reception section 112B thereof, an ATM reception section 156B, an image data separation section 157B, a differential decompression section 158B, a digital to analog (D/A) conversion section 159B and an NTSC transmission section 160B for receiving an NTSC signal for a television set 105 (or 105').

In the ATM image communication apparatus 102 (or ATM image communication section 1012) having the construction described above, an NTSC signal (image signal) from the camera 104 (or 104') is supplied to the NTSC reception section 151B, by which timing signals such as a horizontal synchronizing signal are extracted from the NTSC signal. Then, the NTSC signal is converted into a digital signal by the analog to digital conversion section 152B and then converted into and compressed as a differential signal by the differential compression section 153B.

Here, since the differential signal is lower in level than the original image signal as seen, for example, from FIG. 69, the bit amount thereof is reduced to approximately one half that of the original image signal. Further, the NTSC signal differentially compressed in this manner is inputted to the image data production section 154B, by which digital image data are produced based on the differential compressed signal.

Then, the image data are converted into ATM cells of the AAL type 1 by the ATM transmission section 155B and transmitted as such ATM cells. In particular, the transmission image data are divided into SAR-SDUs in units of 47 bytes, and an SAR header and an ATM header are added to each SAR-SDU to produce an ATM cell. The thus produced ATM cells are transmitted to an ATM-UNI. In the reception section 112B, processing reverse to that performed by the transmission section 111B is performed by the ATM reception section 156B, image data separation section 157B, differential decompression section 158B, digital to analog (D/A) conversion section 159B and NTSC transmission section 160B so that the original images (moving pictures) are reproduced.

In the ATM image communication apparatus 102 (or ATM image communication section 1012) where the differential compression method described above is employed, since differential information of YC signals of moving pictures for one field is converted into ATM cells, although the circuit construction is complicated rather than another apparatus which employs the non-compression method, a good picture quality can be obtained by regeneration of data by a construction simpler than those of the other methods which will be described below. Further, with the differential compression method, since the image compression processing time is comparatively short, the end-to-end transmission delay time including image compression can be made as short as approximately several ms. Accordingly, also the present method is suitable for real time communication.

However, also the present method is disadvantageous in terms of effective utilization of an ATM-UNIT line and the communication cost since the transmission rate of image data is still as high as approximately 50 Mbit/s. Further, since the differential compression does not allow editing for each field, it is not suitably used for a source for broadcasting.

③ H261/MPEG1 System

Subsequently, the H261/MPEG (Motion Picture image coding Experts Group) 1 system will be described. The H261/MPEG 1 (compression) system has a close relationship to the JPEG for transmission of still pictures. In the H261/MPEG 1 system, transform basically using DCT is performed for signals for one field and then processing based on a correlation between fields is performed to further improve the compression ratio.

FIG. 70 shows in block diagram a construction of the ATM image communication apparatus 102 (or ATM image communication section 1012) where an H261/MPEG 1 system is employed. Referring to FIG. 70, the ATM image communication apparatus 102 shown includes, as a transmission section 111C thereof, an NTSC reception section 151C for receiving an NTSC signal from a camera 104 (or 104'), an analog to digital (A/D) conversion section 152C, an H261/MPEG 1 compression section 153C, an image data production section 154C and an ATM transmission section 155C. Further, the ATM image communication apparatus 102 includes, as a reception section 112C thereof, an ATM reception section 156C, an image data separation section 157C, an H261/MPEG 1 decompression section 158C, a digital to analog (D/A) conversion section 159C and an NTSC transmission section 160C for transmitting an NTSC signal for a television set 105 (or 105').

In the ATM image communication apparatus 102 (or ATM image communication section 1012) having the construction described above, an NTSC signal from the camera 104 (or 104') is received by the NTSC reception section 151C, by which timing signals such as a horizontal synchronizing signal are extracted from the NTSC signal. Then, the NTSC signal is converted into a digital signal by the analog to digital conversion section 152C and then inputted to the H261/MPEG 1 compression section 153C.

The H261/MPEG 1 compression section 153C performs compression of the digital NTSC signal basically using DCT transform, calculates a correlation between fields and, in order to make the data amount fixed, feeds back the correlation to effect H261/MPEG 1 compression.

The image data production section 154C produces H261/MPEG 1 frames based on the H261/MPEG 1 compressed data. Then, since the H261/MPEG 1 frames have fixed data amounts in average, the ATM transmission section 155C can transmit the image data by ATM cells of the AAL type 1. In particular, the transmission image data are divided into SAR-SDUs in units of 47 bytes, and an SAR header and an ATM header are added to each SAR-SDU to produce an ATM cell. The thus produced ATM cells are transmitted to an ATM-UNI. In the reception section 112C, processing reverse to that performed by the transmission section 111C described above is performed to regenerate the original images.

In this manner, the H261/MPEG 1 system described above exhibits such a high compression ratio that images can be transmitted at the transmission rate of approximately several Mbit/sec.

With the H261/MPEG 1 system, however, the circuit construction is complicated, and since a correlation between fields is calculated, the image compression processing time is as long as approximately several hundreds ms and also the processing time on the regeneration (decompression) side is long. Consequently, the end-to-end transmission delay time including image compression is approximately 400 ms. Therefore, although the H261/MPEG 1 system is suitably used for storage of images or with a cable television, it is not suitable for real time communication such as for communication for a television conference.

Further, since the target of the picture quality is approximately 320×240 pixels, the picture quality is lower than ½ that of a television broadcast, and a sufficient picture quality cannot be obtained.

④ MPEG 2 System

Subsequently, the MPEG 2 system will be described. The MPEG 2 (compression) system has been developed so that the picture quality of compressed image data after regeneration may be equal to or higher than that of a television broadcast. The MPEG 2 system itself has a close relation to the JPEG or MPEG 1 system described above. In the MPEG 2 system, signals for one field are transformed basically using DCT transform and then processing based on a correlation between fields is performed in order to further improve the compression ratio.

FIG. 71 shows in block diagram a construction of the ATM image communication apparatus 102 (or ATM image communication section 1012) where an MPEG 2 system is employed. Referring to FIG. 71, the ATM image communication apparatus 102 shown includes, as a transmission section 111D thereof, an NTSC reception section 151D for receiving an NTSC signal from a camera 104 (or 104'), an analog to digital (A/D) conversion section 152D, an MPEG 2 compression section 153D, an image data production section 154D and an ATM transmission section 155D. The ATM image communication apparatus 102 further includes, as a reception section 112D thereof, an ATM reception section 156D, an image data separation section 157D, an MPEG 2 decompression section 158D, a digital to analog (D/A) conversion section 159D, and an NTSC transmission section 160D for transmitting an NTSC signal for a television set 105 (or 105').

In the ATM image communication apparatus 102 (or ATM image communication section 1012) having the construction described above, an NTSC signal from the camera 104 (or 104') is received by the NTSC reception section 151D, by which timing signals such as a horizontal synchronizing signal are extracted. Then, the NTSC signal is converted into a digital signal by the analog to digital conversion section 152D and then inputted to the MPEG 2 compression section 153D.

The MPEG 2 compression section 153D performs transform of the digital NTSC signal basically using DCT transform, calculates a correlation between fields, and, in order to make the data amount fixed, feeds back the correlation to perform MPEG 2 compression. Then, based on the MPEG 2 compressed data, MPEG 2 frames are produced by the image data production section 154D.

Since the MPEG 2 frames have fixed data amounts in average, the ATM transmission section 155D can transmit the image data by ATM cells of the AAL type 1. In particular, the transmission image data are divided into SAR-SDUs in units of 47 bytes, and an SAR header and an ATM header are added to each SAR-SDU to produce an ATM cell. The thus produced ATM cells are transmitted to an ATM-UNI. Also in this instance, in the reception section 112D, processing reverse to that performed by the transmission section 111D is performed to regenerate the original pictures.

In this manner, the MPEG 2 system described above exhibits a high compression ratio and can transmit image data at a transmission rate of approximately 10 Mbit/sec, and besides the picture quality after regeneration is high.

With the MPEG 2 system, however, since the compression and decompression circuits used are very complicated in circuit construction and expensive and particularly the compression section 153D is formed as a very large apparatus, the overall cost becomes very high. Further, also with the MPEG 2 system, since a correlation between fields is calculated, the image compression processing time is as long as approximately several hundreds ms and also the processing time on the decompression side is long. Consequently, the end-to-end transmission delay time including image compression is approximately 400 ms, and accordingly, the MPEG 2 system is not suitable for real time communication such as for communication for a television conference.

⑤ JPEG System

Subsequently, the JPEG system mentioned hereinabove will be described in more detail. While the JPEG (compression) system has a close relation to the MPEG compression system described above, it originally is a method for use for transmission of still pictures. In the JPEG system, JPEG compression processing is performed for signals still of pictures for one field basically using DCT, and then the signals are converted into and transmitted as ATM cells.

FIG. 72 shows in block diagram a construction of the ATM image communication apparatus 102 (or ATM image communication section 1012) where a JPEG system is employed. Referring to FIG. 72, the ATM image communication apparatus 102 shown includes, as a transmission section 111E thereof, an NTSC reception section 151E for receiving an NTSC signal from a camera 104 (or 104'), an analog to digital (A/D) conversion section 152E, a JPEG compression section 153E, an image data production section 154E and an ATM transmission section 156E. The ATM image communication apparatus 102 further includes, as a reception section 112E thereof, an ATM reception section 156E, an image data separation section 157E, a JPEG decompression section 158E, a digital to analog (D/A) conversion section 159E, and an NTSC transmission section 160E for transmitting an NTSC signal for a television set 105 (or 105').

In the ATM image communication apparatus 102 (or ATM image communication section 1012) having the construction described above, an NTSC signal from the camera 104 (or 104') is received by the NTSC reception section 151E, by which timing signals such as a horizontal synchronizing signal are extracted. Then, the NTSC signal is converted into a digital signal by the analog to digital conversion section 152E and then inputted to the JPEG compression section 153E.

The digital NTSC signal is JPEG compressed by the JPEG compression section 153E and then inputted to the image data production section 154E, by which JPEG frames are produced. Then, the JPEG frames are converted into and transmitted as ATM cells by the ATM transmission section 155E.

It is to be noted that in the JPEG compression system, the compression ratio of images is adjusted with a parameter called scaling factor as described hereinabove. Further, even if the scaling factor is equal, since the data amount of image data per one field depends upon the picture quality, the ATM transmission section 155E cannot usually transmit image data by ATM cells of the AAL type 1.

Accordingly, the JPEG compression system is principally used for transmission of still pictures or for transmission of storage data which need not be transmitted at a fixed rate. Further, although the compression ratio in the JPEG compression system, is not as high as that of the MPEG 2 system, it is comparatively high, and if it can be used for transmission of moving pictures, then a picture quality equal to that obtained by the MPEG 2 system can be obtained at the transmission rate of approximately 20 Mbit/second.

Further, with the JPEG system, since also the circuit construction is simpler than that of the MPEG 2 compression system, a comparatively small apparatus can be reduced at a lower cost. Further, since the JPEG system does not involve calculation of a correlation between fields different from the MPEG 2, the image compression processing time is as very low as approximately several tens ms.

However, with the JPEG system, since it is directed to still pictures, the data amount of image data after compression processing is different for each one field depending upon the picture quality even if the scaling factor is equal (that is, even if the compression ratio is not varied). Consequently, the ATM transmission section 155E cannot usually transmit image data by ATM cells of the AAL 1 type. Accordingly, although the JPEG system can be used for transmission of still pictures or for transmission of storage data which need not be transmitted at a fixed rate, it is almost impossible to use the JPEG system for transmission of moving picture data.

SUMMARY OF THE INVENTION

It is an object of the present invention to provide a fixed length cell handling image communication method wherein moving picture data are compressed to data having a fixed transmission rate using a compression method for still pictures to obtain fixed length cells so that image processing such as compression/decompression of the moving picture data can be performed at a high rate while keeping a high compression ratio and a high picture quality.

It is another object of the present invention to provide a transmission apparatus for fixed length cell handling type image communication and a reception apparatus for fixed length cell handling type image communication which can perform image processing for moving picture data while keeping a high compression ratio and a high picture quality and which can be produced in a small size and at a reduced cost.

In order to attain the objects described above, according to an aspect of the present invention, there is provided a fixed length cell handling type image communication method wherein image data are communicated in fixed length cells each including a logical channel information part and a data part, comprising the steps of performing still picture compression processing for moving picture data, which define information of a plurality of screens individually divided into a plurality of fields to be successively transmitted per unit time, in response to field timing information representative of a compression timing of each field to convert the moving picture data into variable length data independent of each other, and converting the variable length data into fixed length data having a fixed transmission rate and sending out the fixed length data and the field timing information as the fixed length cells to transmit the moving picture data.

With the fixed length cell handling type image communication method, moving picture data can be compressed effectively using a compression method for still pictures and the moving picture data after such compression can be converted into fixed length cells readily and transmitted in an asynchronous fashion. Accordingly, a transmission line for fixed length cells can be utilized very efficiently. Further, in this instance, since the fixed length data and the field timing information are sent out in the fixed length cells, the moving picture data compressed using the compression method for still pictures can be regenerated with certainty and at a high rate on the reception side, and consequently, real time communication can be realized.

According to another aspect of the present invention, there is provided a transmission apparatus for fixed length cell handling type image communication wherein image data are transmitted as fixed length cells each including a logical channel information part and a data part, comprising an image data compression section for performing still picture compression processing for moving picture data, which define information of a plurality of screens individually divided into a plurality of fields to be successively transmitted per unit time, in response to field timing information representative of a compression timing of each field to convert the moving picture data into variable length data independent of each other, a transmission buffer section for converting the variable length data obtained by the image data compression section into fixed length data having a fixed transmission rate, and a fixed length cell transmission section for placing the fixed length data and the field timing information into the data parts of the fixed length cells and transmitting the fixed length cells.

With the transmission apparatus for fixed length cell handling type image communication, an apparatus to which the fixed length cell handling type image communication method described above is applied and in which the individual functions are performed divisionally by the respective components can be constructed very readily.

According to a further aspect of the present invention, there is provided a fixed length cell handling type image communication method wherein image data are communicated in fixed length cells each including a logical channel information part and a data part, comprising the steps of receiving fixed length cells including image-compressed fixed length data of a fixed transmission rate representing moving picture data which define information of a plurality of screens individually divided into a plurality of fields and field timing information representative of a compression timing of each field, regenerating the fixed length data and the field timing information and converting, based on the regenerated field timing information, the fixed length data into variable length data which are independent of each other for the individual fields, and performing still picture decompression processing for the variable length data to regenerate the original moving picture data.

With the fixed length cell handling type image communication method described above, moving picture data after compression in the form of fixed length cells can be received in an asynchronous fashion, and the moving picture data can be decompressed (regenerated) effectively using the decompression method for still pictures. Accordingly, a transmission line for the fixed length cells can be utilized very efficiently. Further, in this instance, since the fixed length data and the field timing information are received in the fixed length cells, the moving picture data compressed using the still picture compression method can be regenerated with certainty and at a high rate, and consequently, real time communication can be achieved.

According to a still further aspect of the present invention, there is provided a reception apparatus for fixed length cell handling type image communication wherein image data are transmitted as fixed length cells each including a logical channel information part and a data part, comprising a fixed length cell reception section for receiving fixed length cells including image-compressed fixed length data of a fixed transmission rate representing moving picture data which define information of a plurality of screens individually divided into a plurality of fields and field timing information representative of a compression timing of each field and regenerating the fixed length data and the field timing information from the fixed length cells, a reception buffer section for converting, based on the field timing information regenerated by the fixed length cell reception section, the fixed length data into variable length data which are independent of each other for the individual fields, and an image data decompression section for performing still picture decompression processing for the variable length data from the reception buffer section to regenerate the original moving picture data.

With the reception apparatus for fixed length cell handling type image communication, an apparatus to which the fixed length cell handling type image communication method described above is applied and in which the individual functions are performed divisionally by the respective components can be constructed very readily.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 24(a) and 24(b) are timing charts illustrating an example of operation of the ATM cell transmission section of FIG. 23;

FIGS. 25(a) to 25(d) are timing charts illustrating another example of operation of the ATM cell transmission section of FIG. 23;

FIGS. 26(a) to 26(o) are timing charts illustrating a further example of operation of the ATM cell transmission section of FIG. 23;

FIGS. 34(a) to 34(f) are timing charts illustrating an example of operation of the pulse adjustment section of FIG. 33;

FIGS. 35(a) to 35(f) are timing charts illustrating another example of operation of the pulse adjustment section of FIG. 33;

FIGS. 36(a) to 36(f) are timing charts illustrating a further example of operation of the pulse adjustment section of FIG. 33;

FIGS. 37(a) to 37(f) are timing charts illustrating a still further example of operation of the pulse adjustment section of FIG. 33;

FIG. 60 is a diagrammatic view showing an example of a standard quantization table;

FIG. 64 is a diagrammatic view illustrating an example of RTS data production and transfer processing;

DESCRIPTION OF THE PREFERRED EMBODIMENTS a. Aspects of the Invention

Figure 1:
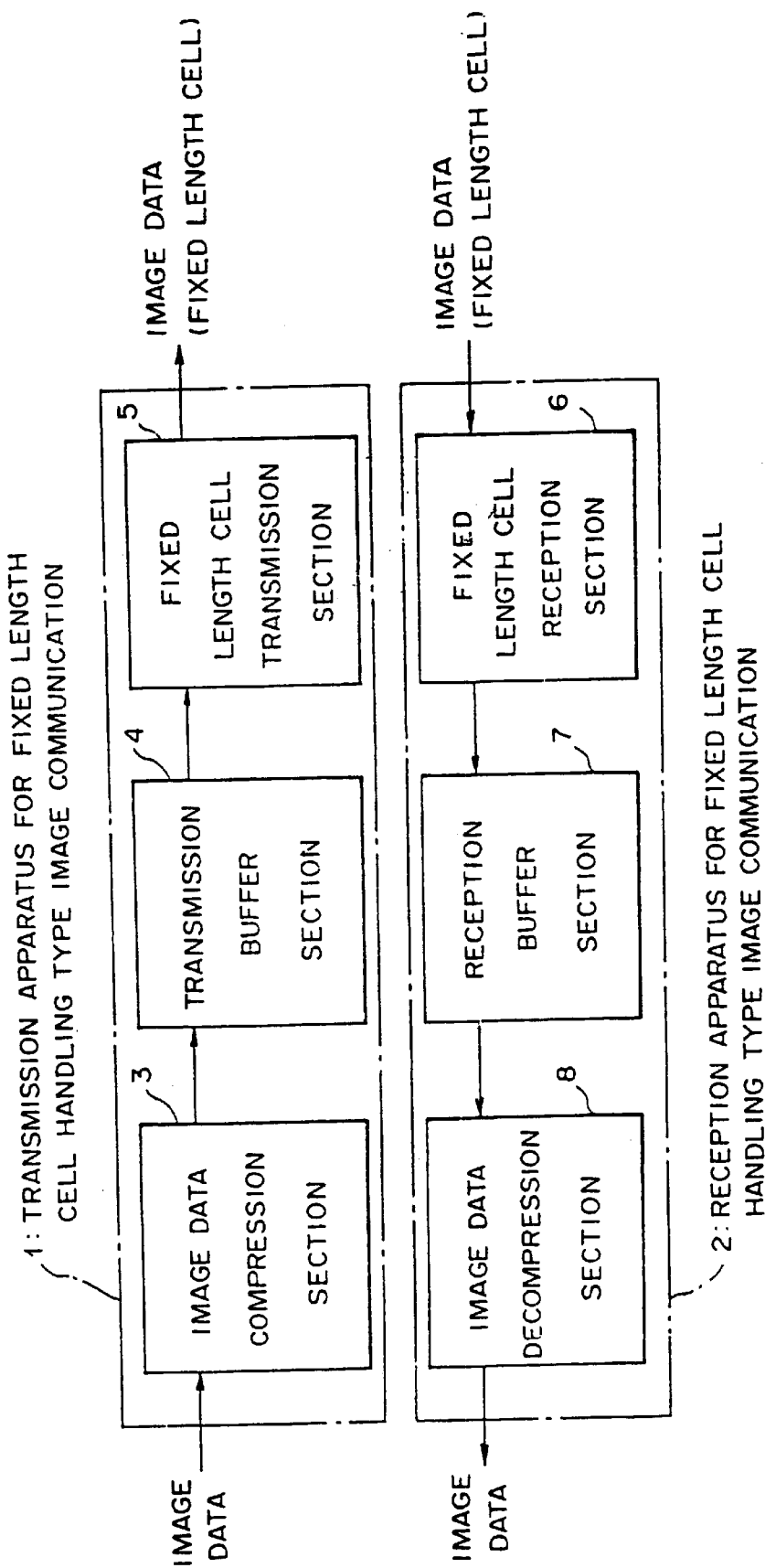
FIG. 1 is a block diagram illustrating an aspect of the present invention.

FIG. 1 shows in block diagram showing an image communication system according to an aspect of the present invention. Referring to FIG. 1, the image communication apparatus includes a transmission apparatus 1 for fixed length cell handling type image communication and a reception apparatus 2 for fixed length cell handling type image communication. The transmission apparatus 1 for fixed length cell handling type image communication (hereinafter referred to simply as transmission apparatus 1) includes an image data compression section 3, a transmission buffer section 4 and a fixed length cell transmission section 5. Meanwhile, the reception apparatus 2 for fixed length cell handling type image communication (hereinafter referred to simply as reception apparatus 2) includes a fixed length cell reception section 6, a reception buffer section 7 and an image data decompression section 8.

The image data compression section 3 of the transmission apparatus 1 performs still picture compression processing for moving picture data, which define information of a plurality of screens individually divided into a plurality of fields to be successively transmitted per unit time, in response to field timing information representative of a compression timing of each field to convert the moving picture data into variable length data independent of each other. The transmission buffer section 4 converts the variable length data obtained by the image data compression section 3 into fixed length data having a fixed transmission rate. The fixed length cell transmission section 5 places the fixed length data and the field timing information into the data parts of the fixed length cells and transmits the fixed length cells.

In the transmission apparatus 1 having the construction described above, a fixed length cell handling type image communication method according to the present invention proceeds in the following manner. First, moving picture data to be transmitted are subject to still picture compression processing by the image data compression section 3 in response to field timing information representative of a compression timing of each field to convert the moving picture data into variable length data independent of each other. The variable length data are further converted into fixed length data having a fixed transmission rate by the transmission buffer section 4 and then placed into data parts of fixed length cells together with the field timing information and transmitted as the fixed length cells by the fixed length cell transmission section 5 to perform transmission of the moving picture data.

In the transmission apparatus 1 for fixed length cell handling type image communication having the construction described above, since moving picture data to be transmitted are subject to still picture compression processing in response to field timing information so that they are converted first into variable length data which are independent of each other and then into constant length data, the moving picture data can be compressed effectively using a compression method for still pictures and the moving picture data after such compression can be converted into fixed length cells readily and transmitted in an asynchronous fashion. Accordingly, a transmission line for fixed length cells can be utilized very efficiently. Further, in this instance, since the fixed length data and the field timing information can be sent out in the fixed length cells, the moving picture data compressed using the compression method for still pictures can be regenerated with certainty and at a high rate on the reception side, and consequently, real time communication can be realized.

Further, with the transmission apparatus 1 for fixed length cell handling type image communication described above, since it includes the image data compression section 3 which performs still picture compression processing, the transmission buffer section 4 which converts variable length data into fixed length data and the fixed length cell transmission section 5 which converts and transmits the fixed length data into and as fixed length cells, the apparatus to which the fixed length cell handling type image communication method described above is applied and in which the individual functions are performed divisionally by the respective components can be constructed very readily.

For the still picture compression processing described above, an intra-field compression method wherein image compression processing for the screen information in each field is performed independently for the individual fields is employed. Particularly, the JPEG system is employed as the intra-field compression method. Accordingly, various advantages of the still picture compression processing such as a high compression ratio, a good picture quality, a simple circuit construction, production in a small size at a low cost and a short image processing time can be made the most of, and real time communication which is required, for example, for a television conference system can be realized very readily.

While the fixed length data and the field timing information are transmitted in the fixed length cells, particularly the fixed length cells are transmitted making use of the adaptation layer 1 for transfer of the fixed length data. Accordingly, conversion into the fixed length cells can be realized by hardware and high speed processing can be achieved.

In the following, the image data compression section 3, transmission buffer section 4 and fixed length cell transmission section 5 described above will be described individually in more detail.

The image data compression section 3 is constructed such that it starts the still picture compression processing for each of the fields in response to the corresponding field timing information. More particularly, the image data compression section 3 starts the still picture compression processing for each of the fields in response to a vertical synchronizing signal as the field timing signal included in the moving picture data of the NTSC color television system. Since the still picture compression processing for each of the fields is started in response to the corresponding field timing information by the image data compression section 3, the compression processing can be performed with certainty for each field. More particularly, in this instance, since the still picture compression processing for each of the fields is started in response to a vertical synchronizing signal as the field timing signal included in the moving picture data of the NTSC color television system, the data transmission apparatus described above can be applied readily to moving picture data of the NTSC color television system.

Further, in this instance, the image data compression section 3 is constructed such that it starts the still picture compression processing for each of the fields from a selected one of the fields. Consequently, the image data compression section 3 can start the still picture compression processing for each of the fields from the selected field, and special information for allowing identification of a field with which compression processing has been begun need not be transmitted. Further, on the reception side, the field with which compression processing has been begun can be recognized automatically without the necessity for special processing.

Particularly, the image data compression section 3 is constructed such that it starts the still picture compression processing for each of the fields from a field inputted first as the selected field. Consequently, the image data compression section 3 can start the still picture compression processing for each of the fields from the field inputted first as the selected field, and such effects or advantages as described above can be achieved with a very simple construction.

Further, the image data compression section 3 is constructed such that, each time the still picture compression processing for any field is performed, it adjusts a compression ratio for the still picture compression processing so that a compressed image data amount CD per each unit field after the still picture compression processing obtained as the variable length data may fall within a range set in advance. Consequently, since, each time the still picture compression processing for any field is performed, the compression ratio for the still picture compression processing is adjusted by the image data compression section 3 so that the compressed image data amount CD per each unit field after the still picture compression processing obtained as the variable length data may fall within the range set in advance, the moving picture data can be controlled within the allowable range of the compressed image data amount CD to provide a possible best picture quality.

More particularly, the image data compression section 3 is constructed such that it includes a threshold value setting section for setting a threshold value for the compressed image data amount CD per each unit field after the still picture compression processing obtained as the variable length data, and a scaling factor calculation processing section for comparing the compressed image data amount CD obtained by the still picture compression processing with the threshold value set by the threshold value setting section and performing calculation processing of a scaling factor value SF for adjustment of the compression ratio after the still picture compression processing based on a result of the comparison to update the scaling factor value SF for use for the still picture compression processing for a next field. Consequently, since, in the image data compression section 3, the compressed image data amount CD obtained by the still picture compression processing is compared with the threshold value set by the threshold value setting section and calculation processing of the scaling factor value SF is performed based on a result of the comparison by the scaling factor calculation processing section to update the scaling factor value SF for use for the still picture compression processing for a next field, the moving picture data can be controlled with certainty within the allowable range of the compressed image data amount CD.

In this instance, the threshold value setting section sets N different values $SF_i$ for the scaling factor value SF to be used as the threshold value, where N is a natural number and i=1, 2, . . . , N and then $SF_1 > SF_2 > \ldots > SF_N$, and an upper limit value $RB_{up}$ and a lower limit value $RB_{dn}$ for the compressed image data amount in advance, and the scaling factor calculation processing section decrements, when the compressed image data amount CD exceeds the lower limit value $RB_{up}$, the parameter i by "1" to increase the scaling factor value SF by one step, but increments, when the compressed image data amount is lower than the lower limit value $RB_{dn}$, the parameter i by "1" to decrease the scaling factor value SF by one step. Consequently, since the scaling factor calculation processing section calculates the scaling factor value SF such that it decrements, when the compressed image data amount CD exceeds the lower limit value $RB_{up}$, the parameter i by "1" to increase the scaling factor value SF by one step, but increments, when the compressed image data amount is lower than the lower limit value $RB_{dn}$, the parameter i by "1" to decrease the scaling factor value SF by one step, the compressed image data amount CD can be controlled to vary principally between the upper limit value $RB_{up}$ and the lower limit value $RB_{dn}$. Consequently, a possible best picture quality can be obtained with a higher degree of certainty.

Or, the transmission apparatus 1 may be constructed such that the threshold value setting section sets in advance an upper limit value $RB_{up}$, an aimed value RT and a lower limit value $RB_{dn}$ for the compressed image data amount CD to be used as the threshold value, and the scaling factor calculation processing section calculates the scaling factor value SF such that, when the compressed image data amount CD is lower than the aimed value RT, the scaling factor value SF is decreased by a first amount "a", where the first amount "a" is a positive real number, but when the compressed image data amount CD is equal to or higher than the aimed value RT, the scaling factor value SF is increased by a second amount "b", where the second amount "b" is a positive real number whereas, when the compressed image data amount CD is lower than the lower limit value $RB_{dn}$, the scaling factor value SF is 1decreased by a third amount "c", where the third amount "c" is a positive real number larger than the first amount "a", but when the compressed image data amount CD is higher than the upper limit value $RB_{up}$, the scaling factor value SF is increased by a fourth amount "d", where the fourth amount "d" is a positive real number larger than the second amount "b". Since the scaling factor calculation processing section calculates the scaling factor value SF such that, when the compressed image data amount CD is lower than the aimed value RT, the scaling factor value SF is decreased by the first amount "a", where the first amount "a" is a positive real number, but when the compressed image data amount CD is equal to or higher than the aimed value RT, the scaling factor value SF is increased by the second amount "b", where the second amount "b" is a positive real number whereas, when the compressed image data amount CD is lower than the lower limit value $RB_{dn}$, the scaling factor value SF is decreased by the third amount "c", where the third amount "c" is a positive real number larger than the first amount "a", but when the compressed image data amount CD is higher than the upper limit value $RB_{up}$, the scaling factor value SF is increased by the fourth amount "d", where the fourth amount "d" is a positive real number larger than the second amount "b", the compressed image data amount CD can be controlled to normally vary in the proximity of the aimed value RT, which contributes very much to a good picture quality and effective utilization of a transmission line (bandwidth).

In this instance, a value obtained by calculation of a function which increases in proportion to the compressed image data amount CD is employed for the fourth amount "d". Consequently, even if the compressed image data amount CD in a calculation cycle exceeds an allowable maximum value, the compressed image data amount CD in a next calculation cycle can be controlled to a value lower than the allowable maximum value with certainty. Consequently, the possibility that the compressed image data amount CD may exceed the allowable maximum value can be reduced significantly.

Or, the transmission apparatus may be constructed such that the threshold value setting section sets in advance an aimed lower limit value $RT_{dn}$ and an aimed upper limit value $RT_{up}$ for the aimed value RT, and the scaling factor calculation processing section is constructed such that, when the compressed image data amount CD is lower than the aimed lower limit value $RT_{dn}$, the scaling factor value SF is decreased by the first amount "a", but when the compressed image data amount CD is higher than the aimed upper limit value $RT_{up}$, the scaling factor value SF is increased by the second amount "b", whereas, when the compressed image data amount CD is between the aimed lower limit value $RT_{dn}$ and the aimed upper limit value $RT_{up}$ both inclusive, the scaling factor value SF is not updated. Since the scaling factor calculation processing section does not perform updating of the scaling factor value SF when the compressed image data amount CD falls between the aimed lower limit value $RT_{dn}$ and the aimed upper limit value $RT_{up}$ set in advance for the aimed value RT by the threshold value setting section, the aimed value RT has a certain width. Consequently, unnecessary updating of the scaling factor SF when the compressed image data amount CD has a value in the proximity of the aimed value RT can be prevented, and accordingly, otherwise possible fluctuation of the picture quality can be prevented effectively.

Or else, the scaling factor calculation processing section may be constructed such that it adds, when the compressed image data amount CD is higher than the upper limit value $RB_{up}$, an amount of an nth-order function of the compressed image data amount CD to the scaling factor value SF, n being a natural number, but subtracts, when the compressed image data amount CD is lower than the lower limit value $RB_{dn}$, the nth-order function amount of the compressed image data amount CD from the scaling factor value SF. Since the scaling factor calculation processing section adds, when the compressed image data amount CD is higher than the upper limit value $RB_{up}$, the amount of the nth-order function of the compressed image data amount CD to the scaling factor value SF (n is a natural number), but subtracts, when the compressed image data amount CD is lower than the lower limit value $RB_{dn}$, the nth-order function amount of the compressed image data amount CD from the scaling factor value SF, even if the compressed image data amount CD of a certain field does not fall within the allowable range, the compressed image data amount CD of a next field can be controlled so as to fall within the allowable range rapidly with certainty. Consequently, the possibility that the compressed image data amount CD may exceed the allowable range can be reduced significantly and the picture quality can be improved significantly.

Alternatively, the transmission apparatus may be constructed such that the threshold value setting section sets in advance a maximum compressed image data amount $R_c$ to be used as the threshold value, and the scaling factor calculation processing section performs, when the compressed image data amount CD exceeds the maximum compressed image data amount $R_c$, processing to transmit only those compressed data of an amount equal to or less than the maximum compressed image data amount $R_c$ and notifies the reception side of the compressed data that the compressed image data amount CD has exceeded the maximum compressed image data amount $R_c$. Since the scaling factor calculation processing section performs, when the compressed image data amount CD exceeds the maximum compressed image data amount $R_c$ set as the threshold value by the threshold value setting section, processing to transmit only those compressed data of an amount equal to or less than the maximum compressed image data amount $R_c$ and notifies the reception side of the compressed data that the compressed image data amount CD has exceeded the maximum compressed image data amount $R_c$, a required buffer amount can be reduced remarkably, which contributes very much to reduction in size and cost of the apparatus. Further, on the reception side, since the notification that the compressed image data amount CD has exceeded the maximum compressed image data amount $R_c$ is received, such a countermeasure that an image of a preceding field with which the compressed image data amount CD has not exceeded the maximum compressed image data amount $R_c$ can be taken.

Meanwhile, the image data compression section 3 described hereinabove is constructed such that it produces, when an out-of-synchronism state of the field timing information is detected, an alarm signal representing the detection and notifies the alarm signal to the fixed length cell transmission section 5 so as to stop transmission of the fixed length cells by the fixed length cell transmission section 5. More particularly, the image data compression section 3 is constructed such that it produces, when an out-of-synchronism state of one of a horizontal synchronizing signal and a vertical synchronizing signal as the field timing information included in the moving picture data of the NTSC color television system is detected, an alarm signal representing the detection and notifies the alarm signal to the fixed length cell transmission section 5 so as to stop transmission of the fixed length cells by the fixed length cell transmission section 5. Since, when an out-of-synchronism state of the field timing information is detected, or more particularly when an out-of-synchronism state of one of a horizontal synchronizing signal and a vertical synchronizing signal as the field timing information included in the moving picture data of the NTSC color television system is detected, the image data compression section 3 produces an alarm signal representing the detection and notifies the alarm signal to the fixed length cell transmission section 5 so as to stop transmission of the fixed length cells by the fixed length cell transmission section 5, transmission of wasteful fixed length cells can be prevented, and for example, useless charging of money to the fixed length cells in this instance can be prevented.

Meanwhile, the transmission buffer section 4 is constructed such that it inserts an amount of an idle pattern as empty information subsequently to each effective data part of the variable length data obtained by the image data compression section 3 to convert the variable length data obtained for each field into the fixed length data having the fixed transmission rate. Since the transmission buffer section 4 inserts an amount of the idle pattern as empty information subsequently to each effective data part of the variable length data obtained by the image data compression section 3 to convert the variable length data obtained for each field into the fixed length data having the fixed transmission rate, the variable length data can be converted into fixed length data having the fixed transmission rate very readily.

In this instance, the transmission buffer section 4 is constructed, for example, such that it changes the data amounts of the variable length data for the individual fields into given data amounts and converts the variable length data into the fixed length data having the fixed transmission rate so that each of the data amounts may have a predetermined ratio with respect to the data amount of the variable length data for all of the fields. Since the transmission buffer section 4 changes the data amounts of the variable length data for the individual fields into given data amounts and converts the variable length data into the fixed length data having the fixed transmission rate so that each of the data amounts may have the predetermined ratio with respect to the data amount of the variable length data for all of the fields, the fixed length data can be transmitted very accurately.

More particularly, the transmission buffer section 4 includes a plurality of transmission FIFO memories, a writing selection section for changing over an output thereof in response to an end signal of the still picture compression processing from the image data compression section 3 to selectively write the variable length data inputted thereto as compressed data from the image data compression section 3 into one of the transmission FIFO memories, and a reading selection section for changing over an output thereof in response to the end signal to read out the variable length data from one of the transmission FIFO memories other than that transmission FIFO memory with which writing of the variable data is proceeding and to insert the idle pattern into the read out variable length data. Consequently, in the transmission buffer section 4, the output of the writing selection section is changed over in response to the end signal of the still picture compression processing from the image data compression section 3 to selectively write the variable length data inputted thereto as compressed data from the image data compression section 3 into one of the transmission FIFO memories whereas the output of the reading selection section is changed over in response to the end signal to read out the variable length data from one of the transmission FIFO memories other than that transmission FIFO memory with which writing of the variable data is proceeding and to insert the idle pattern into the read out variable length data. Accordingly, compression processing for the moving picture data by the image data compression section and transmission processing of the moving picture data (fixed length cells) by the fixed length cell transmission section 5 can be performed simultaneously. As a result, processing in the transmission apparatus can be performed at an increased rate, and real time communication can be realized.

In this instance, the transmission buffer section 4 is constructed such that it inserts, when the transmission FIFO memory with which reading out of the variable length data for each field is proceeding is empty, fixed data as the idle pattern. As such fixed data, a fixed value which is different depending upon the field identification information allocated to each field is used. Since the transmission buffer section 4 inserts, when the transmission FIFO memory with which reading out of the variable length is proceeding is empty, as the idle pattern, fixed data, particularly a fixed value which is different depending upon the field identification information allocated to each field is used, placement processing of the idle pattern can be performed with certainty, and also the circuit configuration therefor can be simplified. Further, it can be identified readily to which field (for example, an odd-numbered field or an even-numbered field of the NTSC color television system) fixed length data after conversion belongs.

On the other hand, the fixed length cell transmission section 5 described hereinabove is constructed such that it changes a transmission rate of the fixed length data from the transmission buffer section 4 to a transmission rate based on a frequency of a basic sampling clock signal used for the still picture compression processing by the image data compression section 3 to transmit the fixed length data in the fixed length cells. Since the fixed length cell transmission section 5 changes the transmission rate of the fixed length data from the transmission buffer section 4 to the transmission rate based on the frequency of the basic sampling clock signal used for the still picture compression processing by the image data compression section 3 to transmit the fixed length data in the fixed length cells, a clock signal of a transmission rate other than the transmission rate of the image data (fixed length data) can be transmitted very readily.

More particularly, the fixed length cell transmission section 5 is constructed such that it changes the transmission rate of the fixed length data to a number of times the frequency of the basis sampling clock signal. Since the fixed length cell transmission section 5 changes the transmission rate of the fixed length data to a number of times the frequency of the basis sampling clock signal, the changing processing of the transmission rate described above can be realized with a very simple construction.

In this instance, the transmission apparatus 1 is constructed such that, for example, the frequency of the basic sampling clock signal is 13.5 MHz, and the fixed length cell transmission section 5 multiplies the frequency of the basic sampling clock signal to 3/2 times to change the transmission rate of the fixed length data to 20.25 MHz. Since the fixed length cell transmission section 5 multiplies the frequency of the basic sampling clock signal, whose frequency is 13.5 MHz, to 3/2 times to change the transmission rate of the fixed length data to 20.25 MHz, effective utilization of the transmission line upon transmission of fixed length data can be achieved with certainty.

Or, the fixed length cell transmission section 5 is constructed such that it transmits transmission rate information of the transmission rate based on the frequency of the basic sampling clock signal in the fixed length cells together with the fixed length data. As an example, the fixed length cell transmission section 5 transmits the transmission rate information, for example, in accordance with an SRTS method. Since the fixed length cell transmission section 5 transmits the transmission rate information of the transmission rate based on the frequency of the basic sampling clock signal in the fixed length cells together with the fixed length data, for example, transmits the transmission rate information in accordance with an SRTS method, a desired basic sampling clock signal can be transmitted arbitrarily.

Particularly, in this instance, the fixed length cell transmission section 5 includes a dividing circuit for dividing the frequency of the basic sampling clock signal to 1/M, M being a positive real number, an oscillator for oscillating a clock frequency equal to N/M×K times the frequency of the basic sampling clock signal, N and K being natural numbers, and a frequency N multiplication circuit for multiplying the frequency of the basic sampling clock signal divided to 1/M by the dividing circuit by N based on an output of the oscillator. Consequently, simplification and reduction in cost of the circuit configuration can be achieved.

In this instance, the frequency N multiplication circuit includes a counter for dividing an input clock signal thereto to 1/8K, and a differentiation pulse obtained by detecting a rising edge of the basic sampling clock signal divided in frequency by the dividing circuit using a clock signal of the clock frequency of the oscillator is inputted to a reset input 1terminal of the counter. Consequently, the circuit can be realized while achieving simplification and reduction in cost of the circuit configuration with certainty.

In the meantime, in the reception apparatus 2, the fixed length cell reception section 6 receives fixed length cells including image-compressed fixed length data of a fixed transmission rate representing moving picture data which define information of a plurality of screens individually divided into a plurality of fields and field timing information representative of a compression timing of each field, and regenerates the fixed length data and the field timing information from the fixed length cells. The reception buffer section 7 converts, based on the field timing information regenerated by the fixed length cell reception section 6, the fixed length data into variable length data which are independent of each other for the individual fields. The image data decompression section 8 performs still picture decompression processing for the variable length data from the reception buffer section 7 to regenerate the original moving picture data.

In the reception apparatus 2 having the construction described above, a fixed length cell handling type image communication method according to the present invention proceeds in the following manner. In particular, fixed length cells including image-compressed fixed length data of a fixed transmission rate representing moving picture data which define information of a plurality of screens individually divided into a plurality of fields and field timing information representative of a compression timing of each field are received and the fixed length data and the field timing information are generated by the fixed length cell reception section 6. Then, the fixed length data are converted, based on the regenerated field timing information, by the reception buffer section 7, into variable length data which are independent of each other for the individual fields. Thereafter, still picture decompression processing is performed for the variable length data by the image data decompression section 8 to regenerate the original moving picture data.

In this manner, with the fixed length cell handling type image communication method described above, since the original moving picture data are regenerated by regenerating the fixed length data and the field timing information from received fixed length cells and then performs still picture decompression processing for image data (the variable length data) based on the regenerated field timing information, the moving picture data after compression in the form of fixed length cells can be received in an asynchronous fashion, and the moving picture data can be decompressed (regenerated) effectively using the decompression method for still pictures. Accordingly, the transmission line for the fixed length cells can be utilized very efficiently. Further, in this instance, since the fixed length data and the field timing information are received in the fixed length cells, the moving picture data compressed using the still picture compression method can be regenerated with certainty and at a high rate, and consequently, real time communication can be achieved.

Further, with the reception apparatus 2 for fixed length cell handling type image communication described above, since it includes the fixed length cell reception section 6 which receives fixed length cells including fixed length data and field timing information, the reception buffer section 7 which converts the fixed length data into variable length data (compressed moving picture data) and the image data decompression section 8 which performs still picture decompression processing for the variable length data, the apparatus 2 to which the fixed length cell handling type image communication method described above is applied and in which the individual functions are performed divisionally by the respective components can be constructed very readily.

For the still picture compression processing described above, an intra-field decompression method wherein image decompression processing for the screen information in each field is performed independently for each field is employed. Particularly, the JPEG system is used the intra-field decompression method. Consequently, similarly to the transmission side, various advantages of the still picture compression processing such as a high compression ratio, a good picture quality, a simple circuit construction, production in a small size at a low cost and a short image processing time can be made the most of, and real time communication which is required, for example, for a television conference system can be realized very readily.

Meanwhile, the fixed length data and the field timing information are placed in the data parts of the fixed length cells. Or, the fixed length cells are received making use of the adaptation layer 1 for transfer of the fixed length data. Consequently, processing of extracting fixed length data from the fixed length cells, that is, decomposition of the fixed length cells, can be realized by hardware and high speed processing can be achieved.

In the following, the fixed length cell reception section 6, reception buffer section 7 and image data decompression section 8 will be described individually in more detail.

The fixed length cell reception section 6 is constructed such that it produces an internal basic sampling clock signal to be used to regenerate, from received transmission rate information of the fixed length cells included in the data parts of the fixed length cells, the field timing information to be used for the still picture decompression processing by the image data decompression section 8. Since the fixed length cell reception section 6 produces the internal basic sampling clock signal to be used to regenerate, from the received transmission rate information of the fixed length cells included in the data parts of the fixed length cells, the field timing information to be used for the still picture decompression processing by the image data decompression section 8, the basic sampling clock signal for regeneration of field timing information can be produced very readily.

Particularly, the fixed length cell reception section 6 includes a transmission rate information production section, a difference calculation section and a basic sampling clock production section. The transmission rate information production section produces internal transmission rate information of the transmission rate originally in the inside thereof. The difference calculation section calculates a difference between the internal transmission rate information produced in the transmission rate information production section and the received transmission rate information included in the data part of each of the received fixed length cells to obtain difference transmission rate information.

The basic sampling clock production section produces an internal clock signal for controlling an output of the transmission rate information production section so that the difference transmission rate information obtained by the difference calculation section may be equal to 0 and producing the basic sampling clock signal to be used to regenerate the field timing information based on the internal clock signal.

Consequently, in the fixed length cell reception section 6, a difference between the internal transmission rate information produced in the transmission rate information production section and the received transmission rate information included in the data part of each of the received fixed length cells is calculated by the difference calculation section to obtain difference transmission rate information. Then, an internal clock signal for controlling the output of the transmission rate information production section so that the difference transmission rate information obtained by the difference calculation section may be equal to "0" is produced and the basic sampling clock signal to be used to regenerate the field timing information is produced based on the internal clock signal by the basic sampling clock production section. Consequently, the basic sampling clock signal can be produced with certainty with a very simple construction.

To this end, the basic sampling clock production section described above includes an internal clock production phase-locked loop section, a sampling clock production phase-locked loop section, a reception user clock production phase-locked oscillation section and a frequency multiplication section. The internal clock production phase-locked loop section produces the internal clock signal based on the difference transmission rate information obtained by the difference calculation section. The sampling clock production phase-locked loop section produces a sampling clock signal based on the difference transmission rate information obtained by the difference calculation section.

The reception user clock production phase-locked oscillation section multiplies a frequency of the sampling clock signal from the sampling clock production phase-locked loop section by a first number to produce a reception user clock signal. The frequency multiplication section multiplies a frequency of the reception user clock signal produced by the reception user clock production phase-locked oscillation section by a second number to produce the basic sampling clock signal of a frequency.

Consequently, in the basic sampling clock production section described above, the internal clock signal is produced by the internal clock production phase-locked loop section based on the difference transmission rate information obtained by the difference calculation section, and the sampling clock signal is produced by the sampling clock production phase-locked loop section based on the difference transmission rate information obtained by the difference calculation section. Then, the frequency of the sampling clock signal produced by the sampling clock production phase-locked loop section is multiplied by the first number by the reception user clock production phase-locked oscillation section to produce the reception user clock signal, and then, the frequency of the reception user clock signal produced by the reception user clock production phase-locked oscillation section is multiplied by the second number by the frequency multiplication section to produce the basic sampling clock signal of a frequency. Consequently, the basic sampling clock production section can be realized very readily with a simple circuit.

Alternatively, the basic sampling clock production section may only include the internal clock production phase-locked loop section, sampling clock production phase-locked loop section and frequency multiplication section. In this instance, the internal clock production phase-locked loop section produces the internal clock signal based on the difference transmission rate information obtained by the difference calculation section while the sampling clock production phase-locked loop section produces the sampling clock signal based on the difference transmission rate information obtained by the difference calculation section, and the frequency multiplication section multiplies the frequency of the sampling clock signal produced by the sampling clock production phase-locked loop section by the first number to produce the basic sampling clock signal of a frequency.

Consequently, also with the basic sampling clock production section which only includes the internal clock production phase-locked loop section, sampling clock production phase-locked loop section and frequency multiplication section, the basic sampling clock signal of a frequency can be produced in such a manner that the internal clock signal is produced by the internal clock production phase-locked loop section based on the difference transmission rate information obtained by the difference calculation section while the sampling clock signal is produced by the sampling clock production phase-locked loop section based on the difference transmission rate information obtained by the difference calculation section and the frequency of the sampling clock signal produced by the sampling clock production phase-locked loop section is multiplied by the first number by the frequency multiplication section, the circuit can be further simplified.

Or, the basic sampling clock production section described above includes an image data decompressing clock production section for producing, based on the regenerated basic sampling clock signal, an image data decompressing clock signal as the field timing information to be used for the still picture decompression processing by the image data decompression section. Accordingly, in the basic sampling clock production section, the image data decompressing clock production section produces, based on the regenerated basic sampling clock signal, an image data decompressing clock signal as the field timing information to be used for the still picture decompression processing by the image data decompression section 8. Consequently, a clock signal having the same timing as that on the transmission side can be produced on the reception side, and accordingly, real time communication can be achieved.

Particularly, the image data decompressing clock production section includes a horizontal synchronizing signal regeneration section for regenerating, from the basic sampling clock signal, a horizontal synchronizing signal included in moving picture data of the NTSC color television system as the image data decompressing clock signal, and a vertical synchronizing signal regeneration section for regenerating, from the basic sampling clock signal, a vertical synchronizing signal included in the moving picture data of the NTSC color television system as the image data decompressing clock signal. Consequently, in the image data decompressing clock production section, the horizontal synchronizing signal regeneration section can regenerate, from the basic sampling clock signal, a horizontal synchronizing signal included in moving picture data of the NTSC color television system as the image data decompressing clock signal, and the vertical synchronizing signal regeneration section can regenerate, from the basic sampling clock signal, a vertical synchronizing signal included in the moving picture data of the NTSC color television system as the image data decompressing clock signal. Consequently, the present reception apparatus can be applied very readily to moving pictures of the NTSC color television system.

The fixed length cell reception section 6 may include a logical ORing section for logically ORing a signal representing a state in which reception of the fixed length cells is not proceeding and another signal representing an empty state of a buffer which temporarily stores the received fixed length cells and outputting a result of the logical ORing as an alarm signal. In this instance, the fixed length cell reception section 6 is constructed so as to output, when the alarm signal is outputted from said logical ORing section, the alarm signal to the image data decompression section so that said image data decompression section regenerates image data of a pattern as original moving picture data. Since the fixed length cell reception section 6 can output, when the alarm signal is outputted from the logical ORing section, the alarm signal to the image data decompression section 8 so that the image data decompression section regenerates the image data of the pattern as the original moving picture data, it can be notified to the user that fixed length cells cannot be received regularly, and an image after regeneration can be prevented from becoming ugly.

Meanwhile, the reception buffer section 7 described above includes a reception FIFO memory for temporarily storing the fixed length data from the fixed length cell reception section 6, and is constructed such that it requests the image data decompression section 8 to start the still picture decompression processing when a remaining capacity of the reception FIFO memory becomes lower than a fixed level. Consequently, when the remaining capacity of the reception FIFO memory becomes lower than the fixed level, the reception buffer section 7 requests the image data decompression section 8 to start the still picture decompression processing. Accordingly, a processing rate difference between the reception processing of fixed length cells by the fixed length cell reception section 6 and the decompression processing by the image data decompression section 8 can be absorbed.

Or, the reception buffer section 7 includes a reception FIFO memory for temporarily storing the fixed length data from the fixed length cell reception section 6, and is constructed such that, when a remaining capacity of the reception FIFO memory becomes higher than a fixed level during reading out of the fixed length data from the reception FIFO memory, the reception buffer section 7 requests the image data decompression section 8 to stop the still picture decompression processing and then wait and stops the reading out of the fixed length data from the reception FIFO memory. Consequently, when the remaining capacity of the reception FIFO memory becomes higher than the fixed level during reading out of the fixed length data from the reception FIFO memory, the reception buffer section 7 requests the image data decompression section 8 to stop the still picture decompression processing and then wait and stops the reading out of the fixed length data from the reception FIFO memory. Accordingly, the reception FIFO memory can be prevented from becoming empty, and an otherwise possible deterioration of the picture quality after regeneration can be prevented with certainty.

Or else, the reception buffer section 7 includes a reception FIFO memory for temporarily storing the fixed length data from the fixed length cell reception section 6, and an image data writing section for writing into the reception FIFO memory only data of an effective data part of the fixed length data which is to be subject to the still picture decompression processing by the image data decompression section 8. Consequently, in the reception buffer section 7, the image data writing section writes into the reception FIFO memory only the data of the effective data part of the fixed length data which is to be subject to the still picture decompression processing by the image data decompression section 8. Accordingly, unnecessary data can be selectively abandoned. Further, upon image decompression processing for a next field, reading out of unnecessary data can be prevented, and an otherwise possible time lag from the start of image decompression processing to the start of actual decompression processing can be eliminated.

To this end, the image data writing section includes a start point detection section for detecting a start point code indicating a start point of the effective data part, and an end point code detection section for detecting an end point code indicating an end point of the effective data part, and is constructed such that, before the fixed length data are written into the reception FIFO memory, based on the start point code detected by the start point code detection section and the end point code detected by the end point code detection section, only the data of the effective data part beginning with the start point code and ending with the end point code are written into the reception FIFO memory. Consequently, the image data writing section described above can be realized with a very simple construction.

Otherwise, the reception buffer section 7 is constructed such that it receives a fixed value, which is different depending upon field identification information allocated to each field, to identify the field identification information of the field which makes an object of the still picture decompression processing by the image data decompression section 8 and notifies a result of the identification to the image data decompression section 8. Since the reception buffer section 7 receives the fixed value, which is different depending upon field identification information allocated to each field, to identify the field identification information of the field which makes an object of the still picture decompression processing by the image data decompression section 8 and notifies a result of the identification to the image data decompression section 8, the image data decompression section 8 can perform the image decompression processing while normally grasping to which field the compressed data (variable length data) for which image decompression processing should be performed corresponds.

Or otherwise, the reception buffer section 7 includes a reception FIFO memory for storing the fixed length data from the fixed length cell reception section 6 and field identification information of a field which makes an object of the still picture decompression processing by the image data decompression section 8, and is constructed such that, upon reading out of the fixed length data from the reception FIFO memory, the field identification information is read out and notified to the image data decompression section 8. Consequently, since the reception buffer section 7 can read out, upon reading out of the fixed length data from the reception FIFO memory, the field identification information and notify it to the image data decompression section 8, there is no necessity of employing a special circuit for notification of field identification information, and significant simplification of the circuit can be anticipated.

On the other hand, the image data decompression section 8 is constructed such that it starts the still picture decompression processing for each field based on the field timing information. More particularly, the image data decompression section 8 is constructed such that it starts the still picture decompression processing for each field based on a vertical synchronizing signal as the field timing information included in the moving picture data of the NTSC color television system regenerated by the fixed length cell reception section 6. Since the image data decompression section 8 starts the still picture decompression processing for each field based on the field timing information, particularly based on the vertical synchronizing signal as the field timing information included in the moving picture data of the NTSC color television system regenerated by the fixed length cell reception section 6, received compress data can be regenerated in a synchronized timing relationship with the image compression processing on the transmission side, and consequently, real time communication can be realized.

Or, the image data decompression section 8 is constructed such that it starts the still picture decompression processing for each field from a selected one of the fields. More particularly, the image data decompression section 8 is constructed such that it starts the still picture decompression processing for each field from a field inputted first as the selected field. Since the image data decompression section 8 starts the still picture decompression processing for each field from the selected field, particularly from the field inputted first as the selected field, image decompression processing can be started automatically without the necessity for special processing from a field from which image compression processing has been started.

Or else, the image data decompression section 8 includes a plurality of field memories for storing the variable length data for each field from the reception buffer section 7 in accordance with field identification information allocated to each field, and is constructed such that the image data decompression section 8 identifies, from the field identification information, a field which makes an object of the still picture decompression processing, writes the corresponding variable length data into one of the field memories corresponding to the field identification information, and reads out the variable length data from one of the field memories different from that field memory with which writing is proceeding. Since the image data decompression section 8 can identify, from the field identification information, the field which makes an object of the still picture decompression processing, write the corresponding variable length data into one of the field memories corresponding to the field identification information, and read out the variable length data from one of the field memories different from that field memory with which writing is proceeding, the field identification information can be processed together with the decompression processing of the variable length data.

Figure 2:
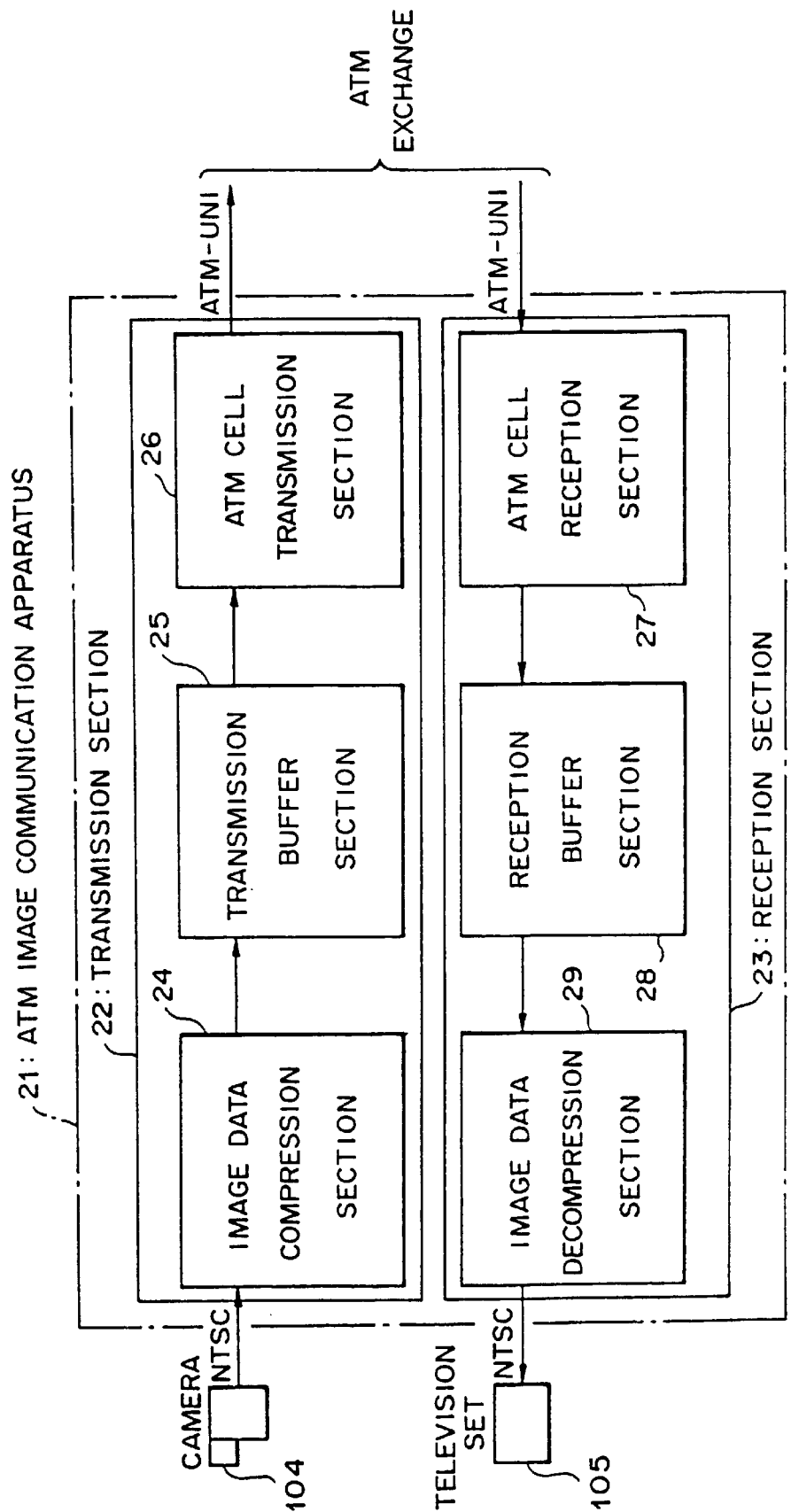
FIG. 2 is a block diagram of an ATM image communication system showing a preferred embodiment of the present invention.
Figure 53:
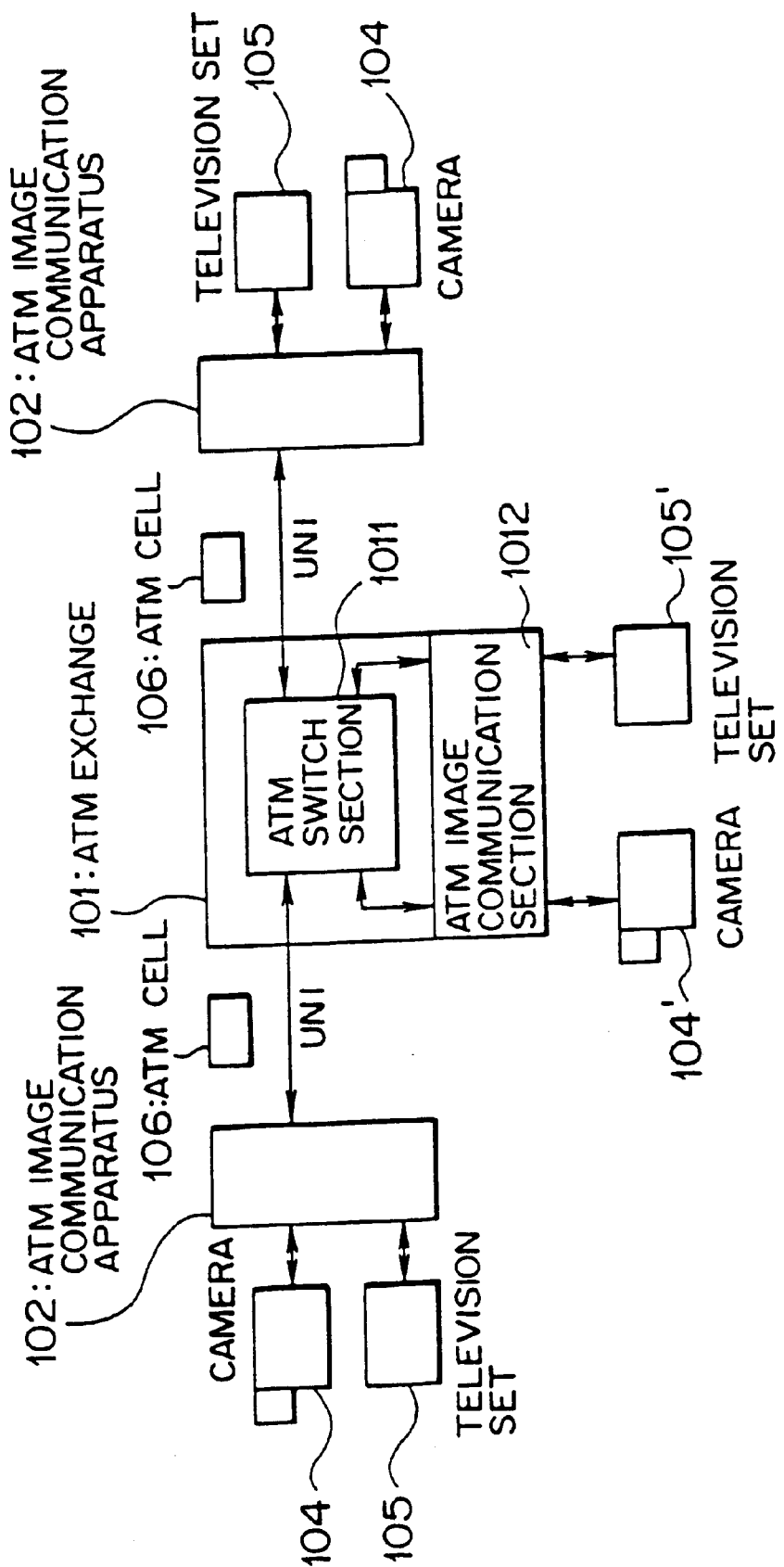
FIG. 53 is a block diagram showing an example of an image communication system which makes use of an ATM network.
Figure 54:
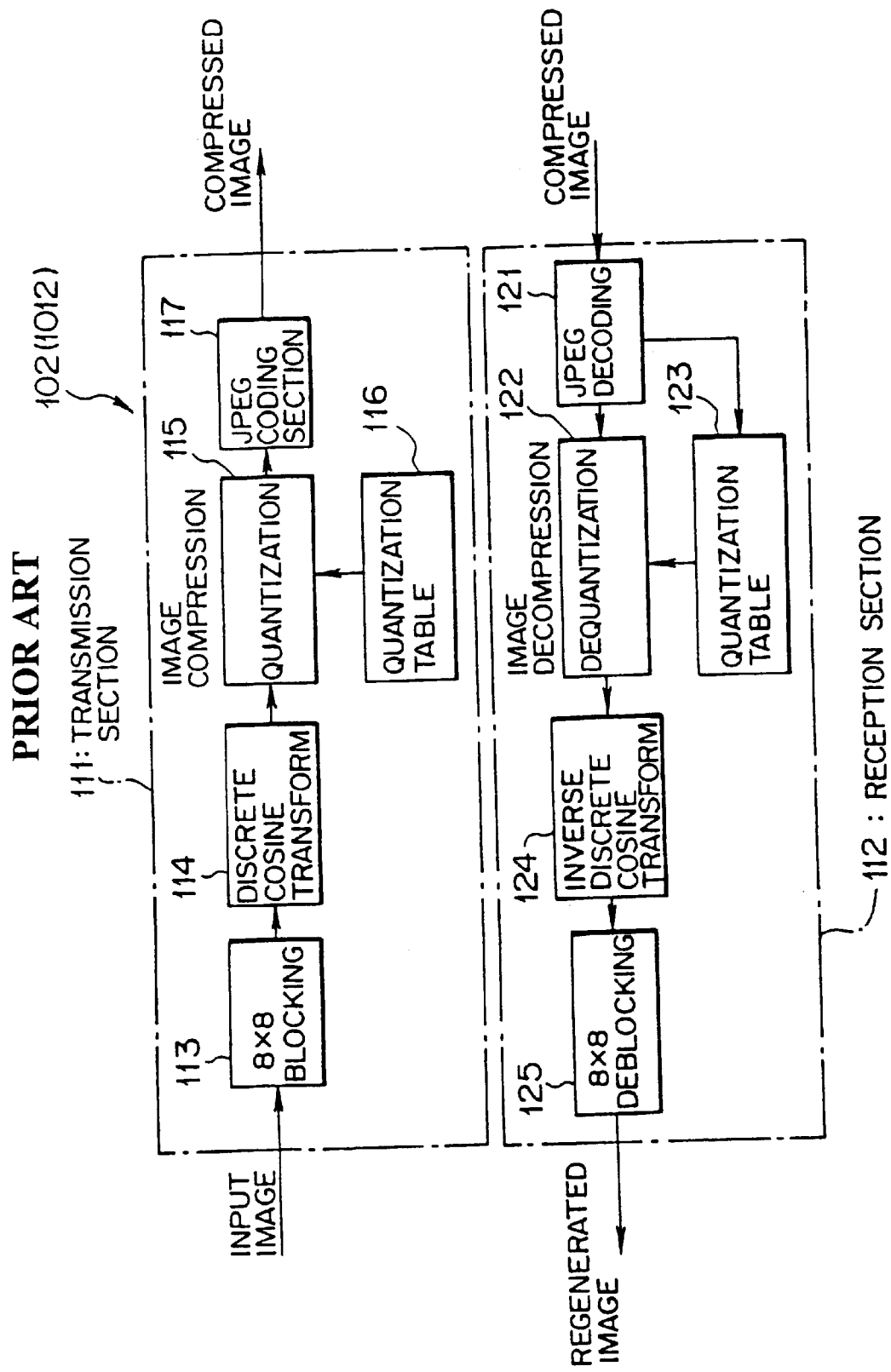
FIG. 54 is a block diagram showing an example of an image communication system which makes use of a JPEG system.
Figure 55:
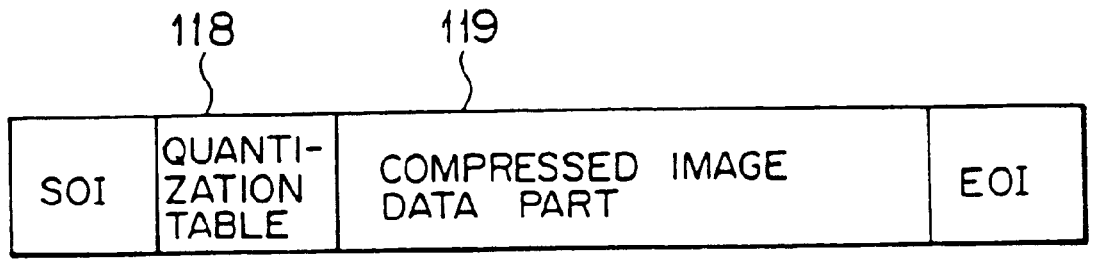
FIG. 55 is a diagrammatic view showing an example of a frame format used in the JPEG system.
Figure 56:
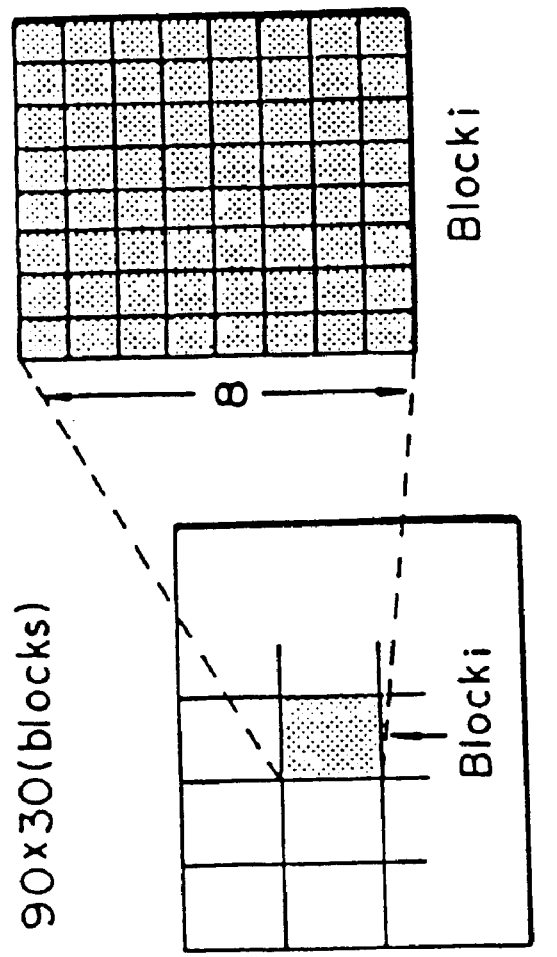
FIGS. 56 and 57 are diagrammatic views illustrating 8×8 blocking processing.
Figure 57:
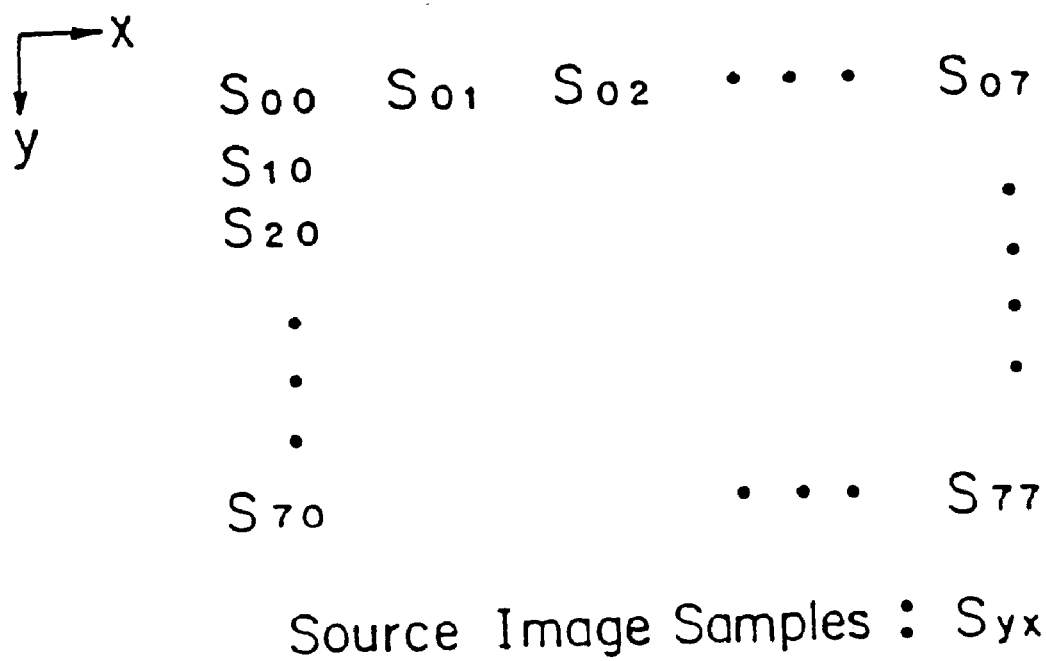
Figure 58:
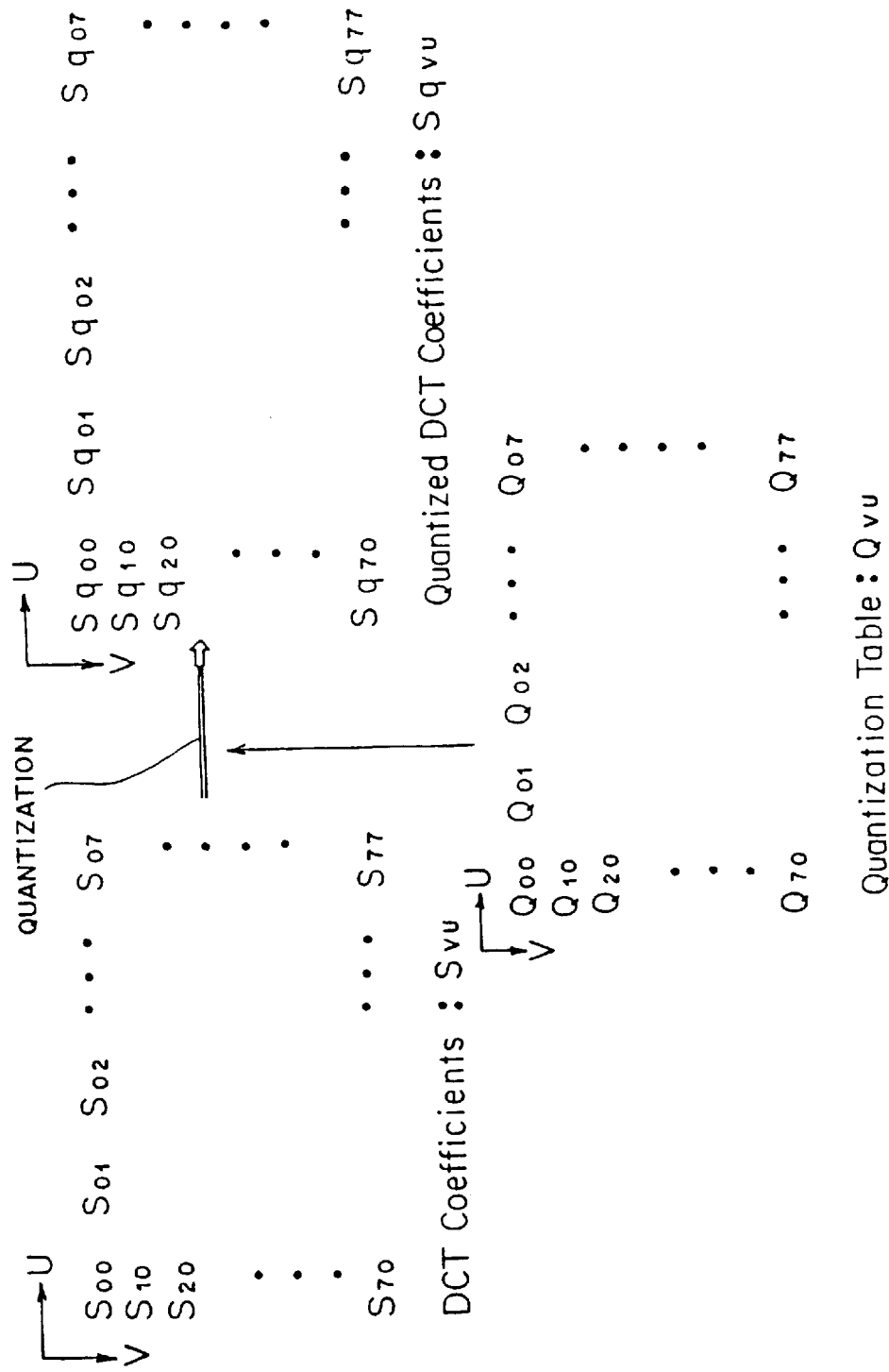
FIG. 58 is a diagrammatic view illustrating a relationship among DCT coefficients $S_{VU}$, quantization step sizes $Q_{VU}$ and quantization DCT coefficients $Sq_{VU}$.
Figure 59:
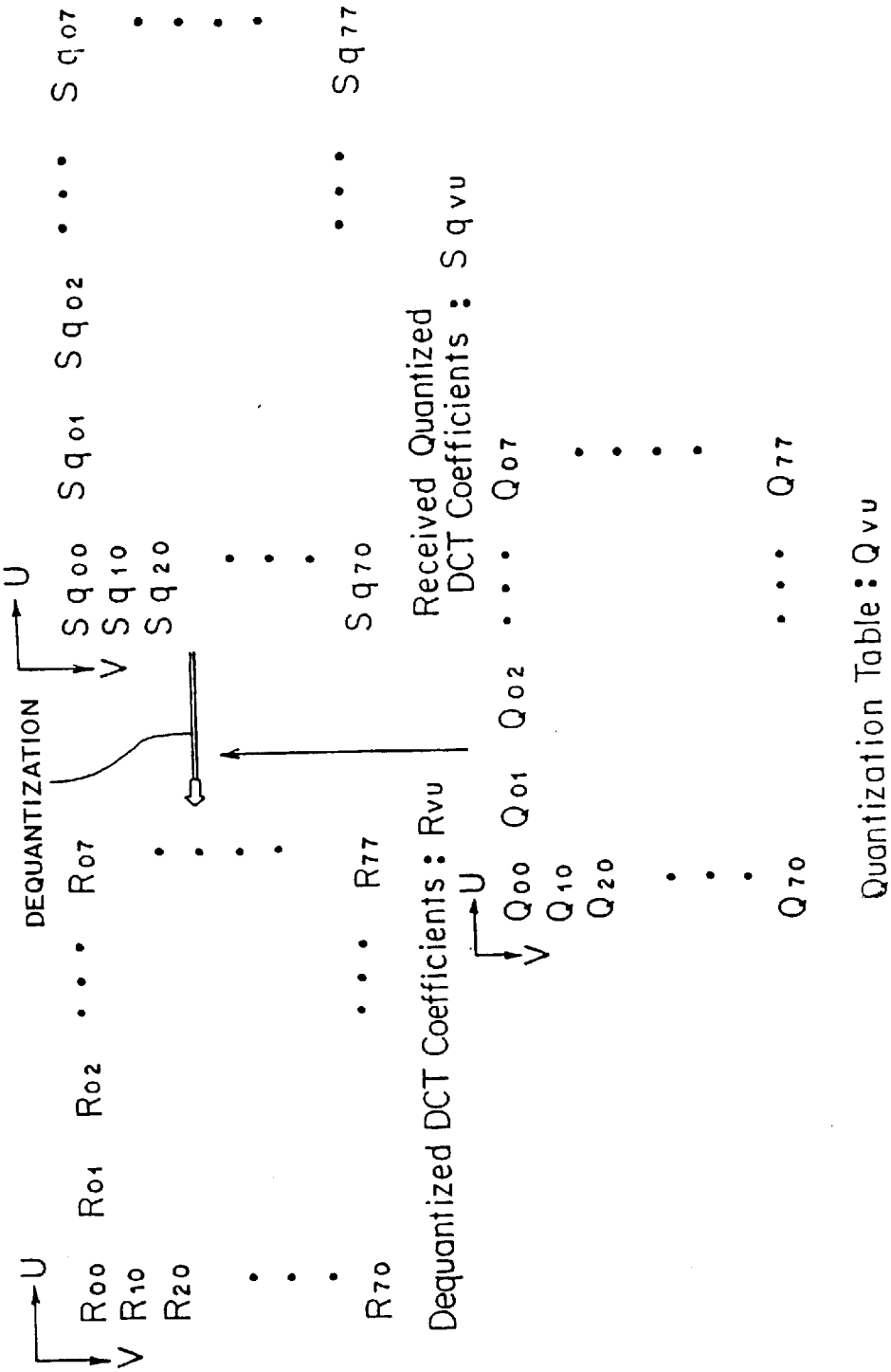
FIG. 59 is a diagrammatic view illustrating a relationship among dequantization DCT coefficients $R_{VU}$, quantization step sizes $Q_{VU}$ and received quantization DCT coefficients $Sq_{VU}$.

In this instance, the image data decompression section 8 may include a till picture switch for stopping writing of the variable data into the field memories, and be constructed such that, when an operation to stop writing of the variable length data into the field memories is performed by the still picture switch, only writing of the variable length data into any of the field memories is stopped so that original moving picture data regenerated last are displayed as a still picture. Consequently, when the operation to stop writing of the variable length data into the field memories is performed by the still picture switch, the image data decompression section 8 stops only writing of the variable data into the field memories so that original moving picture data regenerated last can be displayed as a still picture. Accordingly, a still picture can be displayed at an arbitrary timing with a very simple construction.

b. Embodiment of the Invention b-1. General Construction of Image Communication Apparatus FIG. 2 shows in block diagram an ATM (Asynchronous Transfer Mode) image communication apparatus according to a preferred embodiment of the present invention. Referring to FIG. 2, the ATM image communication apparatus is generally denoted at 21 and corresponds to the ATM image communication apparatus 102 (or ATM image communication section 1012) described hereinabove with reference to FIG. 53. The ATM image communication apparatus 21 includes a transmission section 22 including an image data compression section 24, a transmission buffer section 25 and an ATM cell transmission section 26, and a reception section 23 including an ATM cell reception section 27, a reception buffer section 28 and an image data decompression section 29.

In the transmission section (transmission apparatus for fixed length cell handling type image communication) 22, the image data compression section 24 performs, for moving picture data of an NTSC signal from a camera 104, that is, screen information for 30 frames per unit time to be divided each into an odd-numbered frame and an even-numbered frame to be transmitted successively, required still picture compression processing (in the present embodiment, JPEG (Joint Photographic coding Experts Group) image compression processing which is a kind of intra-field compression processing) in response to field timing information indicating the number of fields to be compressed per unit time in order to convert the moving picture data into VBR (Variable Bit Rate) data (variable length data) which are independent of each other.

Figure 61:
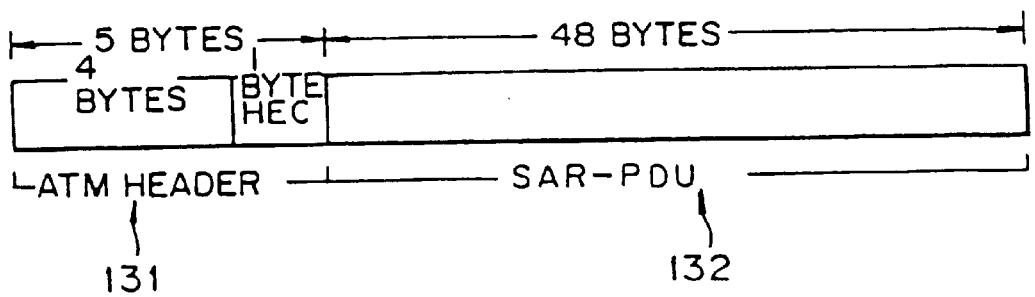
FIG. 61 is a diagrammatic view showing an example of a format of an ATM cell.

The transmission buffer section 25 converts VBR data for each field obtained by the image data compression section 24 into CBR (Constant Bit Rate) data (fixed length data) having a fixed transmission rate. The ATM cell transmission section (fixed length cell transmission section) 26 places the field timing information and the CBR data mentioned above into the SAR-PDU (data part) of each of ATM cells described hereinabove with reference to FIG. 61 and transmits the ATM cells, or in other words, the ATM cell transmission section 26 produces ATM cells (fixed length cells) for the AAL 1 (ATM Adaptation Layer 1) for use for CBR data transfer based on the field timing information and the CBR data and transmits the ATM cells.

Figure 62:
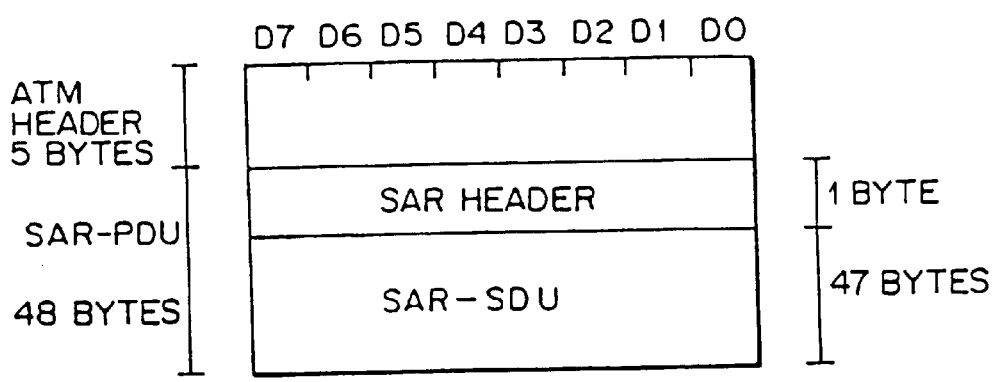
FIG. 62 is a diagrammatic view showing an example of a format of an SAR-PDU.
Figure 63:
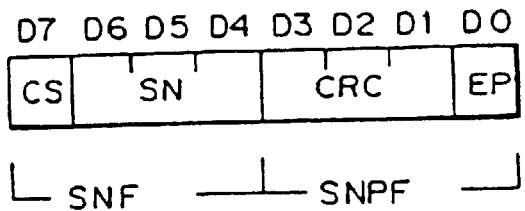
FIG. 63 is a diagrammatic view sowing an example of a format of an SAR header.
Figure 65:
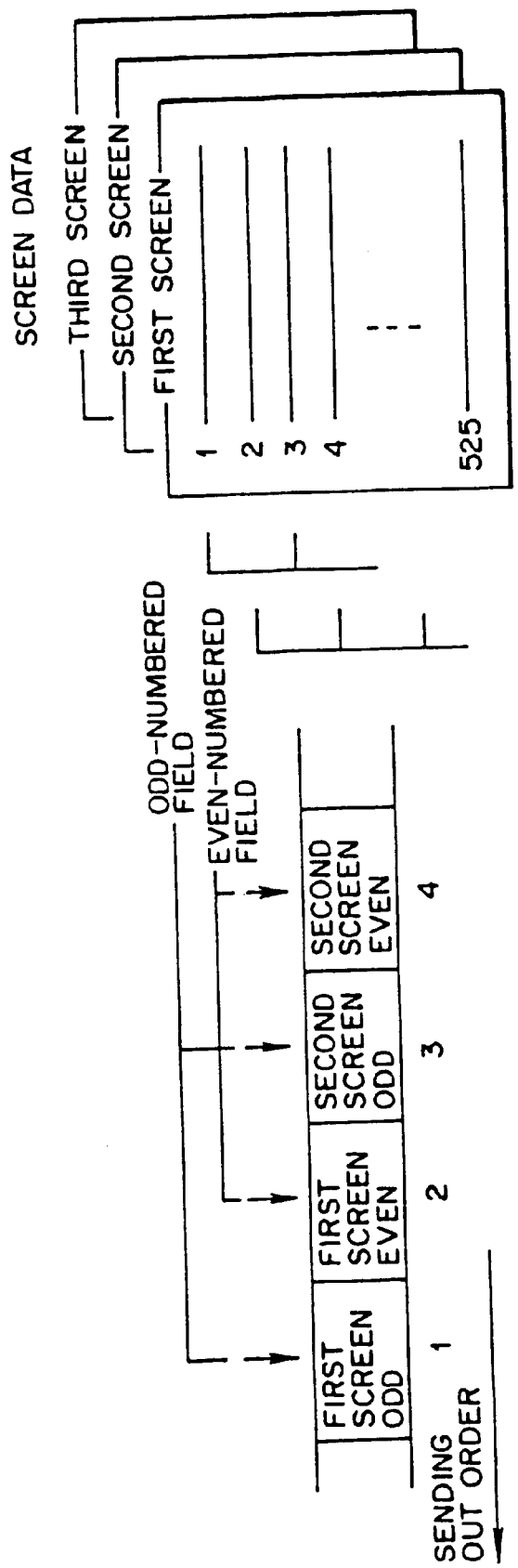
FIG. 65 is a diagrammatic view illustrating the NTSC color television system.
Figure 66:
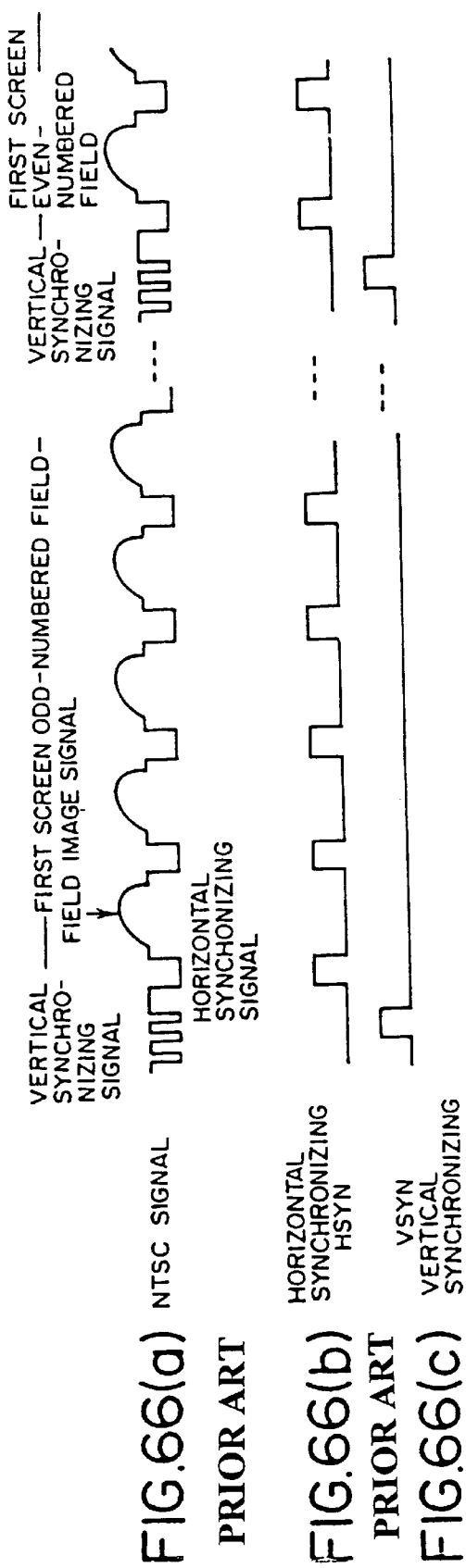
FIGS. 66(a) to 66(c) are timing charts illustrating an NTSC signal.
Figure 67:
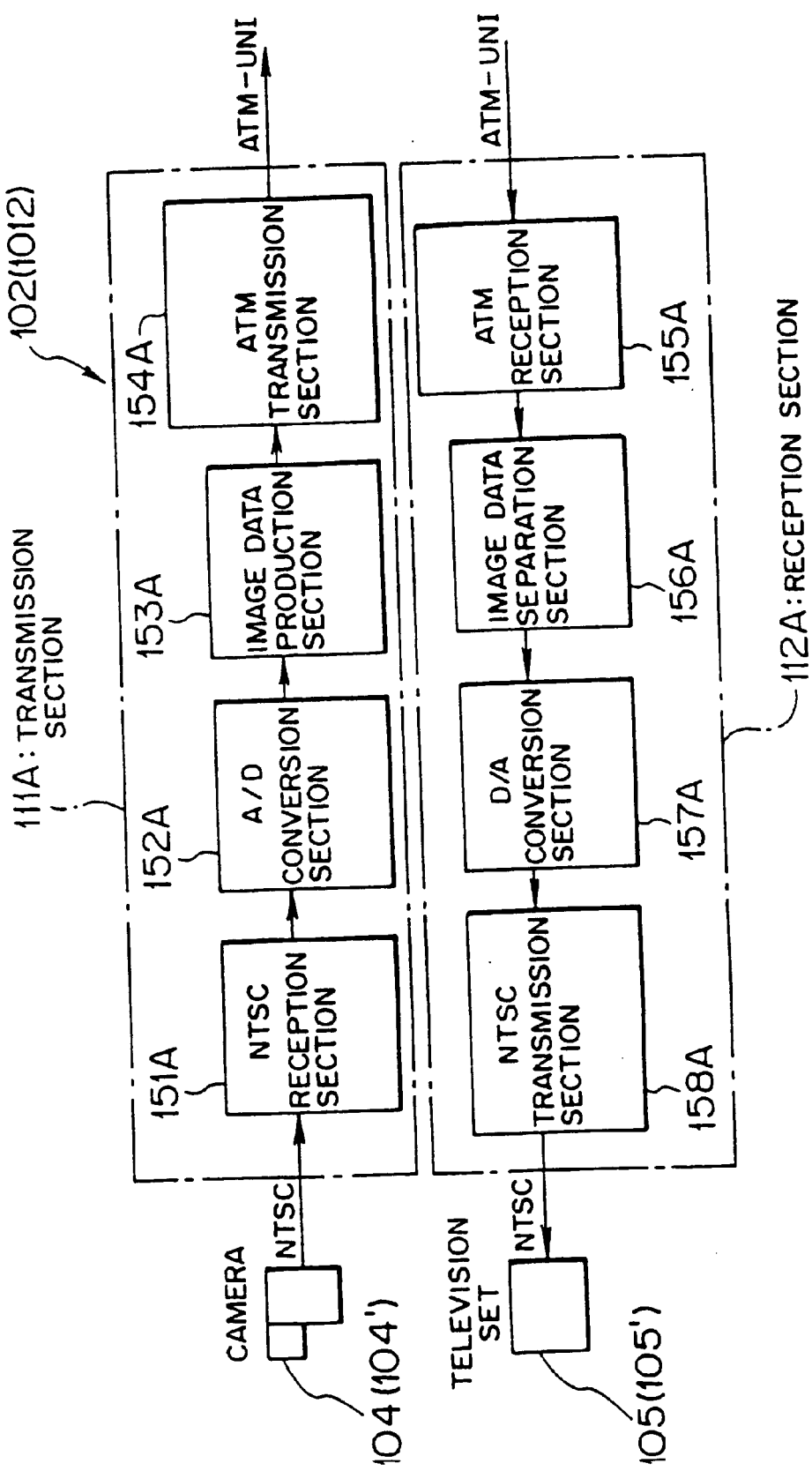
FIG. 67 is a block diagram showing a construction of an ATM image communication apparatus which employs a non-compression method.
Figure 68:
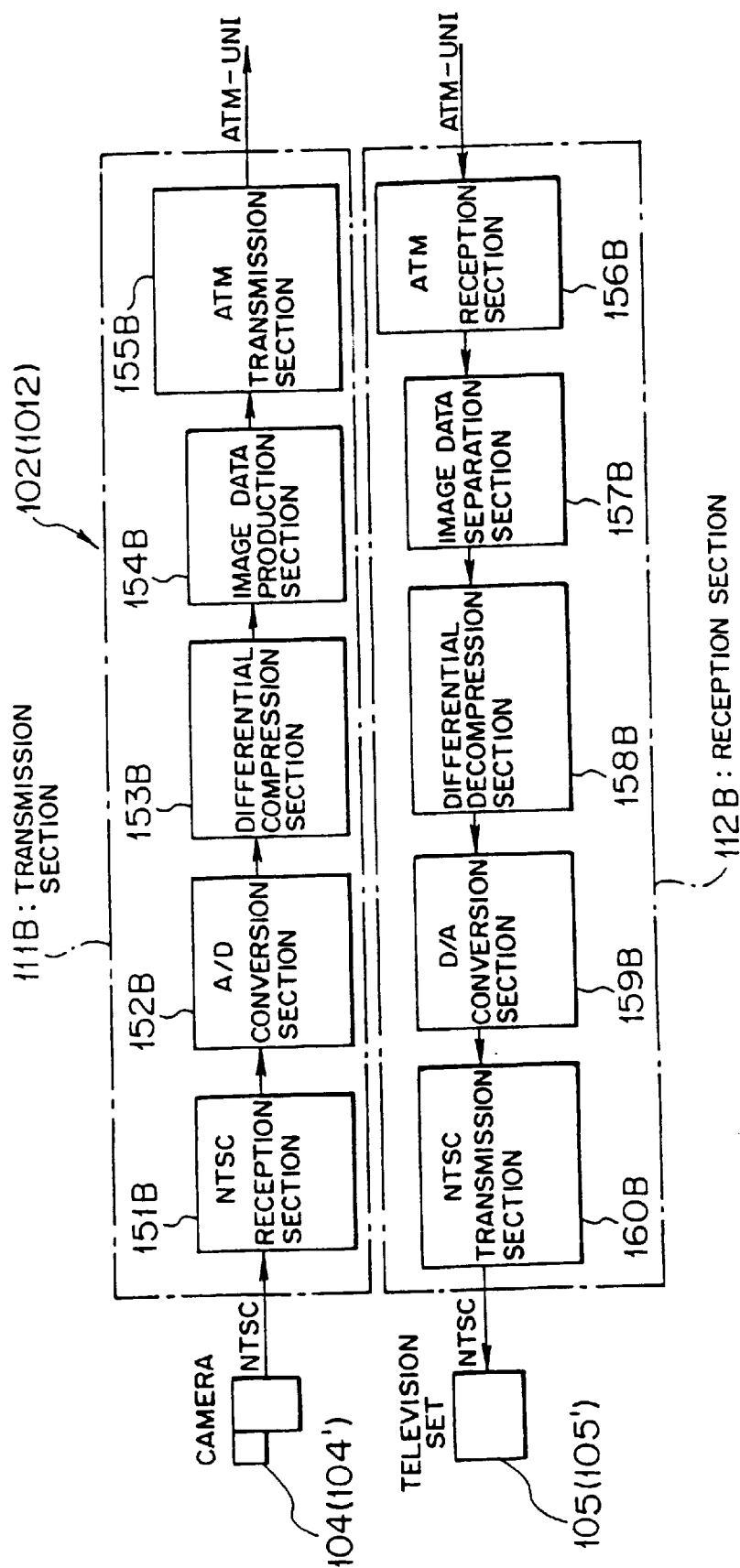
FIG. 68 is a block diagram showing a construction of an ATM image communication apparatus which employs a differential compression method.
Figure 69:
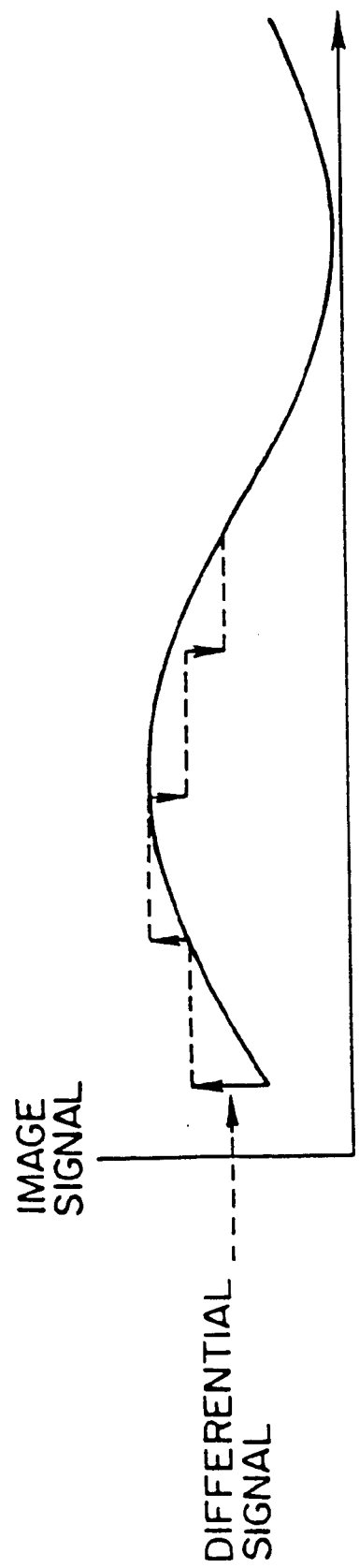
FIG. 69 is a diagram illustrating operation of the ATM image communication apparatus of FIG. 68.
Figure 70:
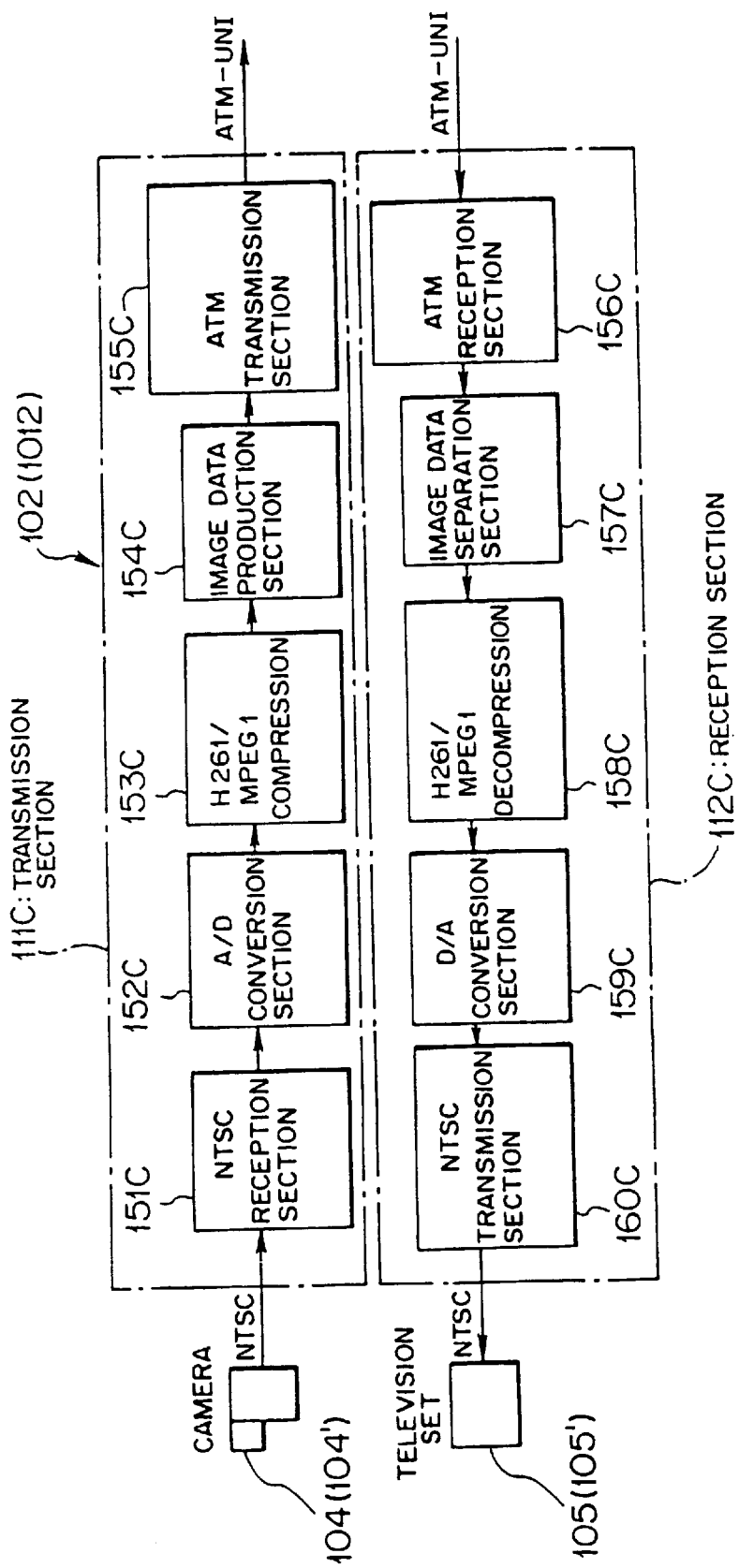
FIG. 70 is a block diagram showing a construction of an ATM image communication apparatus which employs an H261/MPEG 1 system.
Figure 71:
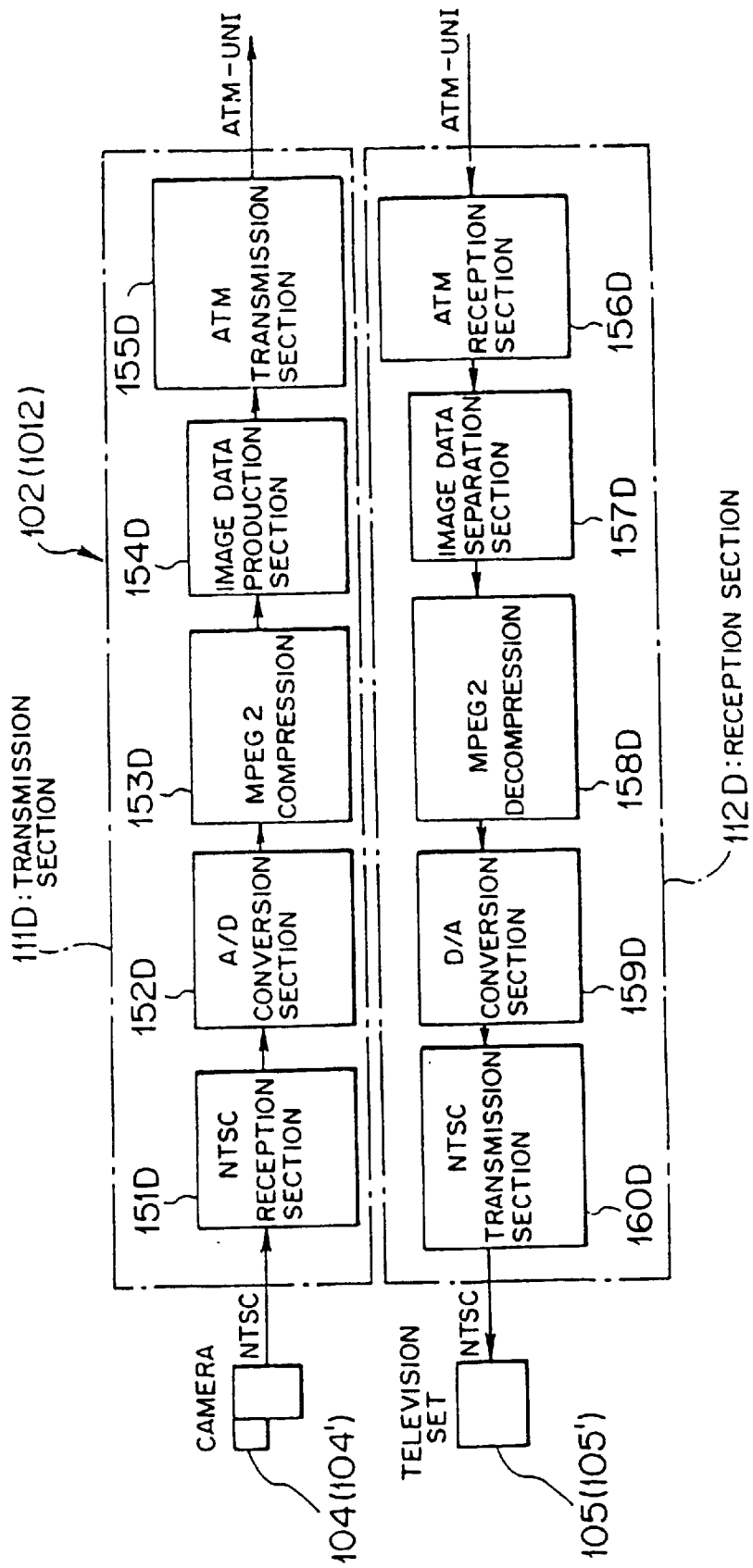
FIG. 71 is a block diagram showing a construction of an ATM image communication apparatus which employs an MPEG 2 system.
Figure 72:
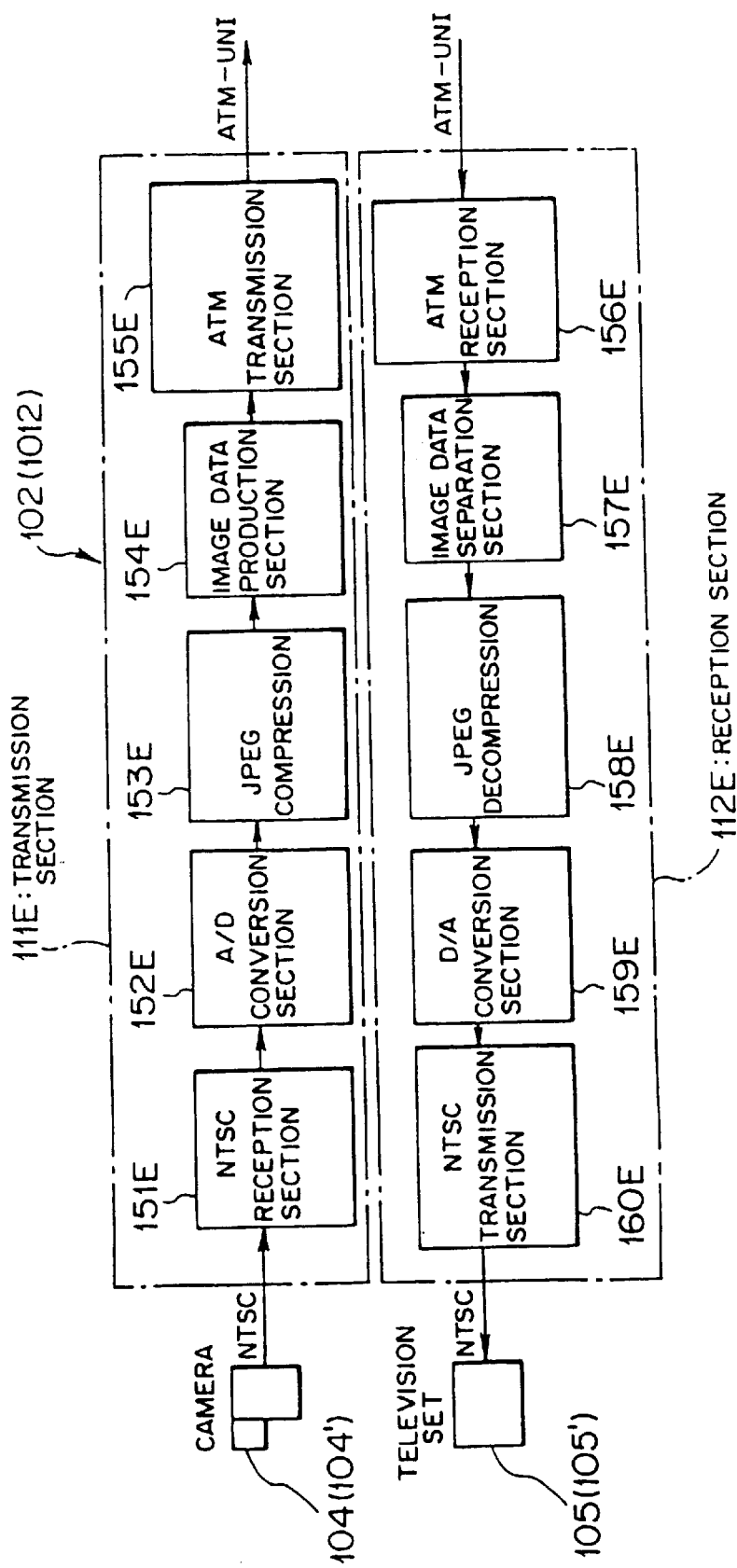
FIG. 72 is a block diagram showing a construction of an ATM image communication apparatus which employs a JPEG system.

Particularly, the field timing information then is placed into the SAR header part in the SAR-PDU as described hereinabove with reference to FIG. 64 whereas the CBR data are placed into the SAR-SDU part in the SAR-PDU shown in FIG. 62.

On the other hand, in the reception section (reception apparatus for fixed length cell handling type image communication) 23, the ATM cell reception section 27 receives ATM cells transmitted thereto from the transmission section 22 of the other party side of the communication and regenerates, from each of the ATM cells, CBR data included in the ATM cell and field timing signal indicating a compression timing of each field.

The reception buffer section 28 converts, based on the field timing signal regenerated by the ATM cell reception section 27, the CBR data from the ATM cell reception section 27 into VBR data which are independent of each other for each field. The image data decompression section 29 performs required image decompression processing (in the present embodiment, JPEG image decompression processing which is a kind of intra-field decompression processing) for the VBR data from the reception buffer section 28 to regenerate an NTSC signal (original moving picture data) from the camera 104 of the other party side of the communication so that the moving pictures may be displayed on a television set 105.

In the ATM image communication apparatus 21 having the construction described above, an NTSC signal (moving picture data) from the camera 104 is subject to JPEG image compression processing in response to field timing signal indicating a compression timing of each field by the image data compression section 24 of the transmission section 22 so that it is converted into VBR data which are independent of each other. Consequently, compressed image data are produced.

Then, since each VBR data cannot be converted into ATM cells because the amount of data is different among different fields, the VBR data is converted into CBR data having a fixed transmission rate by the transmission buffer section 25. Then, the CBR data and the field timing signal are placed into the data part (SAR-PDU) of each ATM cell and sent out as an ATM cell to a transmission line (ATM-UNI). Consequently, the moving picture data are transmitted to the reception section 23 on the other party side of the communication.

In short, the transmission section 22 described above realizes the various functions of image compression processing, conversion processing from VBR data into CBR data, conversion into ATM cells and ATM cell transmission processing divisionally by the image data compression section 24, transmission buffer section 25 and ATM cell transmission section 26 provided therein.

Then, in the transmission section 22, since moving picture data to be transmitted are converted first into VBR data and then into CBR data by performing JPEG image compression processing in response to field timing information, the moving picture data can be compressed effectively using a JPEG compression system for still pictures and the moving picture data after such compression can be converted into ATM cells readily and transmitted asynchronously.

Accordingly, a transmission line for fixed length cells can be utilized very efficiently. Further, in this instance, since CBR data and field timing information can be sent out in the form of an ATM cell, moving picture data compressed by JPEG image compression processing can be regenerated with certainty and at a high rate on the reception side, and consequently, real time communication can be realized.

Further, since image compression processing for moving picture data is performed by JPEG image compression processing in this manner, various advantages of the JPEG such as a high compression ratio, a good picture quality, a simple circuit construction, production in a small size at a low cost and a short image processing time can be made the most of. Thus, real time communication which is required, for example, for a television conference system can be realized very readily.

Further, since CBR data and field timing information are transmitted in ATM cells, that is, making use of the AAL 1 as described hereinabove, automatic conversion into ATM cells by the ATM cell transmission section 26 can be realized by hardware of an ATM cell assembly section 26-7 to allow high speed processing as hereinafter described with reference to FIG. 23.

Further, since the image compression processing by the transmission section 22 then is performed using a JPEG system which involves compression of still picture data, the various advantages of the JPEG system such as a high compression ratio, a good picture quality, a simple circuit construction, production in a small size at a low cost and a short image processing time can be made the most of. Thus, real time communication which is required, for example, for a television conference system can be realized very readily.

On the other hand, in the reception section 23, basically reverse processing to that performed by the transmission section 22 described above is performed. In particular, from each of ATM cells transmitted thereto, the ATM cell reception section 27 regenerates CBR data and field timing information for each field included in the ATM cell.

Then, each CBR data thus regenerated is converted in response to the field timing signal information reproduced by the ATM cell reception section 27 into VBR data, which are independently for each field, by the reception buffer section 28. Then, the VBR data are subject to JPEG image decompression processing by the image data decompression section 29 so that the original moving picture data (NTSC signal) are regenerated. The original moving picture data thus regenerated are outputted to the television set 105.

In short, similarly to the transmission section 22, also the reception section 23 described above realizes the various functions of ATM cell reception processing, conversion processing from CBR data into VBR data and image decompression processing divisionally by the ATM cell reception section 27, reception buffer section 28 and image data decompression section 29 provided therein.

In this manner, in the reception section 23 described above, since an NTSC signal is regenerated by regenerating CBR data and field timing information from received ATM cells and performing JPEG image compression processing for the image data (VBR data) in response to the regenerated field timing information, moving picture data after compression in the form of ATM cells can be received asynchronously, and moving picture data can be decompressed (regenerated) effectively using a JPEG compression system for still pictures.

Accordingly, the band of the transmission line (ATM-UNI) for ATM cells can be utilized very efficiently. Further, in this instance, since CBR data and field timing information are received in the form of ATM cells, an NTSC signal compressed using a JPEG compression system for still pictures can be regenerated with certainty and at a high rate, and consequently, real time communication can be realized.

Further, since CBR data and field timing information are placed in the data part of a received ATM cell as described above, that is, since an ATM cell is received making use of the AAL 1 for CBR data transfer, processing of extracting CBR data from an ATM cell (decomposition of an ATM cell) can be realized by hardware of an ATM cell decomposition section 27-1 as hereinafter described with reference to FIG. 27 to allow high rate processing.

Further, in this instance, since also image decompression processing by the transmission section 22 is performed using the JPEG system, the various advantages of the JPEG system such as a high compression ratio, a good picture quality, a simple circuit construction, a small size at a low cost and a short image processing time can be made the most of. Thus, real time communication which is required, for example, for a television conference system can be realized very readily.

In the following, various components of the transmission section 22 and the reception section 23 will be described individually in detail.

b-2. Transmission Section b-2-1. Image Data Compression Section

Figure 3:
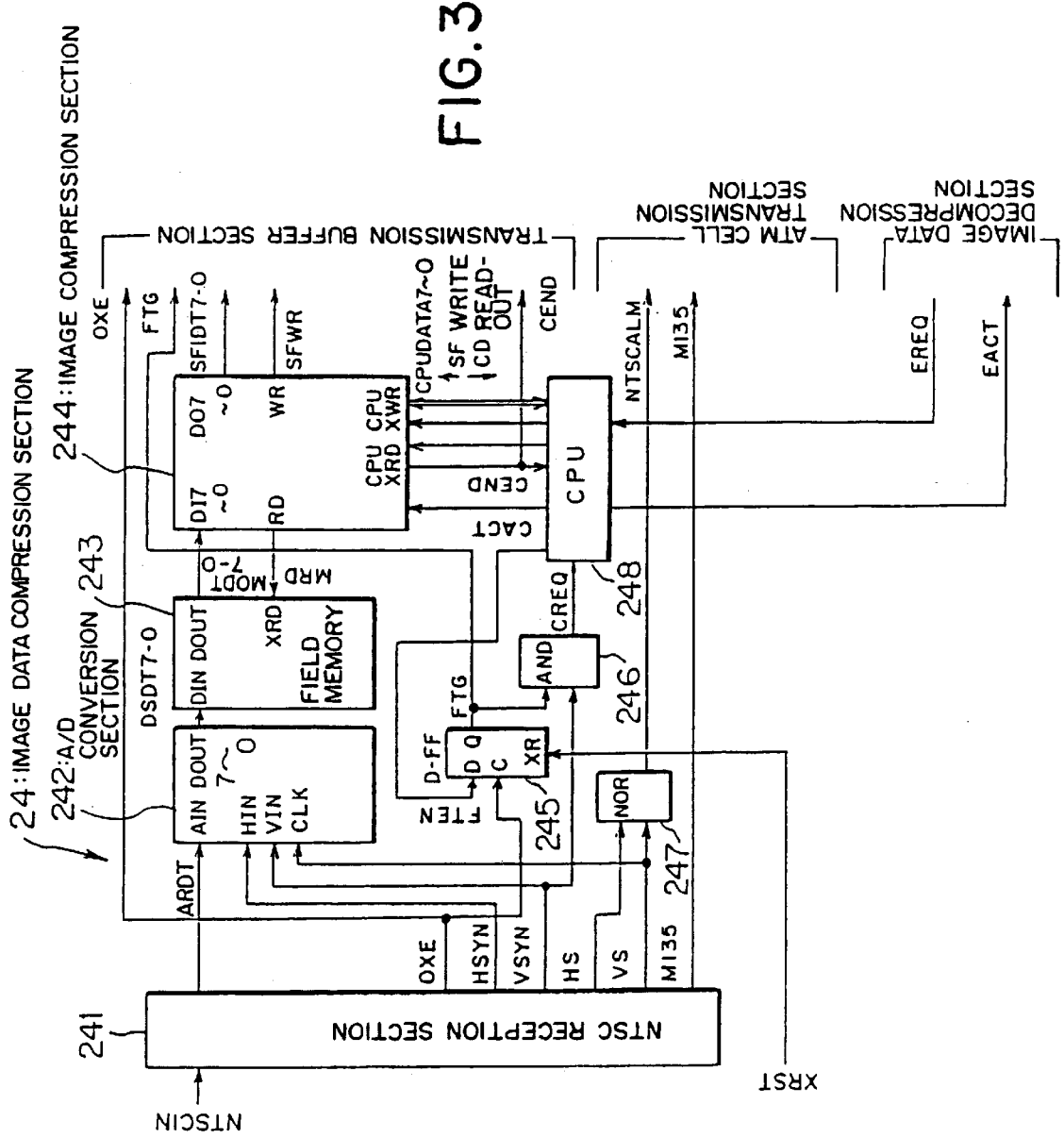
FIG. 3 is a block diagram showing a detailed construction of an image data compression section in the ATM image communication system of FIG. 2.

FIG. 3 shows in block diagram a detailed construction of the image data compression section 24 described above. Referring to FIG. 3, the image data compression section 24 includes an NTSC reception section 241, an analog to digital (A/D) conversion section 242, a field memory 243, an image compression section 244, a field timing gate (D-FF) 245, an AND gate 246, a NOR gate 247 and a CPU 248.

Figure 4:
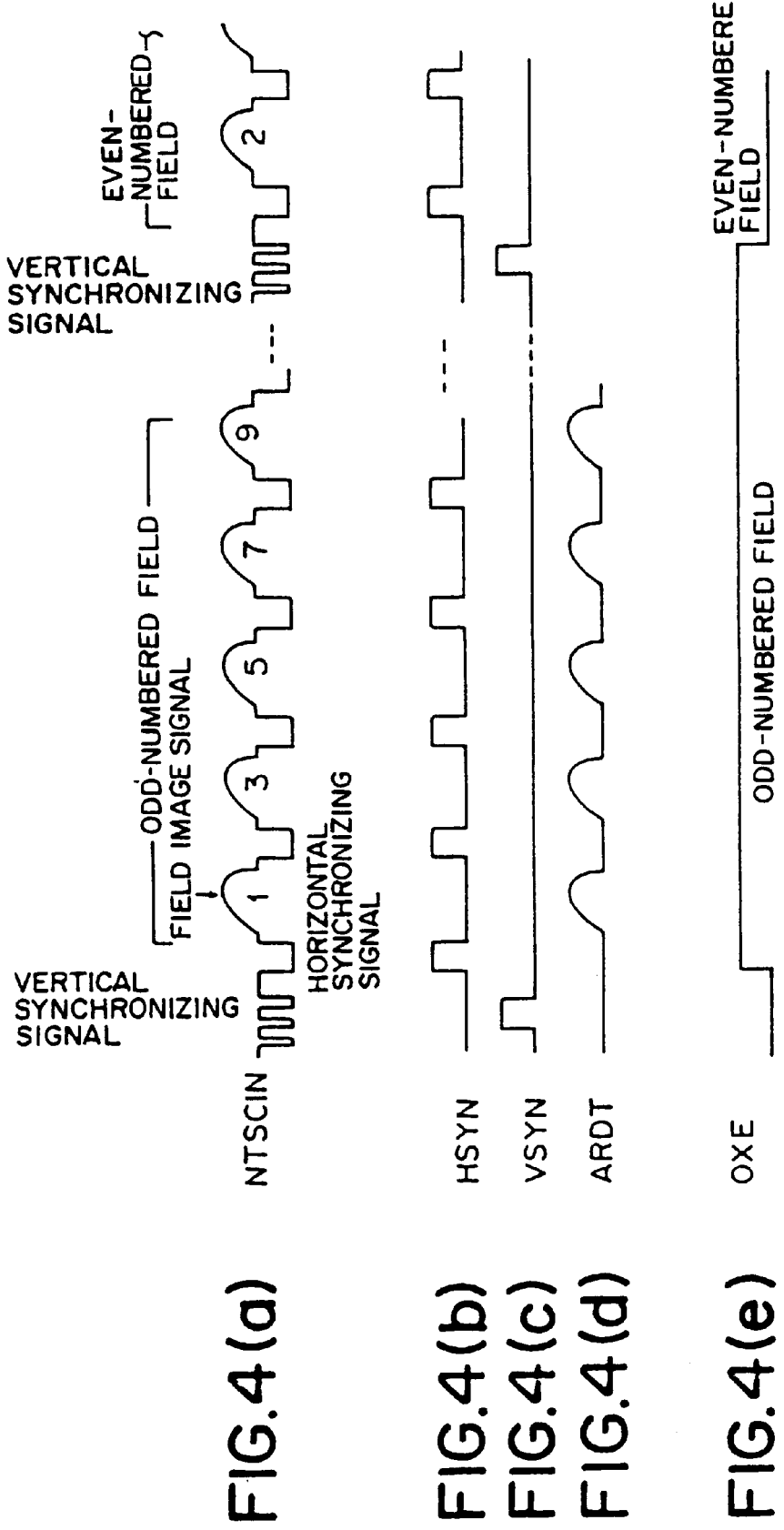
FIGS. 4(*a*) to 4(*e*) are timing charts illustrating an example of operation of an NTSC reception section in the ATM image communication system of FIG. 2.

It is to be noted that abbreviated words in alphabet appearing in FIG. 3 denote as follows:

NTSCIN: NTSC input signal
FTEN: field timing enable signal
ARDT: received analog data
OXE: odd-/even-numbered (ODD/EVEN) field signal
CREQ: compression request signal
HSYN: horizontal synchronizing signal
CACT: compression start signal
VSYN: vertical synchronizing signal
CEND: compression end signal
HS: horizontal synchronism state signal
VS: vertical synchronism state signal
DSDT7 to DSDT0: digital transmission data
M135: basic sampling clock signal
MODT7 to MODT0: memory output data
MRD: memory read signal
NTSCALM: NTSC alarm signal
SFIDT7 to SFIDT0: TRANSMISSION FIFO INPUT DATA
CD: compression image data amount
SFWR: transmission FIFO write signal
SF: scaling factor value
XRST: reset signal
CPUDATA7 to CPUDATA0: CPU data bus signal
EREQ: decompression request signal
CPUXRD: CPU read-out signal
EACT: decompression start signal
CPUXWR: CPU write signal When an NTSC signal is received from the camera 104, the NTSC reception section 241 described above separates, from the NTSC input signal NTSCIN in which a horizontal synchronizing signal HSYN, a vertical synchronizing signal VSYN and received analog data ARDT (a field image signal) are frequency multiplexed, for example, as seen in FIG. 4(*a*), the horizontal synchronizing signal HSYN, vertical synchronizing signal VSYN and received analog data ARDT in such a manner as seen in FIGS. 4(*b*) to 4(*d*), respectively. Further, the NTSC reception section 241 produces such an odd-/even-numbered field signal OXE representing odd-/even-number distinction of a field as seen in FIG. 4(*e*) from the NTSC input signal NTSCIN.

The analog to digital conversion section 242 converts the received analog data ARDT separated as seen in FIG. 4(*d*) by the NTSC reception section 241 into digital transmission data DSDT7 to DSDT0 of a predetermined level based on the horizontal synchronizing signal HSYN and the vertical synchronizing signal VSYN separated in such a manner as seen in FIGS. 4(*b*) and 4(*c*) and a basic sampling clock signal M135 from the NTSC reception section 241. The field memory 243 successively stores the digital transmission data DSDT7 to DSDT0 from the analog to digital conversion section 242.

Figure 20:
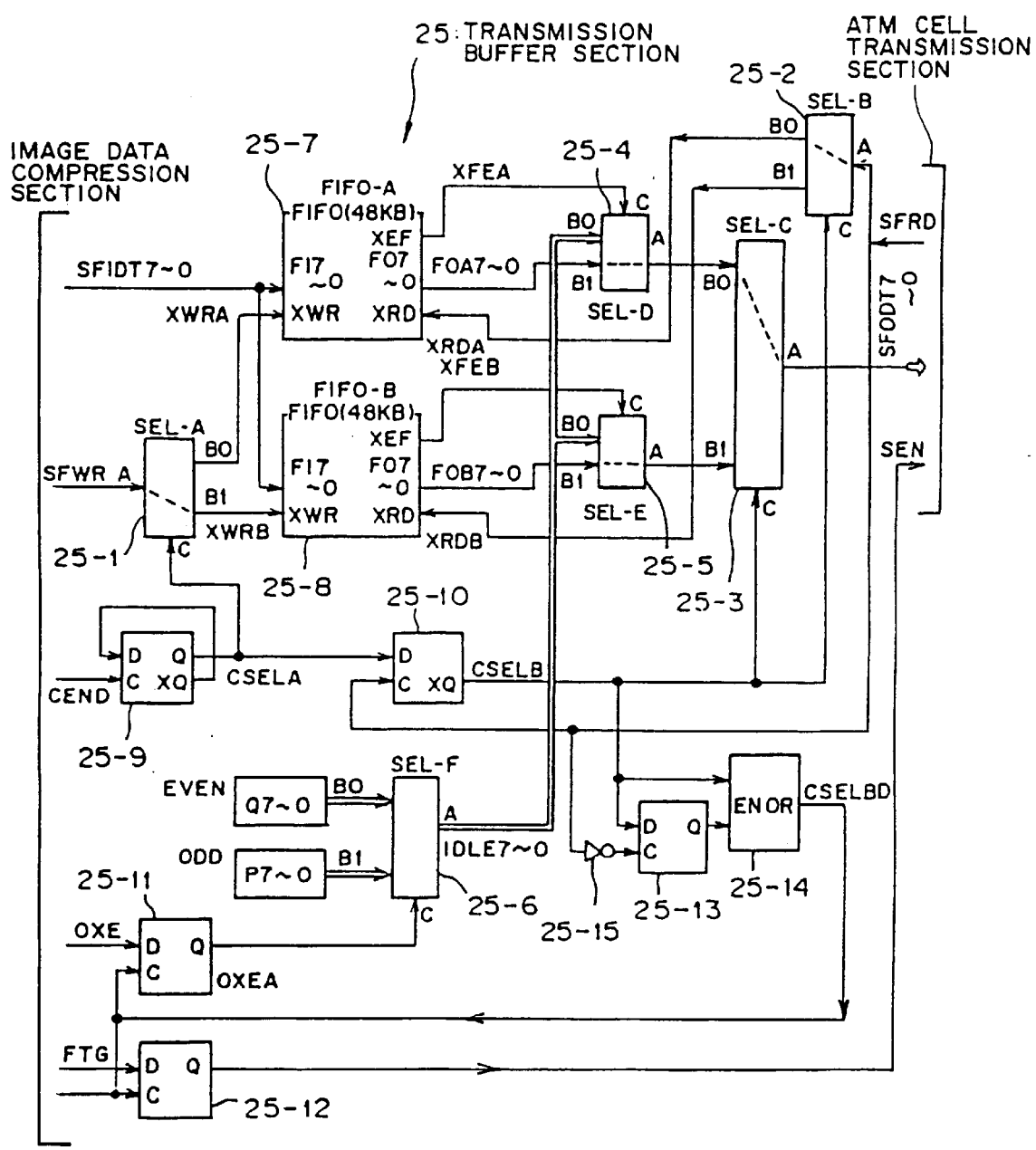
FIG. 20 is a block diagram showing a detailed construction of a transmission buffer section in the ATM image communication system of FIG. 3.

The image compression section 244 outputs a memory read signal MRD to the field memory 243 in response to a compression start signal CACT received from the CPU 248 to successively read out the digital transmission data DSDT7 to DSDT0 stored in the field memory 243, performs JPEG image compression processing for the digital transmission data DSDT7 to DSDT0 based on a scaling factor value SF for compression ratio adjustment written in by the CPU 248 to obtain compressed data (VBR data) which are independent of each other for each field, and outputs the compressed data as transmission FIFO input data SFIDT7 to SFIDT0 to be written into transmission FIFO (First-In First-Out) memories 25-7 and 25-8 of the transmission buffer section 25, which will be hereinafter described with reference to FIG. 20, to the transmission buffer section 25 together with a transmission FIFO write signal SFWR.

After image compression processing for the digital transmission data DSDT7 to DSDT0 for one field is completed, the image data compression section 24 notifies this using a compression end signal CEND to the CPU 248 and outputs a compressed image data amount CD for one field (per a unit field) to the CPU 248. Consequently, the CPU 248 performs, each time image compression processing is completed, updating and writing processing of the scaling factor value SF based on the compressed image data amount CD to adjust the compression ratio for each field as hereinafter described.

The field timing gate 245 begins to output a field timing signal FTG at a point of time when an odd-numbered field signal from the NTSC reception section 241 first changes to the H level after the compression start signal CACT is received from the CPU 248. The AND gate 246 logically ANDs the vertical synchronizing signal VSYN from the NTSC reception section 241 and the field timing signal FTG from the field timing gate 245. Here, when the vertical synchronizing signal VSYN and the field timing signal FTC both change to exhibit the high level, the AND gate 246 outputs a compression request signal CREQ to request starting of image compression processing to the CPU 248.

The NOR gate 247 logically NORs a horizontal synchronism state signal HS and a vertical synchronism state signal VS from the NTSC reception section 241. Thus, if any one of the horizontal synchronism state signal HS and the vertical synchronism state signal VS goes out of synchronism (for example, changes to the L level), then the NOR gate 247 outputs an NTSC alarm signal NTSCALM to the ATM cell transmission section 26 so that transmission of ATM cells from the ATM cell transmission section 26 is stopped.

The CPU 248 outputs, in response to the compression request signal CREQ received from the AND gate 246, a compression start signal CACT to the image compression section 244 to start image compression processing by the image compression section 244. On the other hand, when the compression request signal CREQ is received from the image compression section 244, the CPU 248 reads out the compressed image data amount CD from the image compression section 244 in response to a CPU read-out signal CPUXRD, updates the scaling factor value SF for image compression processing for a next field based on the compressed image data amount CD and writes the updated scaling factor value SF into the image compression section 244 in response to a CPU write signal CPUXWR.

It is to be noted that the CPU 248 in the present embodiment serves also as a CPU for the image data decompression section 29 of the reception section 23 and outputs a decompression start signal EACT to the image data decompression section 29 in response to a decompression request signal EREQ received from the image data decompression section 29.

Subsequently, operation of the image data compression section 24 having the construction described above will be described.

First, since the NTSC input signal NTSCIN from the camera 104 is such an analog signal including a vertical synchronizing signal, a horizontal synchronizing signal and a field image signal as seen in FIG. 4(a), the NTSC reception section 241 produces, from the NTSC input signal NTSCIN, a horizontal synchronizing signal HSYN (refer to FIG. 4(b)), a vertical synchronizing signal VSYN (refer to FIG. 4(c)), received analog data ARDT (refer to FIG. 4(d)), a basic sampling clock signal M135, an odd-/even-numbered (ODD/EVEN) field signal OXE (refer to FIG. 4(e)), a horizontal synchronism state signal HS and a vertical synchronism state signal VS.

It is to be noted that, in the present embodiment, the basic sampling clock frequency $f_e$ is given by $f_e = 13.5$ (MHz)

and it has the following relationships with the horizontal synchronizing frequency $f_H$ and the vertical synchronizing frequency $f_U$:

$f_H = f_e/858$ $f_U = 2f_H/525$

Figure 5:
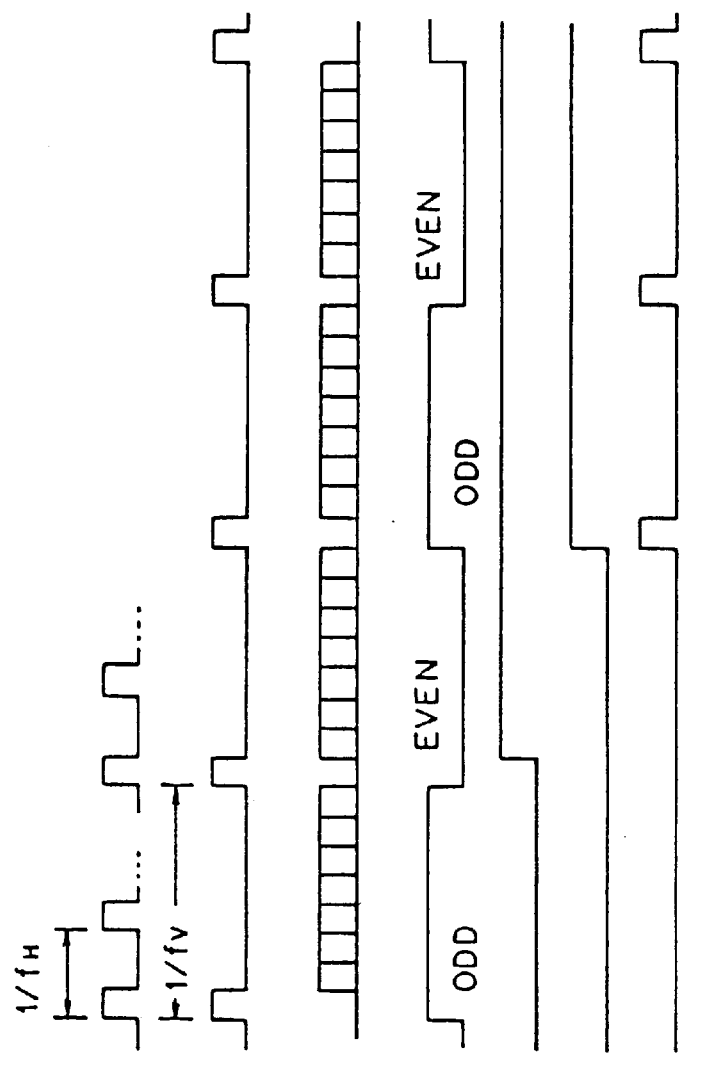
FIGS. 5(*a*) to 5(*g*) are timing charts illustrating an example of operation of the image data compression section of FIG. 3.

Further, the analog to digital conversion section 242 converts the received analog data ARDT produced by the NTSC reception section 241 into digital transmission data DSDT7 to DSDT0 (refer to FIG. 5(c)) and stores the digital transmission data DSDT7 to DSDT0 into the field memory 243. Meanwhile, in this instance, an image compression request signal CREQ to request compression of each field is produced by the field timing gate 245 and the AND gate 246 from the vertical synchronizing signal VSYN (refer to FIG. 5(b)) produced by the NTSC reception section 241.

In short, the image data compression section 24 starts compression of each field in response to the vertical synchronizing signal VSYN included in the NTSC signal as field timing signal indicating a compression timing of each field. Accordingly, the image compression timing of each field coincides with a field synchronizing signal of the NTSC signal, and compression processing can be performed with certainty for each field.

In this instance, after the CPU 248 changes over a field timing enable signal FTEN (refer to FIG. 5(e)) indicating starting of operation to the H level (H level pulse), the compression request signal CREQ (refer to FIG. 5(g)) is gated by the field timing gate 245 so that compression processing may begin with a first odd-numbered (ODD) field.

In short, the image data compression section 24 begins compression processing of still pictures for fields with a predetermined field, thereby eliminating the necessity for special information for identification of a field with which compression processing has been begun. Accordingly, on the reception side, odd-/even-number discrimination of a field with which compression starting has been begun can be performed automatically without the necessity for special processing.

Particularly, since image compression processing is begun with a first odd-numbered one of inputted fields in the image data compression section 24, it is only required on the reception side to begin decompression processing fixedly with an odd-numbered field. Consequently, the circuit of the reception section 23 can be simplified.

Figure 6:
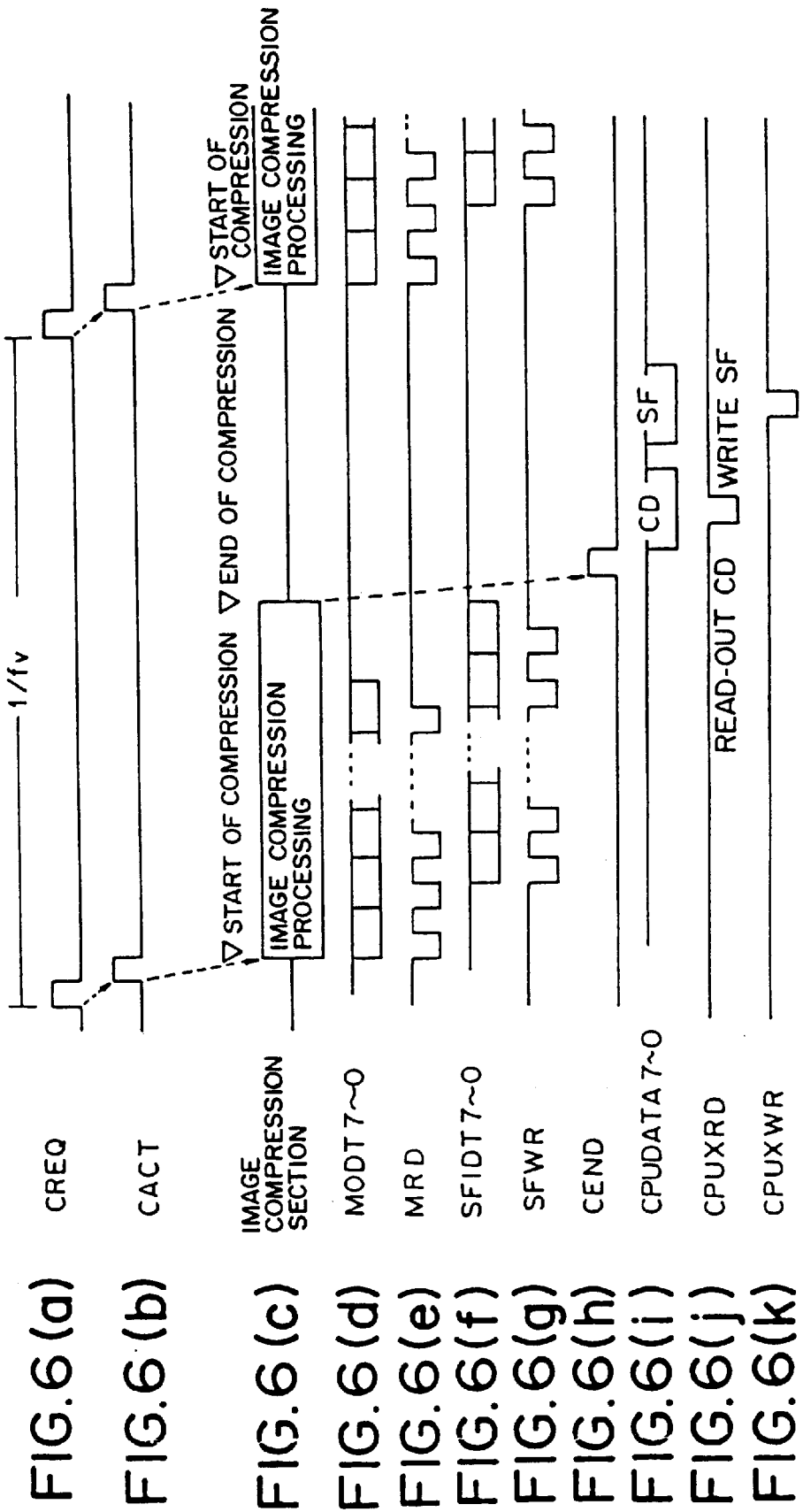
FIGS. 6(a) to 6(k) are timing charts illustrating another example of operation of the image data compression section of FIG. 3.

Then, when an H level pulse of the image compression request signal CREQ (refer to FIG. 6(a)) is inputted, the CPU 248 outputs a compression start signal CACT (refer to FIG. 6(b)) in order to request the image compression section 244 for compression of images.

When an H level pulse of the compression start signal CACT is inputted from the image data compression section 24, the image compression section 244 reads out memory output data MODT7 to MODT0 (refer to FIG. 6(d)) in response to the memory read signal MRD (refer to FIG. 6(e)), performs image compression processing of the memory output data MODT7 to MODT0 using an algorithm of the JPEG (refer to FIG. 6(c)) and then writes transmission FIFO input data SFIDT7 to SFIDT0 (refer to FIG. 6(f)) into the FIFO memory 25-7 or 25-8 of the transmission buffer section 25, which will be hereinafter described with reference to FIG. 20, in response to a transmission FIFO write signal SFWR (refer to FIG. 6(g)).

Thereafter, when an H level pulse of the compression end signal CEND (refer to FIG. 6(h)) indicating completion of compression of each field is inputted from the image compression section 244 to the CPU 248, the CPU 248 outputs a CPU read-out signal CPUXRD (refer to FIG. 6(j)) to read out the compressed image data amount CD (CPUDATA7 to CPUDATA0: refer to FIG. 6(i)) from the image compression section 244, performs calculation processing for a scaling factor for compression of a next field and outputs a CPU write signal CPUXWR (refer to FIG. 6(K)) to write the scaling factor value SF (CPUDATA7 to CPUDATA0, refer to FIG. 6(i)) into the image compression section 244. It is to be noted that details of processing of the CPU 248 will be hereinafter described.

Figure 7:
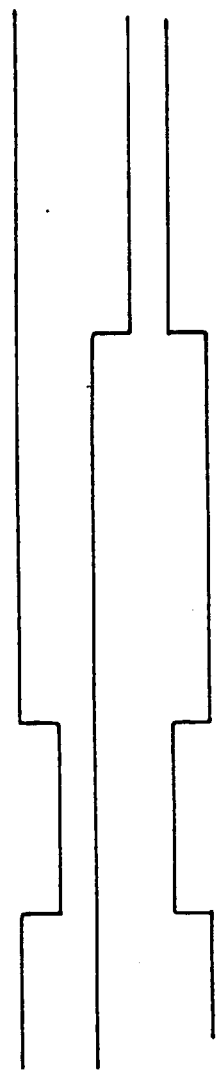
FIGS. 7(a) to 7(c) are timing charts illustrating a further example of operation of the image data compression section of FIG. 3.

By the way, if one of the horizontal synchronism state signal HS (refer to FIG. 7(a)) and the vertical synchronism state signal VS (refer to FIG. 7(b)) of the NTSC signal indicates going out of synchronism, then an NTSC alarm signal NTSCALM (refer to FIG. 7(c)) is outputted from the NOR gate 247 and notified to the ATM cell transmission section 26 so that sending out of ATM cells from the ATM cell transmission section 26 is stopped.

In short, if one of the vertical synchronism signal VSYN and the horizontal synchronizing signal HSYN included in the NTSC signal goes out of synchronism, then the image data compression section 24 produces an NTSC alarm signal NTSCALM indicating this and notifies it to the ATM cell transmission section 26 so that transmission of ATM cells by the ATM cell transmission section 26 is stopped. Accordingly, transmission of useless cells can be prevented, and useless charging of money can be prevented.

Subsequently, the processing of the CPU 248 described above will be described in more detail.

The CPU (scaling factor calculation processing section) 248 calculates, in order to adjust the compressed image data amount CD so that a possible good picture quality may be assured within the range of transmission permission values, the scaling factor value SF to be applied to a next frame in accordance with transition of the compressed image data amount CD and thus updates the scaling factor value SF when necessary. It is to be noted that, if the scaling factor value SF increases in value, then the compression ratio increases and the compressed image data amount CD decreases, but on the contrary if the scaling factor value SF decreases, then the compression ratio decreases and the compressed image data amount CD increases.

Figure 8:
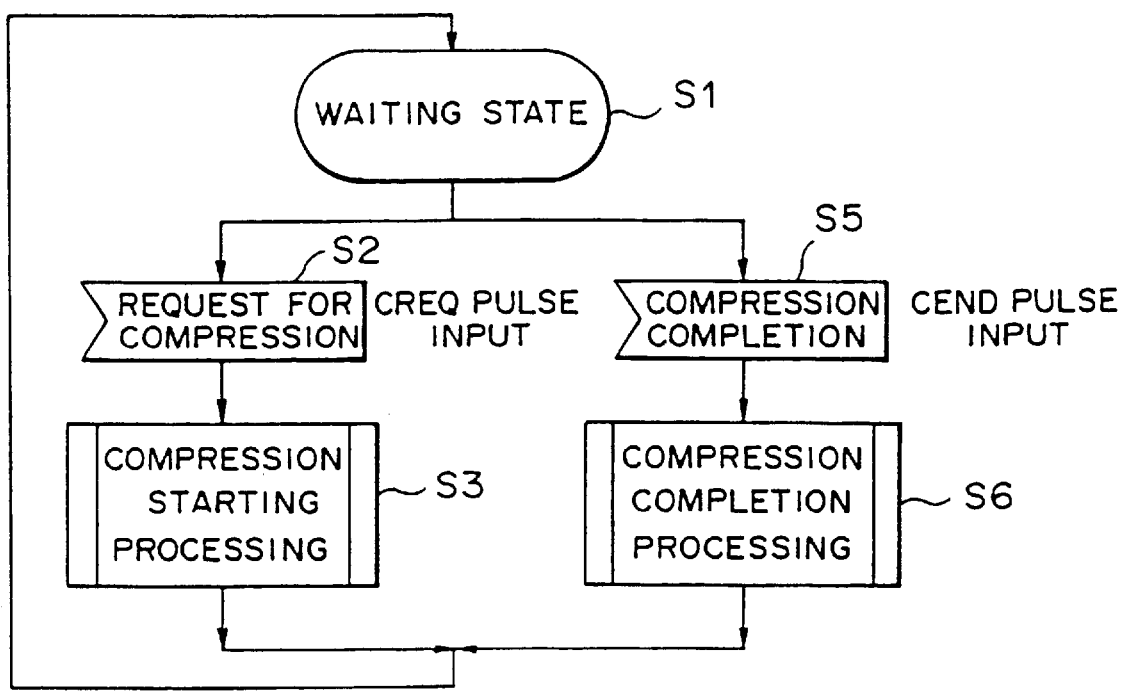
FIG. 8 is a flow chart illustrating an example of operation of the image data compression section of FIG. 3.
Figure 9:
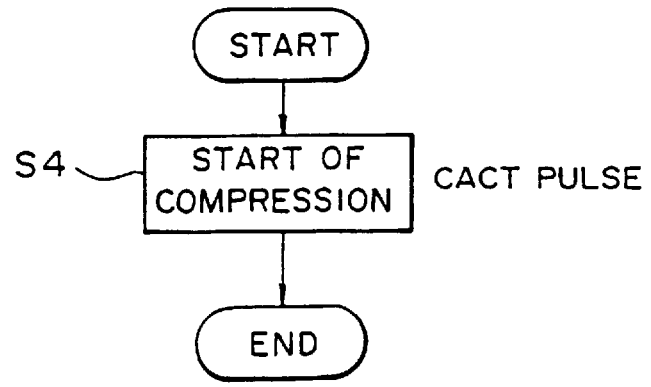
FIGS. 9 and 10 are flow charts illustrating examples of details of compression starting processing and compression ending processing illustrated in FIG. 8, respectively.

Here, for example, if a compression request signal CREQ is inputted, while the CPU 248 is in a waiting state (step S1), to the CPU 248 (even input) (step S2) as seen from FIG. 8, then the CPU 248 performs compression starting processing (step S3). Particularly in step S3, the CPU 248 outputs a compression start signal CACT to perform compression processing of image data (step S4) as seen in FIG. 9.

Figure 10:
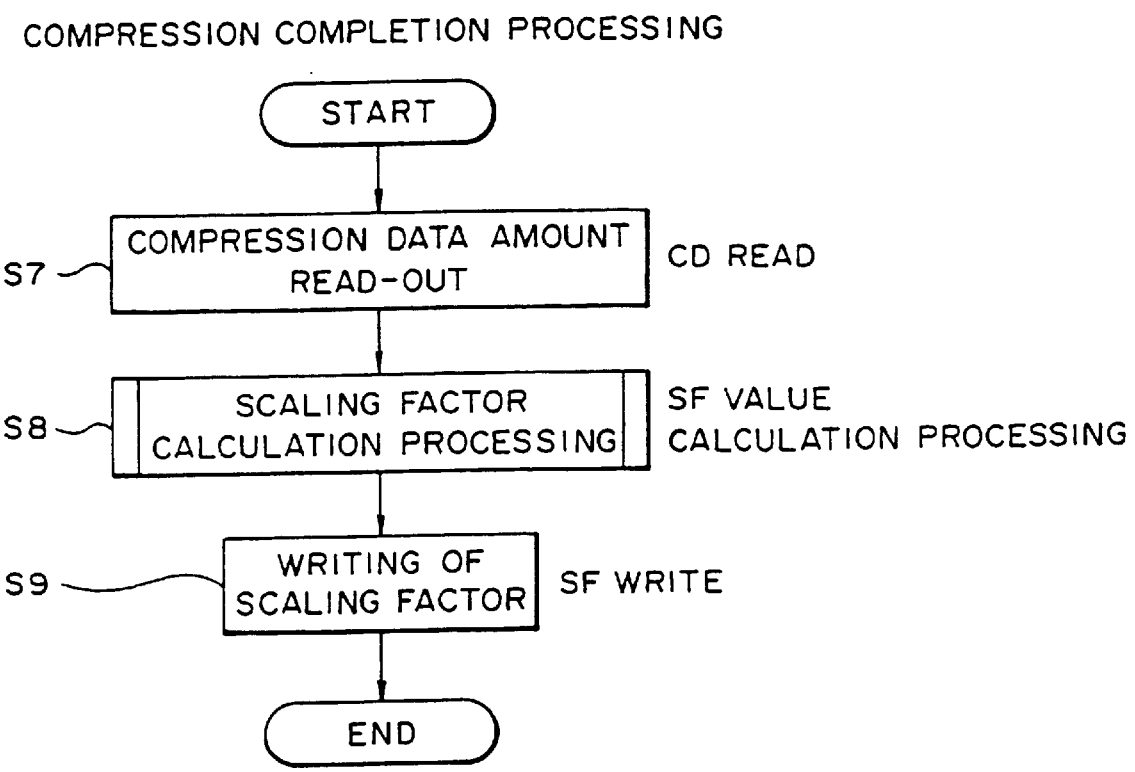

Then, if the compression of image data is completed and a compression end signal CEND is inputted (step S5) as seen in FIG. 8, then the CPU 248 performs compression ending processing (step S6). The compression ending processing is performed in such a manner as illustrated in FIG. 10. Referring to FIG. 10, the CPU 248 first reads out the compressed image data amount CD from the image compression section 244 (step S7), and then performs calculation processing for the scaling factor value SF based on the compressed image data amount CD thus read out to update the scaling factor value SF (step S8), whereafter it writes the scaling factor value SF after updated into the image compression section 244 (step S9).

The calculation processing for the scaling factor value SF performed in step S8 described above by the CPU 248 is performed using one of the following scaling factor updating processes (1) to (5).

Scaling Factor Updating Process (1)

First, as values which the scaling factor value SF of image can assume, different values $SF_i$ (constant values; i=1, 2, ..., N, N is a natural number) wherein $SF_1 > SF_2 > SF_3 > ... > SF_N$ are set stepwise in the CPU 248 (memory section (threshold value setting section not shown) or the like). Further, it is assumed that, when the scaling factor value SF=$SF_i$, the compressed image data amount CD assumes a value $R_i$ (kBytes) ($R_1 < R_2 < ... < R_N$), and a maximum allowable value $R_c$, an upper limit value $RB_{up}$ (kBytes) and a lower limit value $RB_{dn}$ (kBytes) for the compressed image data amount CD are determined as threshold values in the CPU 248.

Figure 11:
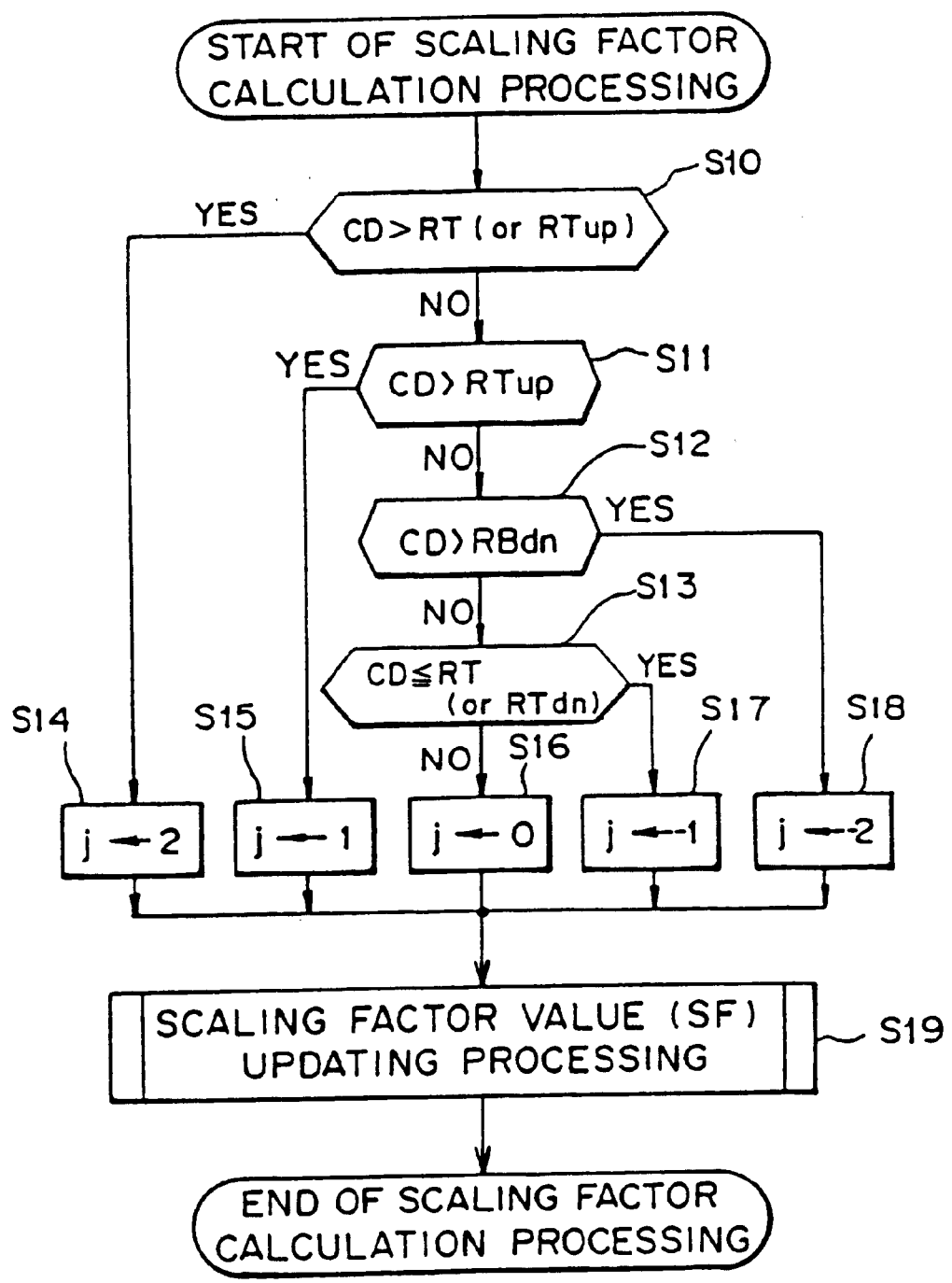
FIG. 11 is a flow chart illustrating an example of details of scaling factor calculation processing of the compression starting processing of FIG. 10.

Then, for example, if the compressed image data amount CD per unit field after compression processing by the image compression section 244 exceeds the upper limit value $RB_{up}$, then the CPU 248 sets a value "2" indicating this as a compressed image data amount type parameter j as seen from FIG. 11 (from the YES route of step S10 to step S14), and then performs updating processing of the scaling factor value SF (step S19).

The updating processing of the scaling factor value SF proceeds in the following manner. In particular, referring to FIG. 12, the CPU 248 first determines a type of calculation to be performed in accordance with the value of the parameter j (step S20). In this instance, since the parameter j has the set value "2", which indicates that the compressed image data amount CD exceeds the upper limit value $RB_{up}$, as described hereinabove in connection with step S14 of FIG. 11, the CPU 248 discriminates whether or not the level i of the scaling factor value SF is i=1 (step S21).

If the discrimination reveals that i≠1, then the level i is decremented by one step (i−1) (from the NO route of step S21 to step S22) and increases the scaling factor value SF by one step (SF←$SF_i$) to raise the compression ratio (step S25) to decrease the compressed image data amount CD.

On the other hand, referring back to FIG. 11, if the compressed image data amount CD is lower than the lower limit value $RB_{dn}$, then the CPU 248 sets the value "−2" indicating this to the parameter j (from the YES route of step S12 to step S18) and performs updating processing of the scaling factor value SF (step S19).

Figure 12:
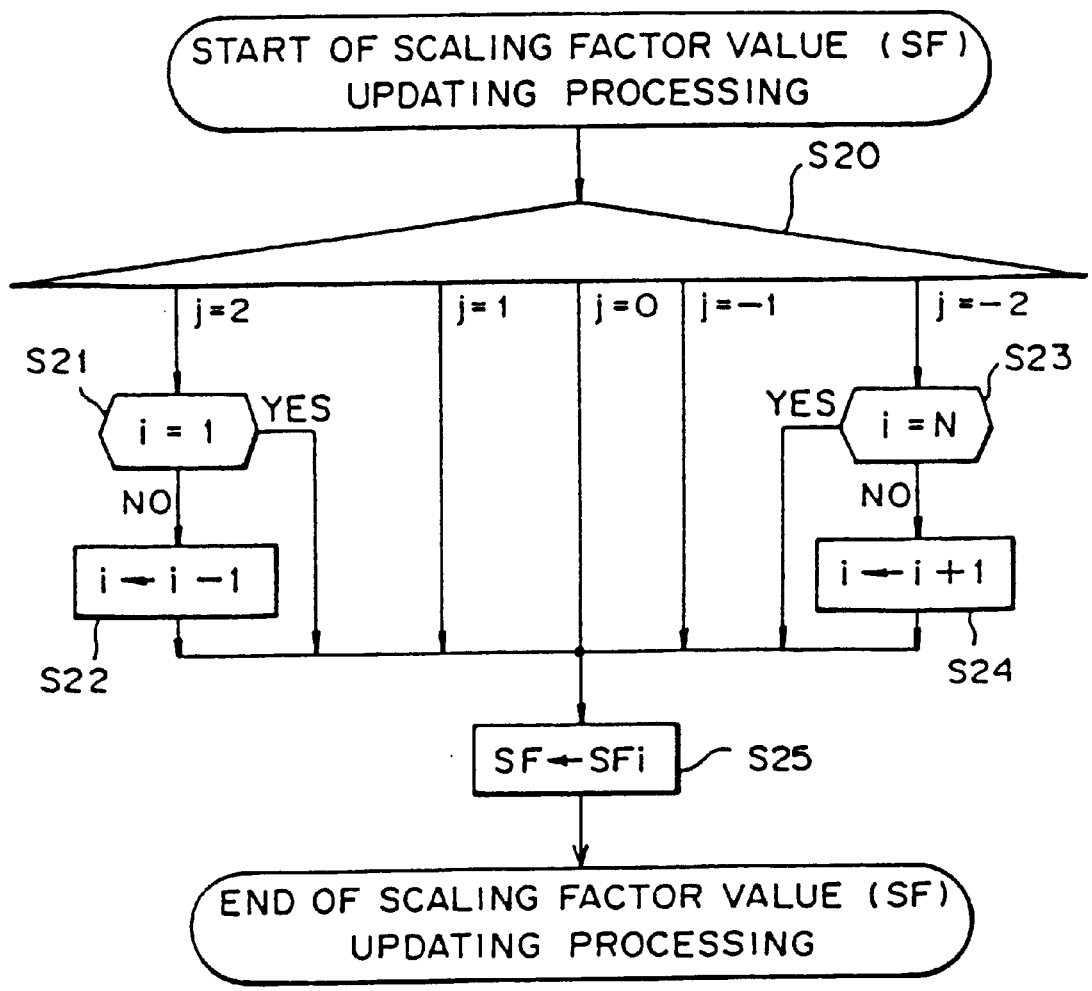
FIG. 12 is a flow chart illustrating an example of details of scaling factor value (SF) updating processing of the scaling factor calculation processing of FIG. 11.

Also in this instance, the CPU 248 subsequently performs discrimination of a type of calculation to be performed in accordance with the value of the parameter j as seen from FIG. 12 (step S20). In this instance, since the parameter j has the set value "−2", which indicates that the compressed image data amount CD is lower than the lower limit value $RB_{dn}$, the CPU 248 discriminates whether or not the level i of the scaling factor value SF is i=N (step S23). Then, if i≠N, then the level i of the scaling factor value SF is incremented by one step (i+1) (from the NO route of step S23 to step S24) and decreases the scaling factor value SF by one step (SF←$SF_i$) to lower the compression ratio to increase the compressed image data amount CD (step S25).

In this manner, when the compressed image data amount CD exceeds the upper limit value $RB_{up}$, the CPU 248 increases the scaling factor value SF by one step, but when the compressed image data amount CD is lower than the lower limit value $RB_{dn}$, the CPU 248 decreases the scaling factor value SF by one step. Consequently, the compressed image data amount CD is admitted to vary principally between the upper limit value $RB_{up}$ and the lower limit value $RB_{dn}$, and accordingly, a possible best quality can be provided with certainty.

Figure 13:
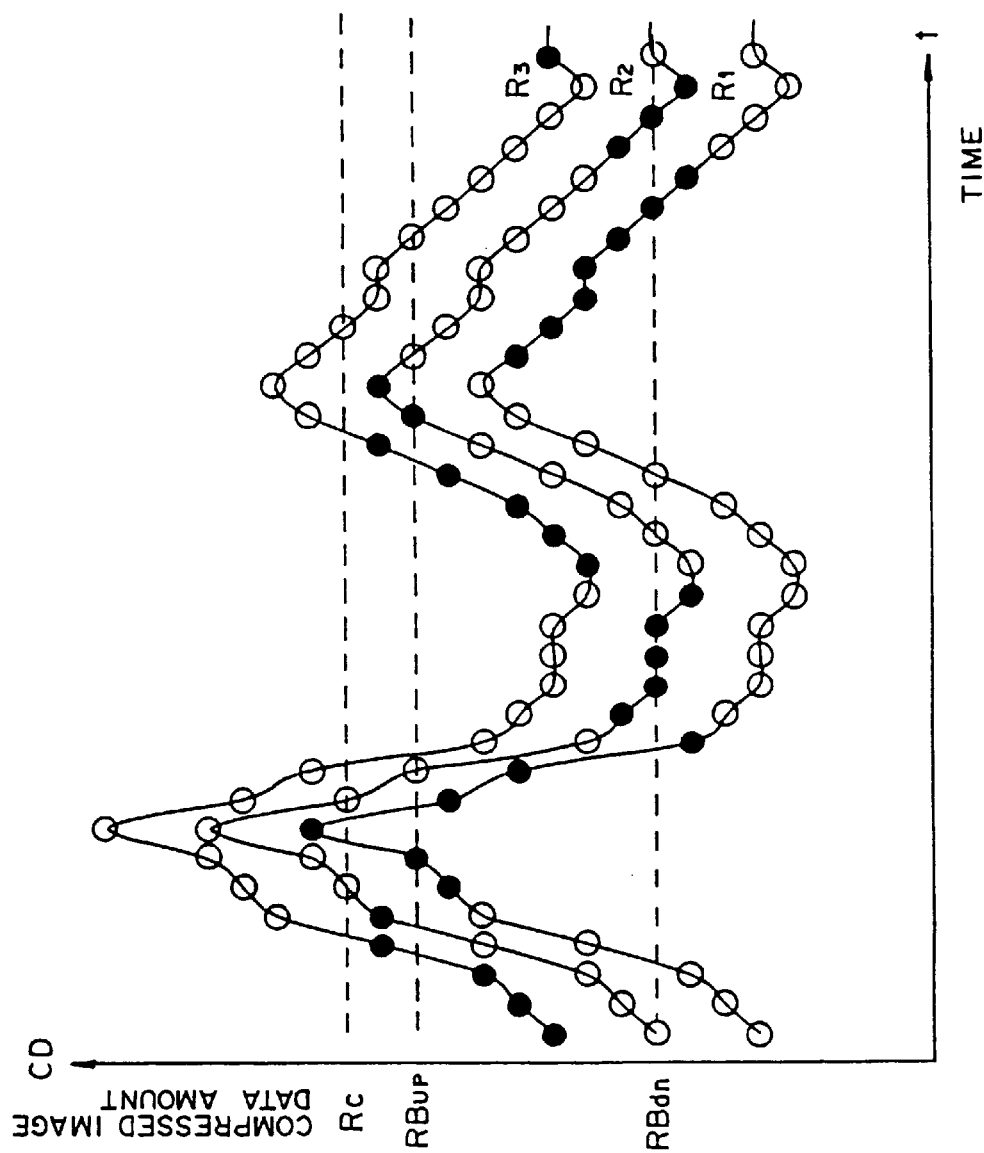
FIG. 13 is a diagram illustrating an example of transition of the compressed image data amount when the scaling factor value (SF) updating processing of FIG. 12 is performed by the image data compression section of FIG. 3.

It is to be noted that, in this instance, in setting the scaling factor value SF, it must be defined so that the probability that the compressed image data amount CD may exceed the maximum allowable value $R_c$ which corresponds to a permissible transmission value may be very low. FIG. 13 illustrates an example of transition of the compressed image data amount CD when the scaling factor updating process (1) described above is performed with the value N set to N=3.

Scaling Factor Updating Process (2)

In order to assure a comparatively high picture quality within the maximum allowable value $R_c$ in the calculation processing of the scaling factor value SF in step S19 of FIG. 11, an upper limit value $RB_{up}$ and a lower limit value $RB_{dn}$ for the compressed image data amount CD and an aimed value RT for the compressed image data amount CD are set in advance as threshold values in the CPU 248.

Figure 14:
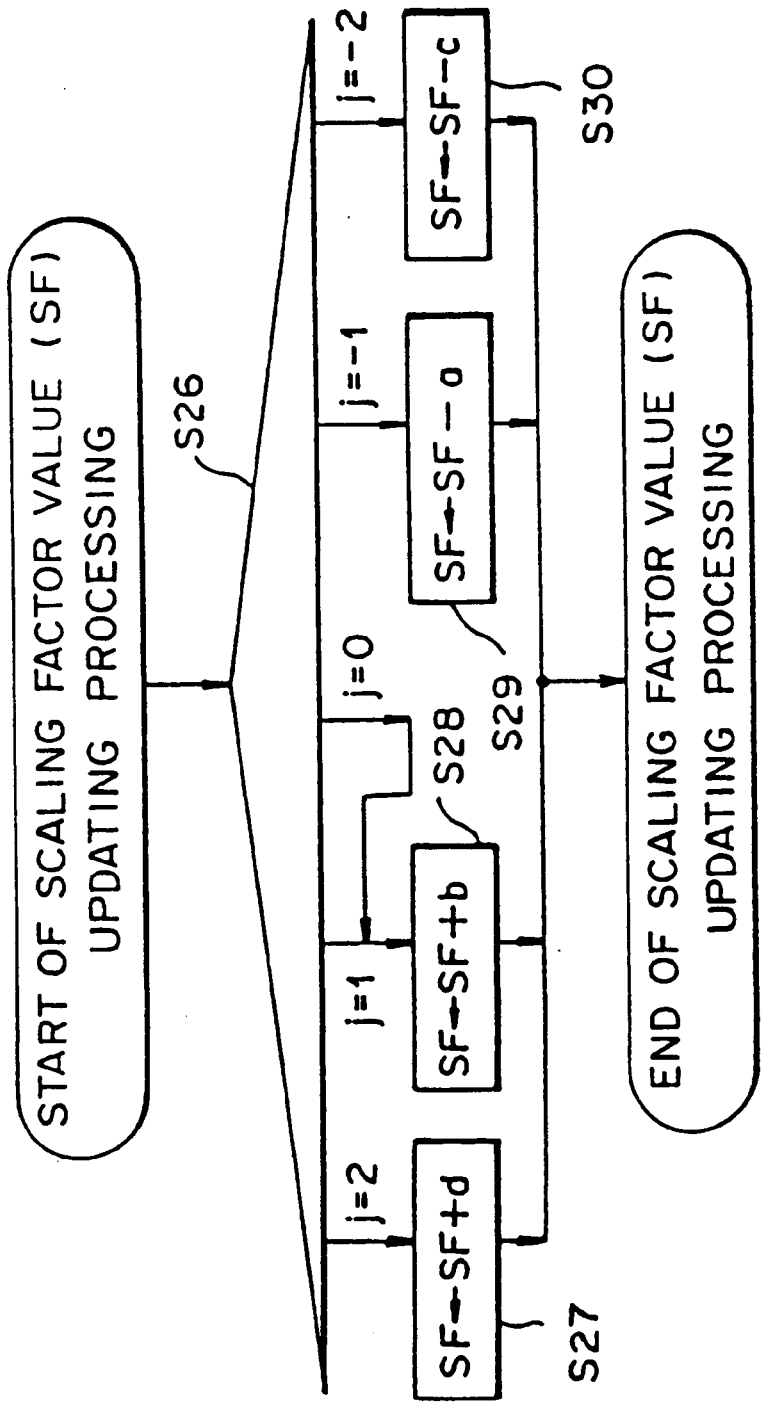
FIG. 14 is a flow chart illustrating another example of details of the scaling factor value (SF) updating processing of the scaling factor calculation processing of FIG. 11.

Then, for example, in FIG. 11, when the compressed image data amount CD of the preceding field is lower than the aimed value RT (when the determination in step S13 is YES), the CPU 248 sets the parameter j to "−1" (step S17) to lower the scaling factor value SF by a fixed value a (a is a real number) (SF←SF−a) to lower the compression ratio as seen from steps S26 and S29 of FIG. 14, which illustrates detailed processing in step S19 of FIG. 11 in this instance.

On the contrary, if, in FIG. 11, the compressed image data amount CD of the preceding field is higher than the aimed value RT (when the determination in step S11 is YES), the CPU 248 sets the parameter j to "1" (step S15) to raise the scaling factor value SF by a fixed value b (b is a real number) (SF←SF+b) to raise the compression ratio as seen from steps S26 and S28 of FIG. 14 mentioned above.

Or, when the compressed image data amount CD of the preceding field is higher than the upper limit value $RB_{up}$ (when the determination in step S10 of FIG. 11 is YES), the CPU 248 sets the parameter j to "2" (step S14) to raise the scaling factor value SF by a fixed value d (d is a real number) higher than the fixed value b (SF←SF+d) to raise the compression ratio by a greater amount as seen from steps S26 and S27 of FIG. 14.

On the contrary if the compressed image data amount CD of the preceding field is lower than the lower limit value $RB_{dn}$ (when the determination in step S12 of FIG. 11 is YES), then the CPU 248 sets the parameter j to "−2" (step S18) to lower the scaling factor value SF by a fixed value c (c is a real number) higher than the fixed value a (SF←SF−c) to lower the compression ratio by a comparatively large amount as seen from steps S26 and S30 of FIG. 14.

In this manner, the CPU 248 updates the scaling factor value SF so that the compressed image data amount CD may vary normally in the proximity of the aimed value RT. Consequently, transmission can be performed normally with the compressed image data amount CD around the aimed value RT, which contributes very much to a good picture quality and effective utilization of a band.

Figure 15:
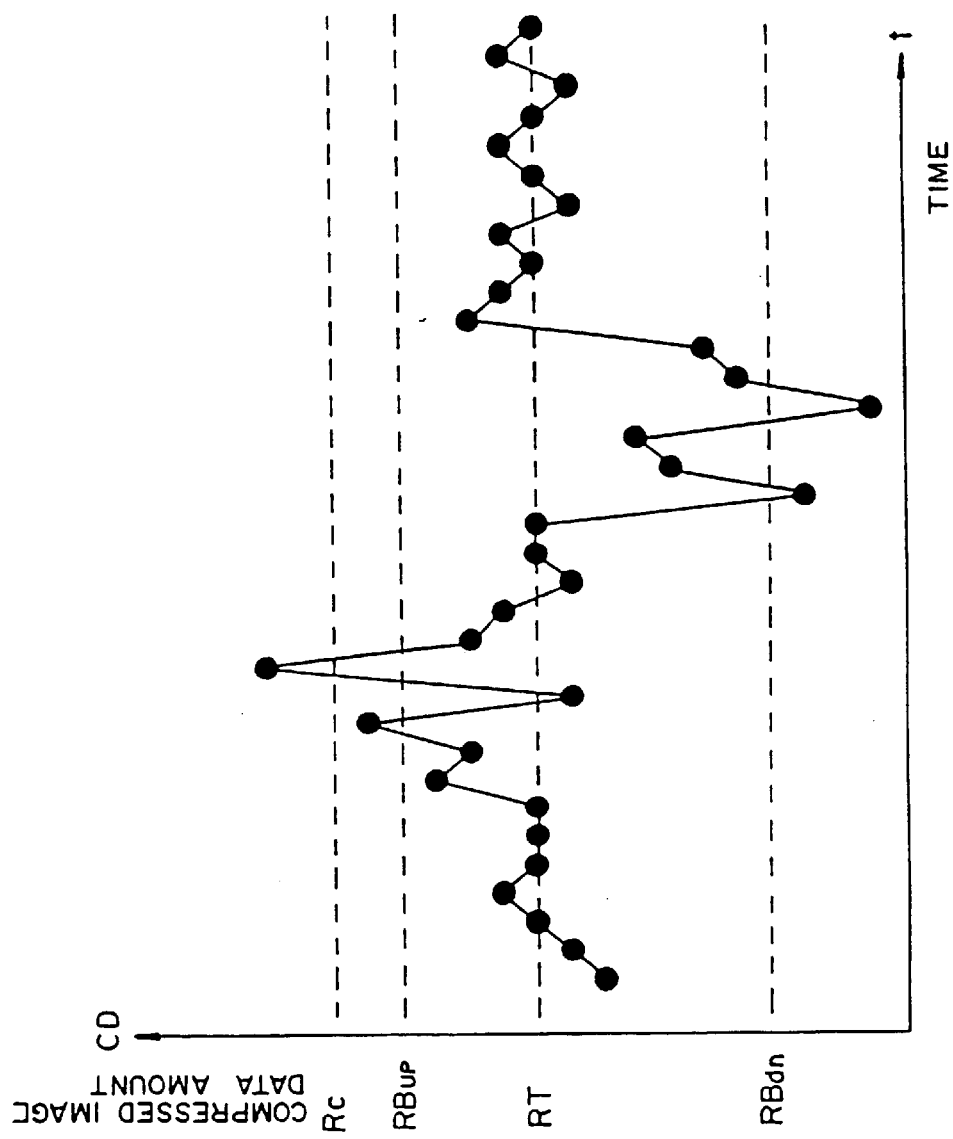
FIG. 15 is a diagram illustrating an example of transition of the compressed image data amount when the scaling factor value (SF) updating processing of FIG. 14 is performed by the image data compression section of FIG. 3.

It is to be noted that FIG. 15 illustrates an example of transition of the compressed image data amount CD when the scaling factor updating process (2) described above is performed.

Scaling Factor Updating Process (3)

Figure 16:
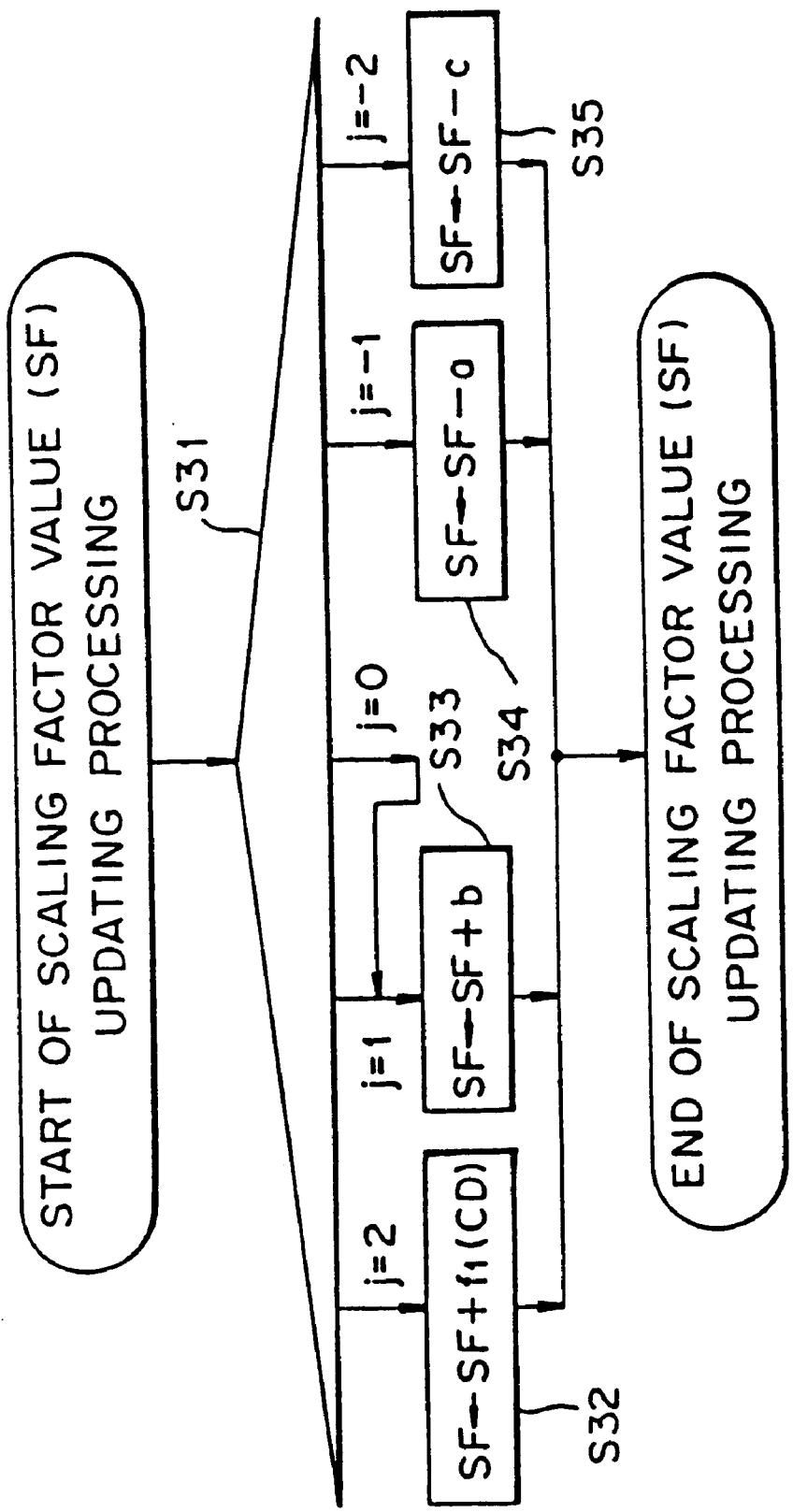
FIG. 16 is a flow chart illustrating a further example of details of the scaling factor value (SF) updating processing of the scaling factor calculation processing of FIG. 11.

Referring to FIG. 11, when the compressed image data amount CD exceeds the upper limit value $RB_{up}$ (when the determination in step S10 is YES), the CPU 248 sets the parameter j to "2" (step S14) to increment the scaling factor value SF by a first-order function amount $f_1$ (CD) of the compressed image data amount CD (SF←SF+$f_1$ (CD)) to increase the compressed image data amount CD by a large amount as seen from steps S31 and S32 of FIG. 16 to raise the compression ratio suddenly to decrease the compressed image data amount CD in order to make it possible to readily cope with a sudden increase of the compressed image data amount CD.

In short, in this instance, a value obtained from the first-order function amount $f_1$ (CD) which increases in proportion to the compressed image data amount CD is used as the required amount d mentioned hereinabove. Accordingly, even if the compressed image data amount CD of a certain field does not remain within an allowable range, the compressed image data amount CD of the next field can be adjusted so as to remain within the allowable range with certainty and rapidly. Consequently, the reliability that the compressed image data amount CD may exceed the allowable range can be decreased significantly, and the picture quality can be improved remarkably.

On the other hand, when the compressed image data amount CD becomes lower than the lower limit value $RB_{dn}$ (when the determination in step S12 is YES), the CPU 248 sets the parameter j to "−2" (step S18) to lower the scaling factor value SF by the fixed amount c (SF←SF−c) as seen from steps S31 and S35 of FIG. 16 to increase the compressed image data amount CD.

Further, the aimed value RT is provided for the compressed image data amount CD, and in FIG. 11, if the compressed image data amount CD is higher than the aimed value RT (when the determination in step S11 is YES), the CPU 248 sets the parameter j to "1" (step S15) to add a low value b to the scaling factor value SF (SF←SF+b) as seen from steps S31 and S33 of FIG. 16.

On the contrary, in FIG. 11, if the compressed image data amount CD is lower than the aimed value RT (when the determination in step S13 is YES), the CPU 248 sets the parameter j to "−1" (step S17) to subtract the low value a from the scaling factor value SF (SF←SF−a) as seen from steps S31 and S34 of FIG. 16.

Figure 17:
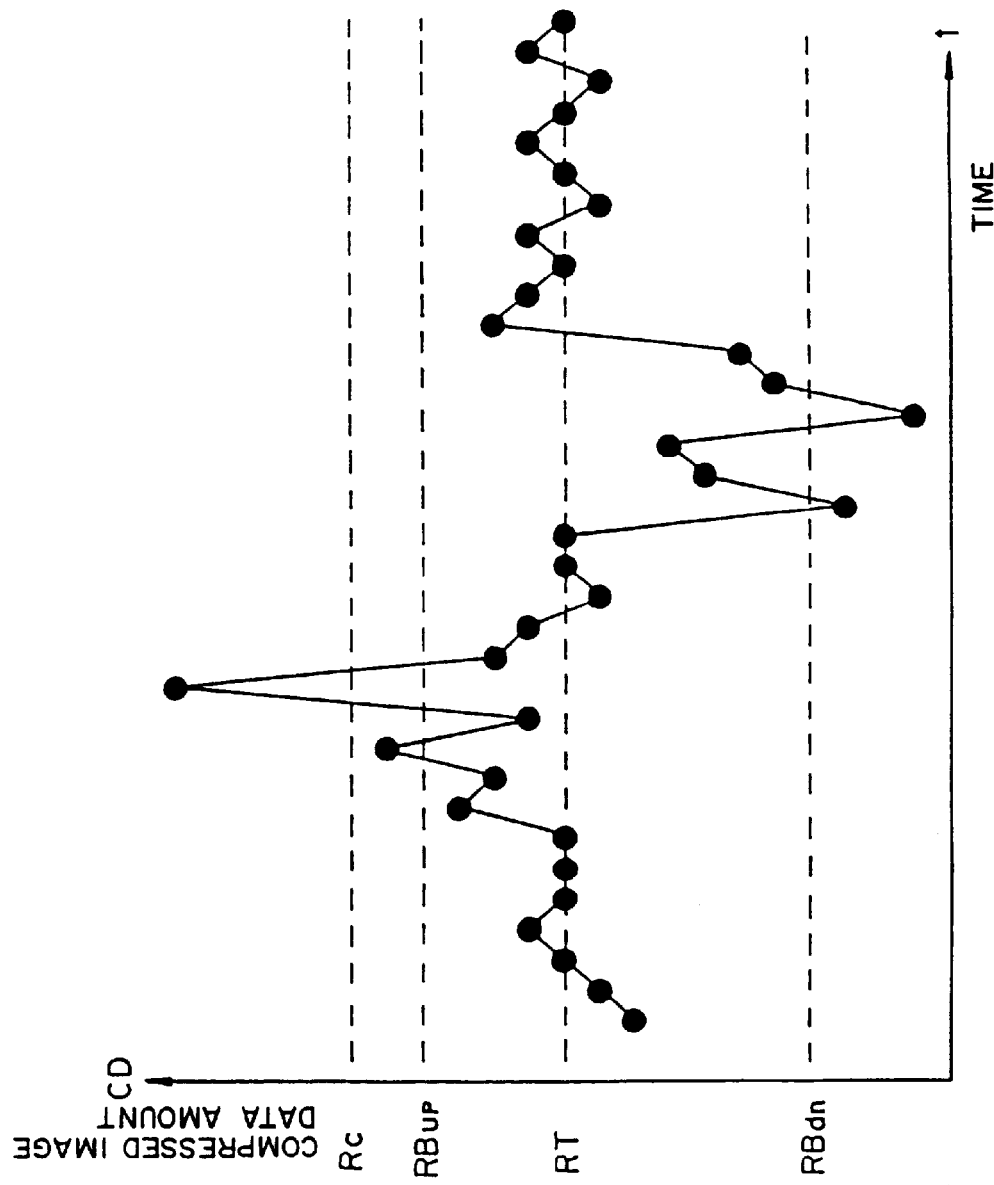
FIG. 17 is a diagram illustrating an example of transition of the compressed image data amount when the scaling factor value (SF) updating processing of FIG. 16 is performed by the image data compression section of FIG. 3.

It is to be noted that, in this instance, by setting the values a and b so as to be b>a so that the amount of the compressed image data to be decreased when the compressed image data amount CD exceeds the aimed value RT may be larger, fine adjustment can be performed so that the compressed image data amount CD may always approach an ideal image data amount. It is to be noted that FIG. 17 illustrates an example of transition of the compressed image data amount CD when the scaling factor updating process (3) described above is performed.

Scaling Factor Updating Process (4)

Further, in order that the aimed value RT in the scaling factor updating process (3) described above may have some width so that a dispersion of the picture quality may be minimized or presented, an aimed upper limit value $RT_{up}$ (kBytes) and an aimed lower limit value $RT_{dn}$ (kBytes) are set for the aimed value RT.

Figure 18:
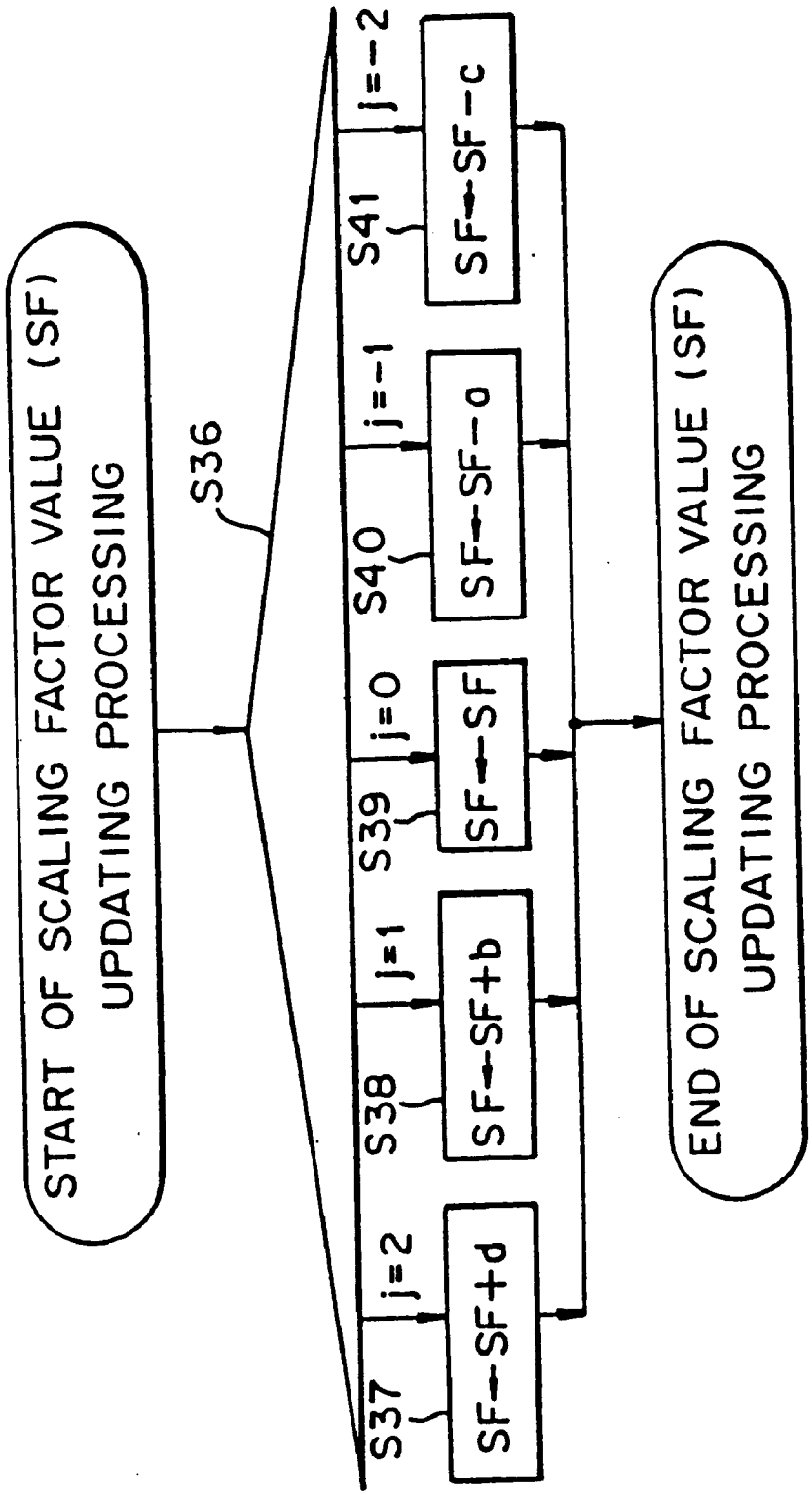
FIG. 18 is a flow chart illustrating a still further example of details of the scaling factor value (SF) updating processing of the scaling factor calculation processing of FIG. 11.

Then, in FIG. 11, when the compressed image data amount CD exceeds the aimed upper limit value $RT_{up}$ (when the determination in step S11 is YES), the CPU 248 sets the parameter j to "1" (step S15) to add the low value b to the scaling factor value SF used in the preceding cycle (SF←SF+b) as seen from steps S36 and S38 of FIG. 18.

On the other hand, in FIG. 11, when the compressed image data amount CD is lower than the aimed lower limit value $RT_{dn}$ (when the determination in step S13 is YES), the CPU 248 sets the parameter j to "−1" (step S17) to subtract the low value a from the scaling factor value SF used in the preceding cycle (SF←SF−a) as seen from steps S36 and S40 of FIG. 18.

However, when the compressed image data amount CD assumes a value between the aimed upper limit value $RT_{up}$ and the aimed lower limit value $RT_{dn}$ both inclusive (when the determinations in all of steps S10 to S13 of FIG. 11 are NO), the CPU 248 sets the parameter j to "0" (step S16) to maintain the scaling factor value SF (SF←SF) as seen from steps S36 and S39 of FIG. 18. Consequently, fine adjustment is performed so that a dispersion of the picture quality may be prevented and the scaling factor value SF may always remain within an ideal range of the compressed image data amount CD.

In this manner, in the scaling factor updating process (4) described above, since the aimed upper limit value $RT_{up}$ and the aimed lower limit value $RT_{dn}$ are provided for the compressed image data amount CD so that the compressed image data amount CD may have a suitable width, unnecessary updating of the scaling factor value SF when the compressed image data amount CD assumes a value around the aimed value RT can be prevented to effectively prevent a dispersion of the picture quality.

Scaling Factor Updating Process (5)

Further, when the compressed image data amount CD in the scaling factor updating process (3) described hereinabove exceeds the upper limit value $RB_{up}$ (when the determination in step S10 of FIG. 11 is YES), the CPU 248 sets the parameter j to "2" (step S14) to add an nth-order (n is a natural number) function amount $f_n(CD)$ (where $f_n(CD)>b$) to the scaling factor value SF (SF←SF+$f_n$(CD)) as seen from steps S42 and S43 of FIG. 19 to increase the scaling factor value SF by a large amount in response to a variation of the image data amount CD to raise the compression ratio suddenly to reduce the compressed image data amount CD so as to make it possible to cope with a sudden increase of the image data amount CD.

Figure 19:
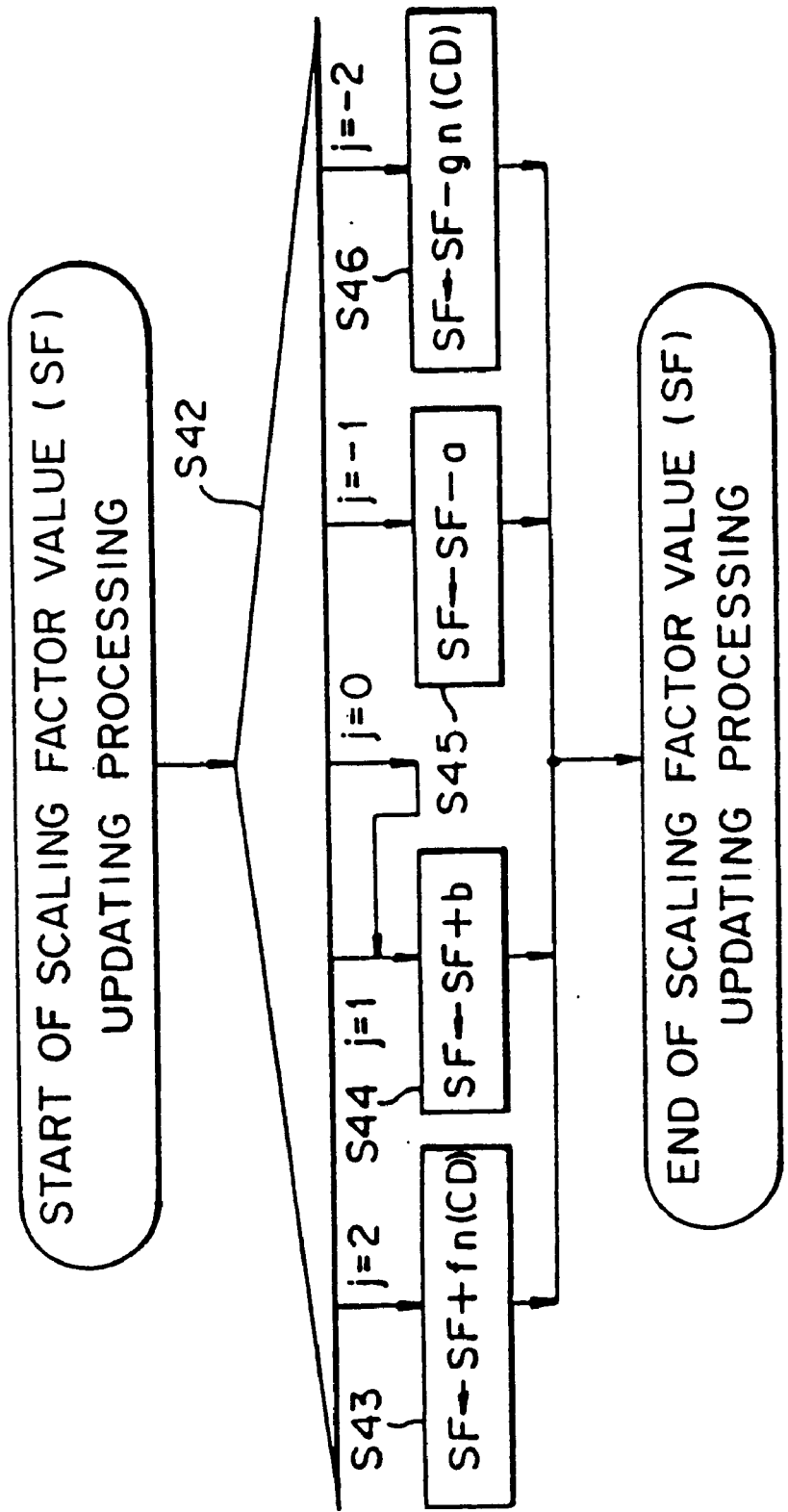
FIG. 19 is a flow chart illustrating a yet further example of details of the scaling factor value (SF) updating processing of the scaling factor calculation processing of FIG. 11.

On the other hand, when the compressed image data amount CD is lower than the lower limit value $RB_{dn}$ (when the determination in step S12 of FIG. 11 is YES), the CPU 248 sets the parameter j to "−2" (step S18) to decrement the scaling factor value SF by an nth-order function amount $g_n(CD)$ (where $g_n(CD)>c$) of the compressed image data amount CD as seen from steps S42 and S46 of FIG. 19 (SF←SF−$g_n$(CD)) to increase the compressed image data amount CD further rapidly.

In short, the scaling factor calculation process (5) in this instance proceeds such that, when the compressed image data amount CD is higher than the upper limit value $RB_{up}$, the scaling factor value SF is incremented by the nth-order (n is a natural number) function amount $f_n(CD)$ of the compressed image data amount CD, but when the compressed image data amount CD is lower than the lower limit value $RB_{dn}$, the scaling factor value SF is decremented by the nth-order function amount $g_n(CD)$ of the compressed image data amount CD. Consequently, even if the compressed image data amount CD of a certain field exceeds an allowable maximum value, the possibility that the compressed image data amount CD of the next field may exceed the maximum value can be reduced significantly and the picture quality after regeneration can be improved remarkably.

As described above, since the image data compression section 24 adjusts the compression ratio of JPEG image compression processing by updating the scaling factor value SF for each compression processing for each field so that the compressed image data amount CD per unit field after JPEG image compression processing obtained as VBR data may remain within a range set in advance, the amount of moving picture data can always be controlled so as to remain within an allowable range for the compressed image data amount CD and a possible best picture quality can be achieved.

It is to be noted that, in the present embodiment, upon each calculation processing, when the compressed image data amount CD exceeds the maximum allowable value $R_c$ which is a transmission limit (that is, when an overflow occurs), the transmission side transmits data within the allowable data amount and abandons and does not transmit overflowed data.

It is to be noted that, in the present invention, when the scaling factor updating process (1) is applied, the aimed upper limit value $RT_{up}$ and the aimed lower limit value $RT_{dn}$ are not set, but when any of the scaling factor updating processes (2) to (4) is applied, the aimed upper limit value $RT_{up}$ and the aimed lower limit value $RT_{dn}$ for the compressed image data amount CD are set to an equal value.

b-2-2. Transmission Buffer Section

FIG. 20 shows in block diagram a detailed construction of the transmission buffer section 25 described hereinabove with reference to FIG. 2. Referring to FIG. 20, the transmission buffer section 25 includes selectors 25-1 to 25-6, a pair of transmission FIFO (First In First Out) memories 25-7 and 25-8 (FIFO-A and FIFO-B) having a capacity of 48 kBytes, flip-flop circuits 25-9 to 25-13, an exclusive NOR (ENOR) gate 25-14 and an inversion gate 25-15.

The selector 25-1 changes over its output in response to a change-over signal CSELA (refer to FIG. 22(d)) produced by the flip-flop circuit 25-9 in response to a compression end signal CEND (refer to FIG. 22(c)) from the image data compression section 24 so that it outputs a transmission FIFO write signal SFWR (refer to FIG. 22(a)) from the image data compression section 24 alternately to a write clock terminal XWR of one of the transmission FIFO memories 25-7 and 25-8. The selector 25-2 changes over its output in response to a change-over signal CSELB (refer to FIG. 22(h)), which is produced by shifting and inverting the phase of the change-over signal CSELA from the flip-flop circuit 25-9 by means of the flip-flop circuit 25-10 so that it outputs a transmission FIFO read signal SFRD (refer to FIG. 22(g)) from the ATM cell transmission section 26 alternately to a read clock-terminal XRD of one of the transmission FIFO memories 25-7 and 25-8.

The selector 25-3 changes over its output to the selector 25-4 side or the selector 25-5 side in response to the change-over signal CSELB from the flip-flop circuit 25-10. Each of the selectors 25-4 and 25-5 changes over its output, when it receives a FIFO empty signal XFEA (refer to FIG. 22(o)) or XFEB (refer to FIG. 22(r)) which is outputted from the corresponding transmission FIFO memory 25-7 or 25-8 when the memory of the transmission FIFO memory 25-7 or 25-8 becomes empty, from the transmission FIFO memory 25-7 or 25-8 side to the selector 25-6 side so that it outputs fixed data (an idle pattern IDLE7 to IDLE0, refer to FIG. 22(l)) indicating odd-/even-number (ODD/EVEN) distinction subsequently to VBR data from the transmission FIFO memory 25-7 or 25-8. Consequently, a required quantity of the idle pattern is inserted subsequently to VBR data to convert the VBR data into CBR data.

The selector 25-6 changes over its output in response to a change-over signal OXEA (refer to FIG. 22(k)) produced by the flip-flop circuit 25-11 in response to an odd-/even-numbered field signal OXE (refer to FIG. 22(j)) from the image data compression section 24 so that it alternately outputs fixed data P7 to P0 indicating an odd-numbered field or fixed data Q7 to Q0 indicating an even-numbered field.

The transmission FIFO memories 25-7 and 25-8 alternately store the transmission FIFO input data SFIDT7 to SFIDT0 (refer to FIG. 22(b)) as compressed data (VBR data) from the image data compression section 24 in response to the change-over signal CSELA from the selector 25-1.

It is to be noted that, while compressed data are being written into one of the transmission FIFO memories 25-7 and 25-8, compressed data FOA7 to FOA0 (refer to FIG. 22(n)) or compressed data FOB7 to FOB0 (refer to FIG. 22(q)) are read out from the other one of the transmission FIFO memories 25-7 and 25-8 in response to a FIFO read signal XRDA (refer to FIG. 22(m)) or XRDB (refer to FIG. 22(p)) from the selector 25-2.

The flip-flop circuit 25-12 produces a transmission enable signal SEN (refer to FIG. 22(u)) indicating an ATM cell conversion timing for CBR data (SFODT7 to SFODT0, refer to FIG. 22(s)) by the ATM cell transmission section 26 in response to a field timing gate signal FTG (refer to FIG. 22(t)) from the image data compression section 24 and a clock signal CSELBD (refer to FIG. 22(i)) based on a compression end signal CEND obtained by means of the flip-flop circuits 25-9 and 25-10 and the exclusive NOR gate 25-14. The flip-flop circuit 25-13 outputs a signal for production of the clock signal CSELBD by the exclusive NOR gate 25-14 in response to the transmission FIFO read signal SFRD from the ATM cell transmission section 26 and a signal obtained by inverting the change-over signal CSELB from the flip-flop circuit 25-10 by means of the inversion gate 25-15.

By the way, generally where the compressed image data amount per one field is approximately 40 kBytes, a considerably high picture quality is obtained. The compressed image data amount of approximately 40 kBytes corresponds, if it is converted into a data transmission rate by the following calculation, to approximately 20 Mbit/s.

$$\text{Upper limit of compress image data amount} = 40 \text{ kBytes}$$

$$\text{Upper limit of data transmission rate} = 40 \text{ (kBytes)} \times 8 \times 60$$

$$= \text{approximately } 20 \text{ (Mbit/s)}$$

Here, when transmission of image data is performed, field timing information must be transferred together with transfer of image data. If compressed data can be transmitted with a basic sampling clock signal of 13.5 MHz, then the horizontal synchronizing frequency $f_H$ and the vertical synchronizing frequency fu can be regenerated from the basic sampling clock frequency $f_e$ ($f_e$=13.5 MHz) regenerated on the reception side by the calculations of $f_H=f_e/858$ and $f_V=2f_H/525$, respectively.

Thus, the data transmission rate is set so as to be equal to N (N is a natural number) times 1/M (M is a natural number) time the clock frequency to be transmitted. Further, the data transmission rate is transmitted by the SRTS method. Consequently, on the reception side, the basic sampling clock signal can be regenerated by multiplying the regenerated data transmission rate first by N and then by 1/M.

More particularly, in the present embodiment, if M=2 and N=3, then the basic sampling clock signal M135 is reduced to one half (½) and then increased to three (3) times by the ATM cell transmission section 26 which will be hereinafter described. Consequently, a clock signal of a data transmission rate of 20.25 MHz is produced. Further, this clock signal is reduced to ⅛ in order to allow processing in units of a byte. Consequently, a transmission FIFO read signal SFRD (refer to FIG. 22(g)) is produced. The transmission FIFO read signal SFRD is inputted as a read signal for the transmission FIFO memories 25-7 and 25-8 from the ATM cell transmission section 26. It is to be noted that the transmission FIFO read signal SFRD here has a clock frequency of 2.53125 MHz. The clock signal of the data transmission rate of 20.25 MHz mentioned above will be hereinafter referred to as transmission user clock signal in accordance with the description of the SRTS.

Thus, the clock frequency fs of the transmission user clock signal is represented by the following expression:

$$f_s = 20.25 \text{ (Mbit/}s)$$

while the basic sampling clock frequency $f_e$ is represented by the following expression:

$$f_e = f_s \times (2/3) = 13.5 \text{ (MHz)}$$

Further, since the horizontal synchronizing frequency $f_H$ and the vertical synchronizing frequency $f_U$ are represented by $$f_H = f_e/858 = 13.5/858 \text{ (MHz) and}$$

$$f_U = 2f_H/525 = 2 \times 13.5/(858 \times 525) \text{ (MHz)}$$

respectively, the maximum allowable value or fixed data amount $R_c$ (kBytes) is given by $$R_c = (f_s/8)/f_U = (3 \times 858 \times 525)/(2 \times 16)$$

$$= 42{,}229.6875 \text{ (Bytes)}$$

In this instance, however, since the data amount is represented in units of byte, where the transmission ratio between $R_c$=42229≡A and $R_c$=42230≡B is represented as a:b (a and b are integers), $$R_c (a+b) = 42{,}229a + 42{,}230b$$

Here, if a+b=16, then a=5 and b=11, and accordingly, if VBR data are transmitted such that the average between CBR data of 42,229 bytes and CBR data of 42,230 bytes may be equal to the ratio of a:b=5:11, then the fixed data amount $R_c$ can be satisfied.

By the way, the data amount of compressed image data in the JPEG is variable, that is, has a VBR (Variable Bit Rate). Here, in order to use the AAL type 1, VBR to CBR conversion to obtain a CBR (Constant Bit Rate) of a fixed data amount is required.

Figure 21:
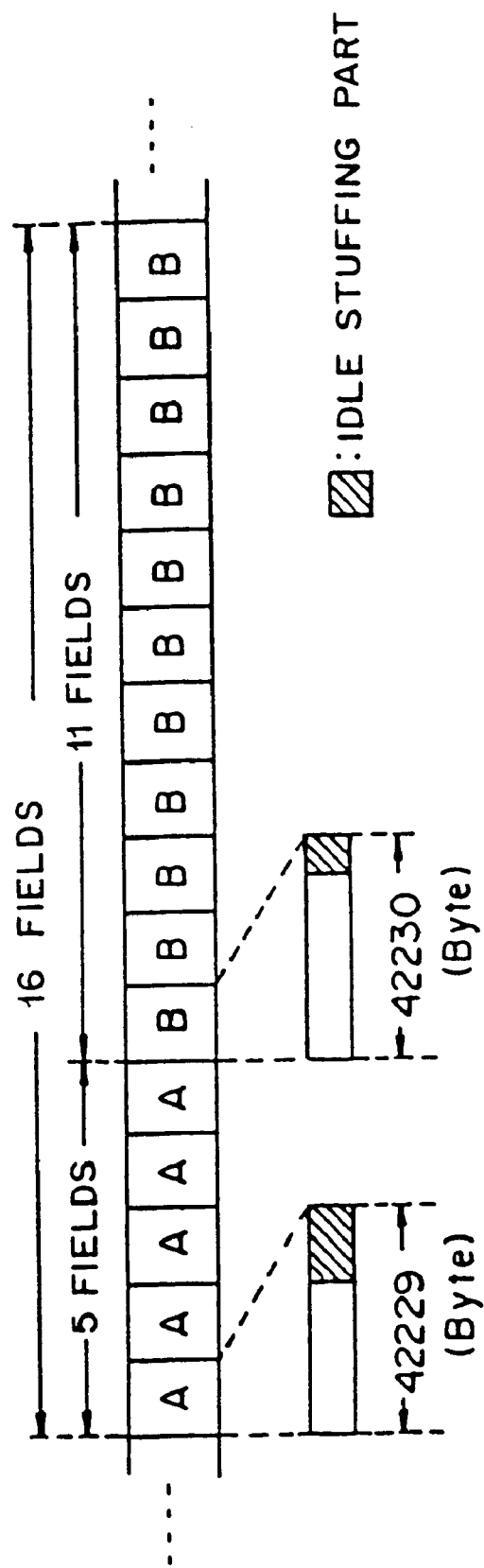
FIG. 21 is a diagrammatic view illustrating an example of idle stuffing processing of the transmission buffer section of FIG. 20.

Thus, idle stuffing wherein idle patterns are stuffed subsequently to effective data as seen, for example, by slanting lines in FIG. 21 is performed for the variable data amount R(t) (kBytes) to perform conversion into a fixed data amount $R_c$ to produce CBR data.

In short, the transmission buffer section 25 inserts a required amount of idle information subsequently to the effective data part of VBR data obtained by conversion by the image data compression section 24 to convert the VBR data into CBR data having a fixed transmission rate. Consequently, VBR data can be converted into CBR data readily.

Thus, in order to convert compressed moving picture data of a variable length (VBR data) into CBR data of a fixed rate and perform rate conversion between the rate on the image side and the rate in the transmission line, the transmission buffer section 25 writes compressed data obtained by compression of each field of moving pictures alternatively into one of the two transmission FIFO memories 25-7 and 25-8 in response to the compression end signal CEND (refer to FIG. 22(c)) of each field. In this instance, the transmission buffer section 25 reads out data from one of the transmission FIFO memories 25-7 and 25-8 while writing into the other one of the transmission FIFO memories 25-7 and 25-8 is proceeding.

In particular, the transmission FIFO input data SFIDT7 to SFIDT0 (refer to FIG. 22(b)) obtained by image compression in accordance with the JPEG algorithm by the image compression section 244 of the image data compression section 24 (refer to FIGS. 2 and 3) are inputted to FIFO data input terminals F17 to F10 of the two transmission FIFO memories 25-7 and 25-8 while the transmission FIFO write signal SFWR is changed over by the selector 25-1 so that it is alternately to the write clock terminal XWR of the transmission FIFO memory 25-7 or 25-8 for each field.

It is to be noted that, since the capacity of each of the transmission FIFO memories 25-7 and 25-8 must be higher than 40 kBytes, the transmission FIFO memories 25-7 and 25-8 in the present embodiment are constructed so as to have a capacity of 48 kBytes.

By the way, the changing over of the selector 25-1 is performed by the change-over signal CSELA (refer to FIG. 2(d)) for the selector 25-1 which is changed over alternately in response to the compression end signal CEND (refer to FIG. 22(c)). In particular, the change-over signal CSELA is adjusted in phase with the transmission FIFO read signal SFRD (refer to FIG. 22(g)) and then inverted by the flip-flop circuit 25-10.

The thus inverted signal (CSELB, refer to FIG. 22(h)) is outputted as a change-over signal for the selector 25-2 and the selector 25-3 which change over the transmission FIFO read signal SFRD and the transmission FIFO output data SFODT7 to SFODT0 between the transmission FIFO memory 25-7 and the transmission FIFO memory 25-8.

In short, the transmission buffer section 25 includes a plurality of transmission FIFO memories 25-7 and 25-8 as well as a writing selector section (the selector 25-1) for writing VBR data from the image data compression section 24 alternately into one of the transmission FIFO memories 25-7 and 25-8 in response to the compression end signal CEND for each field, and a read-out selector section (the selectors 25-4 and 25-5) for reading out, while writing of the VBR data is proceeding with one of the transmission FIFO memories 25-7 and 25-8, the VBR data from the other one of the transmission FIFO memories 25-7 and 25-8 and inserting the idle pattern to the thus read out VBR data in response to the compression end signal CEND.

Accordingly, compression processing by the image data compression section 24 and transmission processing of moving picture data (fixed length cells) by the ATM cell transmission section 26 can be performed simultaneously. Consequently, processing by the transmission section 22 can be performed at a higher rate and real time communication can be realized.

It is to be noted that the transmission FIFO read signal SFRD is a clock signal of 2.53125 MHz obtained by reducing the basic sampling clock signal M135 to one half (½) in frequency and then increasing the frequency of the sampling clock signal of the reduced frequency to three (3) times to obtain the data transmission rate of 20.25 MHz and then reducing the transmission rate to one eighth (⅛).

Further, the signal CSELB obtained by inversion by the flip-flop circuit 25-10 is variation point differentiated using the transmission FIFO read signal SFRD by the flip-flop circuit 25-13 and the exclusive NOR gate 25-14 to produce a switch signal CSELBD (refer to FIG. 22(i)). The clock signal CSELBD is inputted to clock terminals C of the flip-flop circuits 25-11 and 25-12, by which the ODD/EVEN field signal OXE (refer to FIG. 22(j)) and the field timing gate signal FTG (refer to FIG. 22(t)) are adjusted in phase in accordance with the clock signal CSELBD to produce a change-over signal OXEA (refer to FIG. 22(k)) and a transmission enable signal SEN (refer to FIG. 22(u)) for the selector 25-6, respectively.

Figure 22:
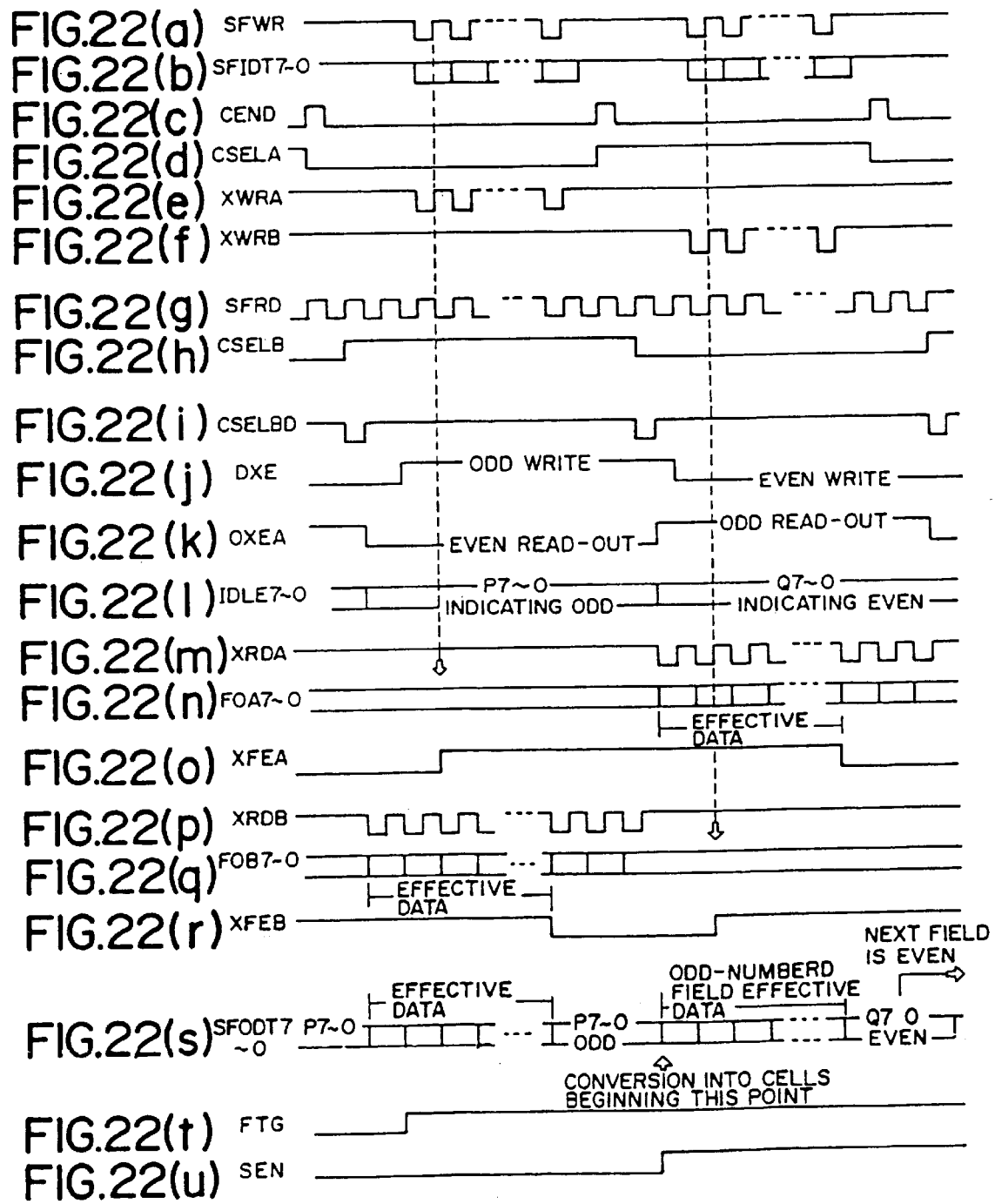
FIGS. 22(a) to 22(u) are timing charts illustrating an example of operation of the transmission buffer section of FIG. 20.

Then, when the transmission FIFO memory 25-7 or 25-8 with which reading out is proceeding is not empty, data of the transmission FIFO memory 25-7 or 25-8 are read out, but when the transmission FIFO memory 25-7 or 25-8 with which reading out is proceeding is empty, the input to the selector 25-4 or 25-5 (SEL-D or SEL-E) is changed over from the FIFO output data FOA7 to FOA0 or FOB7 to FOB0 (refer to FIG. 22(n) or 22(q)) to an idle stuffing signal IDLE7 to IDLE0 (refer to FIG. 22(1)) in response to a FIFO empty signal XFEA or XFEB (refer to FIG. 22(o) or 22(r)).

In short, the transmission buffer section 25 is constructed such that, when the transmission FIFO memory 25-7 or 25-8 with which reading out of compressed data is proceeding is not empty, the transmission buffer section 25 reads out VBR data written in the transmission FIFO memory 25-7 or 25-8 and outputs the VBR data, but when the transmission FIFO memory 25-7 or 25-8 with which reading out of VBR data is proceeding is empty, the transmission buffer section 25 reads out the idle data IDLE7 to IDLE0 and outputs it. Consequently, insertion processing of the idle pattern described above can be performed with certainty with a very simple construction.

Here, while the idle data IDLE7 to IDLE0 is fixed data for use when the transmission FIFO memory 25-7 or 25-8 with which reading out is proceeding is empty, it is utilized for identification between an odd-numbered field and an even-numbered field for transmission of an image of the interlace type. In particular, by transmitting fixed values P (P7 to P0) and Q (Q7 to Q0) which are different between an odd-numbered field and an even-numbered field, it is indicated whether the next field is an even-numbered field or an odd-numbered field.

For example, if a fixed value Q (Q7 to Q0=$FF_H$) representing an even-numbered field is used as the idle data after transmission of an odd-numbered field whereas another fixed value P (P7 to P0=$FE_H$) representing an odd-numbered field is used as the idle data after transmission of an even-numbered field, then even-/odd-numbered field distinction of a next frame can be indicated by the idle data. It is to be noted that, since the first transmission field does not have preceding idle data, in the present embodiment, transmission processing is begun with an odd-numbered field.

In short, in this instance, the transmission buffer section 25 is constructed such that the fixed values P and Q which are different in accordance with field identification numbers allocated for each plurality of fields are outputted, which allows identification between an odd-numbered field and an even-numbered field.

More particularly, the idle data IDLE7 to IDLE0 is produced by inputting the fixed values P (P7 to P0) and Q (Q7 to Q0) to the selector 25-6 (SEL-F) and changing over the output of the selector 25-6 with the change-over signal OXEA. Then, the idle data IDLE7 to IDLE0 is transmitted, for example, as idle data representing an odd-numbered field to the ATM cell transmission section 26 by changing over the transmission enable signal SEN to the H level at a timing at which an odd-numbered field is read out from the transmission FIFO memory 25-7 as seen from FIG. 22(n) or 22(u) using the transmission enable signal SEN from the flip-flop circuit 25-12 shown in FIG. 20.

Consequently, the ATM cell transmission section 26 begins transmission of ATM cells beginning with an odd-numbered field with which the transmission enable signal SEN is changed over to the H level.

It is to be noted that, as seen from FIG. 20, the ODD/EVEN field signal OXE, field timing gate signal FTG, transmission FIFO input-data SFIDT7 to SFIDT0, transmission FIFO write signal SFWR and compression end signal CEND are inputted to the image data compression section 24 described above while the transmission FIFO output data SFODT7 to SFODT0 and the transmission FIFO read signal SFRD are inputted to the ATM cell transmission section 26.

Figure 47:
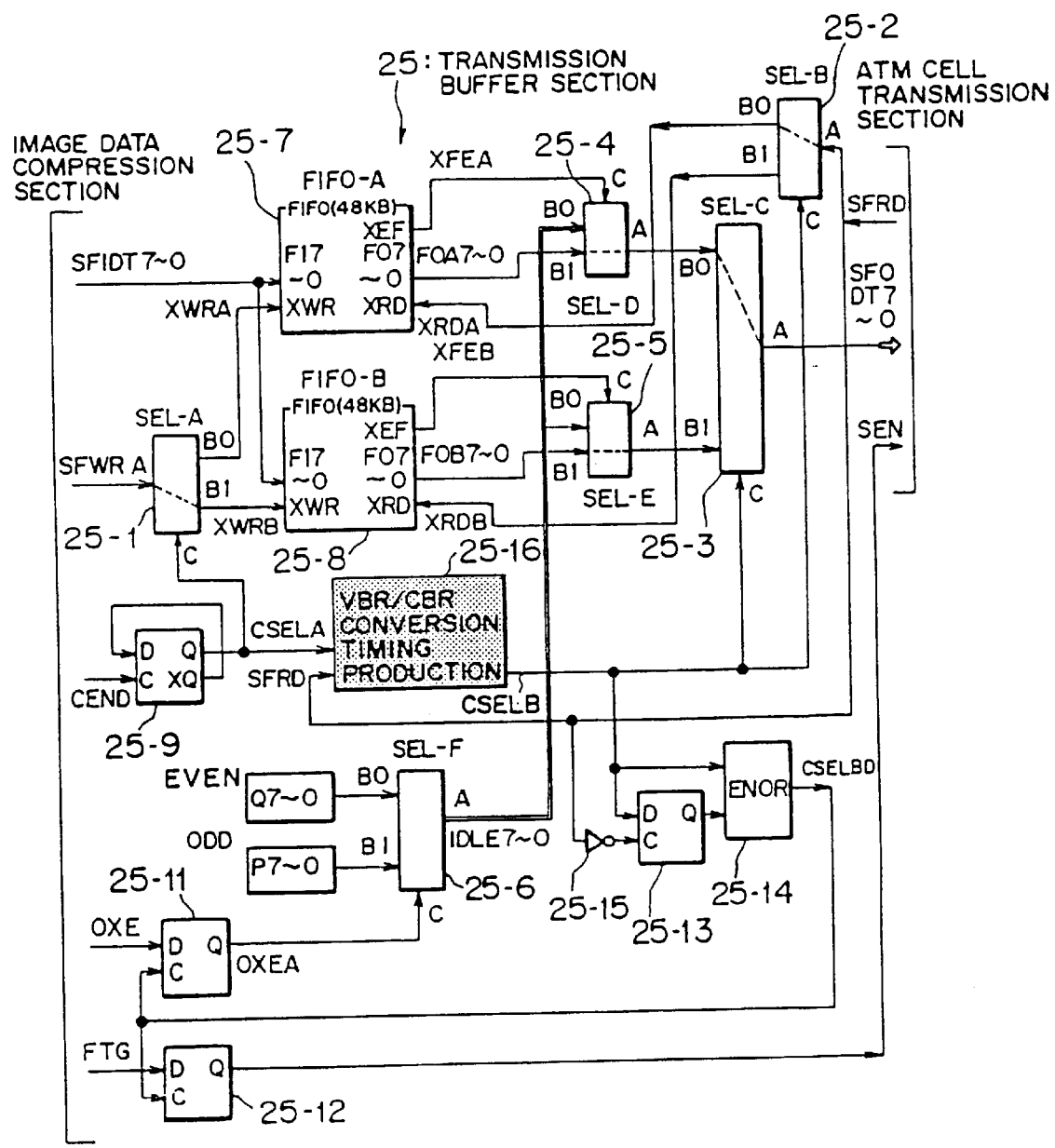
FIG. 47 is a block diagram showing another detailed construction of the transmission buffer section in the ATM image communication system of FIG. 2.

By the way, the transmission buffer section 25 described hereinabove may include, in place of the flip-flop circuit 25-10 for producing a timing signal (the change-over signal CSELB) to be supplied to the selector 25-2 to allow VBR to CBR conversion shown in FIG. 20, for example, a VBR to CBR conversion timing production section 25-16 as indicated by a netted block in FIG. 47.

The VBR to CBR conversion timing production section 25-16 in this instance produces a timing signal CSELB for converting, as seen in FIG. 21, VBR data into CBR data of 42,229 bytes and 42,230 bytes such that the ratio between the CBR data of 42,229 bytes and 42,230 bytes may be 5:11.

Figure 48:
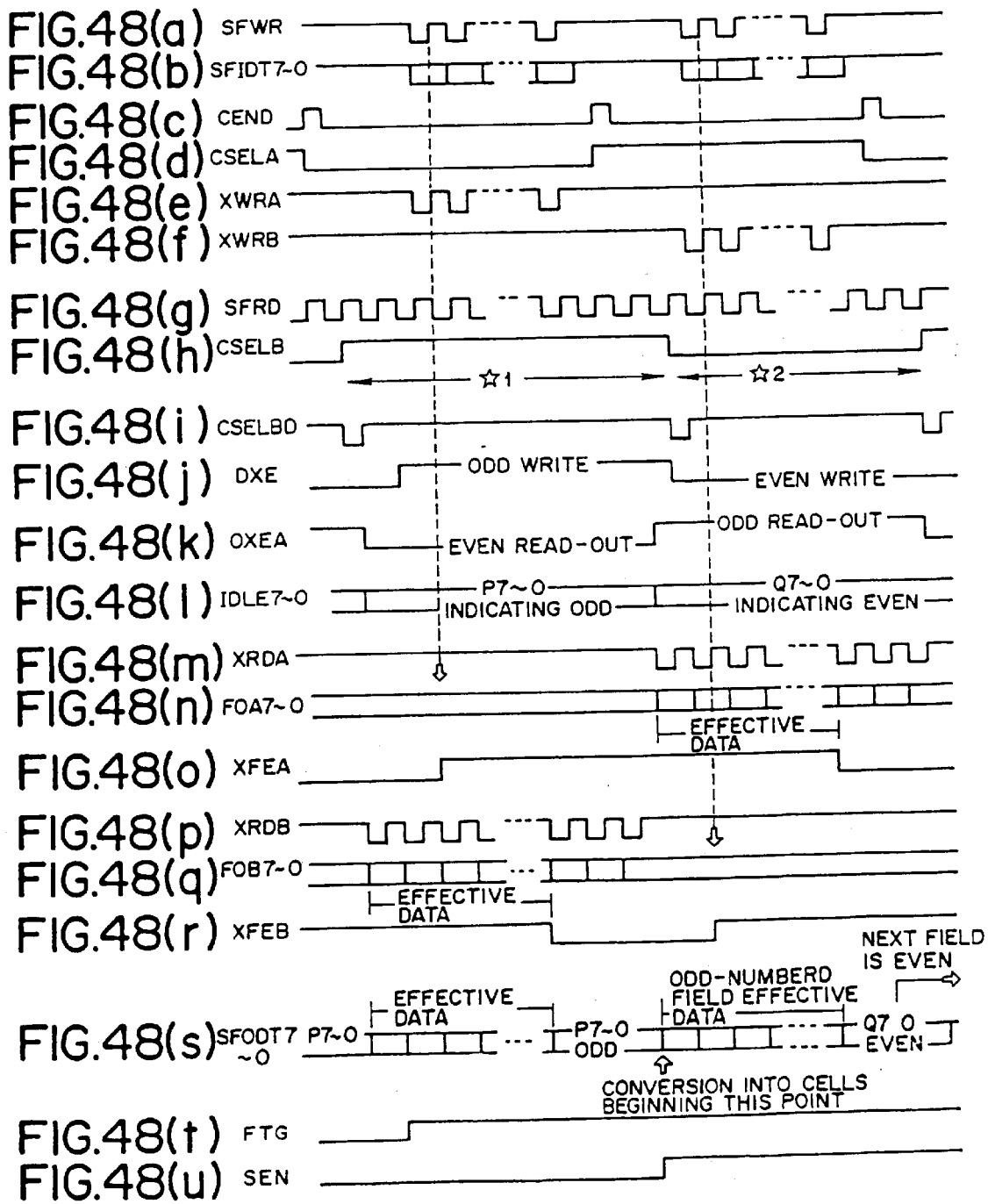
FIGS. 48(a) to 48(u) are timing charts illustrating operation of the transmission buffer section of FIG. 47.

More particularly, the VBR to CBR conversion timing production section 25-16 produces, for example, a timing signal CSELB which exhibits the L (or H) level only while the number of clocks of the transmission FIFO read signal SFRD is counted until it reaches 42,229 (for example, during a period indicated by ☆2 in FIG. 48(*h*)) so that VBR data from the transmission FIFO memory 25-7 or 25-8 are converted into CBR data SFODT7 to SFODT0 of 42,229 bytes, but produces another change-over signal CSELB which exhibits the H (or L) level only while the number of clocks of the transmission FIFO read signal SFRD is counted until it reaches 42,230 (for example, during a period indicated by ☆1 in FIG. 48(*h*)) so that VBR data from the transmission FIFO memory 25-7 or 25-8 are converted into CBR data of 42,230 bytes.

Accordingly, the VBR to CBR conversion timing production section 25-16 produces a change-over signal CSELB so that the change-over signal CSELB having the length of ☆2 in FIG. 48(*h*) and the change-over signal CSELB having the length of ☆1 appear, for example, in a cycle of 16 signals of K, K, K, K, K, L, L, L, L, L, L, L, L, L, L, L (where K=42,229 and L=42,230). It is to be noted that the other operation timings indicated by FIGS. 48(*a*) to 48(*g*) and 48(*i*) to 48(*u*) are similar to those in FIGS. 22(*a*) to 22(*u*), respectively.

Figure 49:
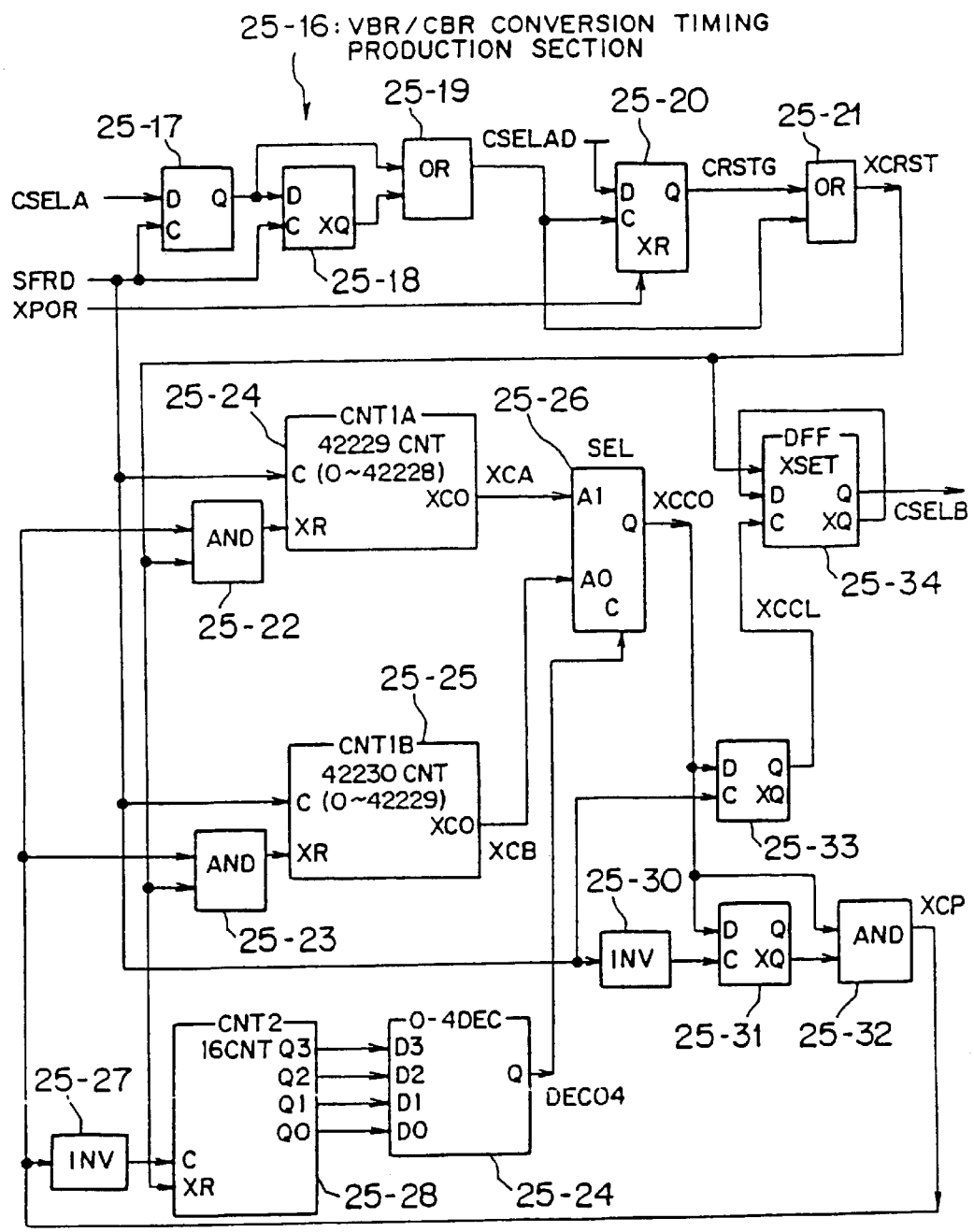
FIG. 49 is a block diagram showing a detailed construction of a VBR to CBR conversion timing production section of the transmission buffer section of FIG. 47.

To this end, the VBR to CBR conversion timing production section 25-16 includes, for example, as seen in FIG. 49, flip-flop circuits 25-17, 25-18, 25-20, 25-31, 25-33 and 25-34, OR gates 25-19 and 25-21, AND gates 25-22, 25-23 and 25-32, invertors (INV) 25-27 and 25-30, a counter (42,229ary) 25-24, another counter (42,230ary) 25-25, a further counter (hexadecimal) 25-28, and a decoder 25-29.

Figure 50:
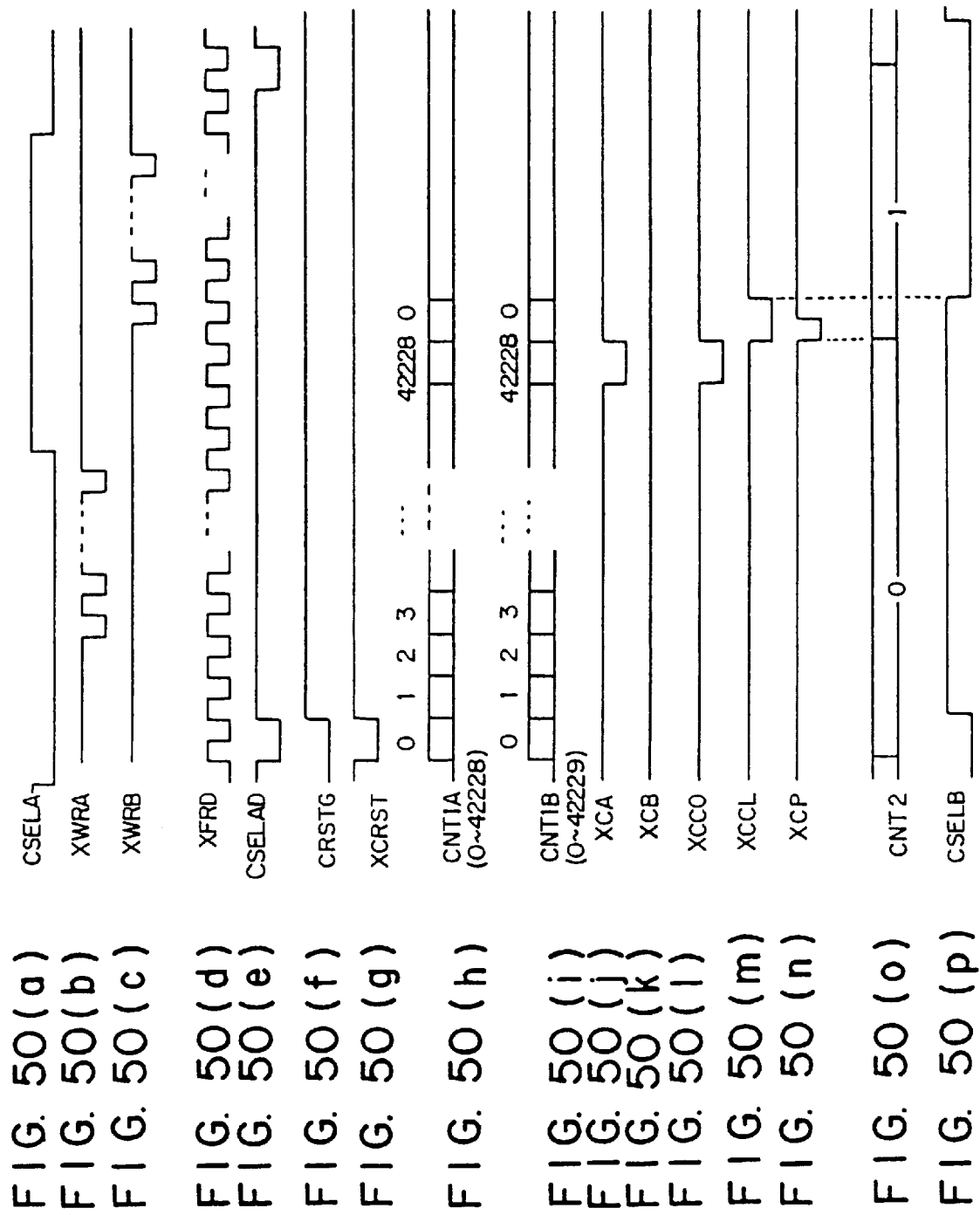
FIGS. 50(a) to 50(p) are timing charts illustrating operation of the VBR to CBR conversion timing production section of FIG. 49.

The flip-flop circuits 25-17 and 25-18 and the OR gate 25-19 performs rising variation point differentiation for the control signal CSELA (refer to FIGS. 50(*a*) and 51(*a*)) for the selector 25-3 using the transmission FIFO read signal SFRD (refer to FIGS. 50(*d*) and 51(*d*)) to produce a rising differentiation pulse signal CSELAD (refer to FIGS. 50(*e*) and 51(*e*)) with regard to the control signal CSELA. The flip-flop circuit 25-20 produces a counter reset gate signal CRSTG (refer to FIGS. 50(*f*) and 51(*f*)) based on the rising differentiation pulse signal CSELAD and a power supply signal XPOR.

The OR gate 25-21 produces a counter reset signal XCRST (refer to FIGS. 50(*g*) and 51(*g*)) based on the counter reset gate signal CRSTG from the flip-flop circuit 25-20 and the rising differentiation pulse signal CSELAD. The AND gates 25-22 and 25-23 logically AND the counter reset signal XCRST and a clock pulse signal XCP (refer to FIGS. 50(*n*) and 51(*n*)) from the AND gate 25-32.

Figure 51:
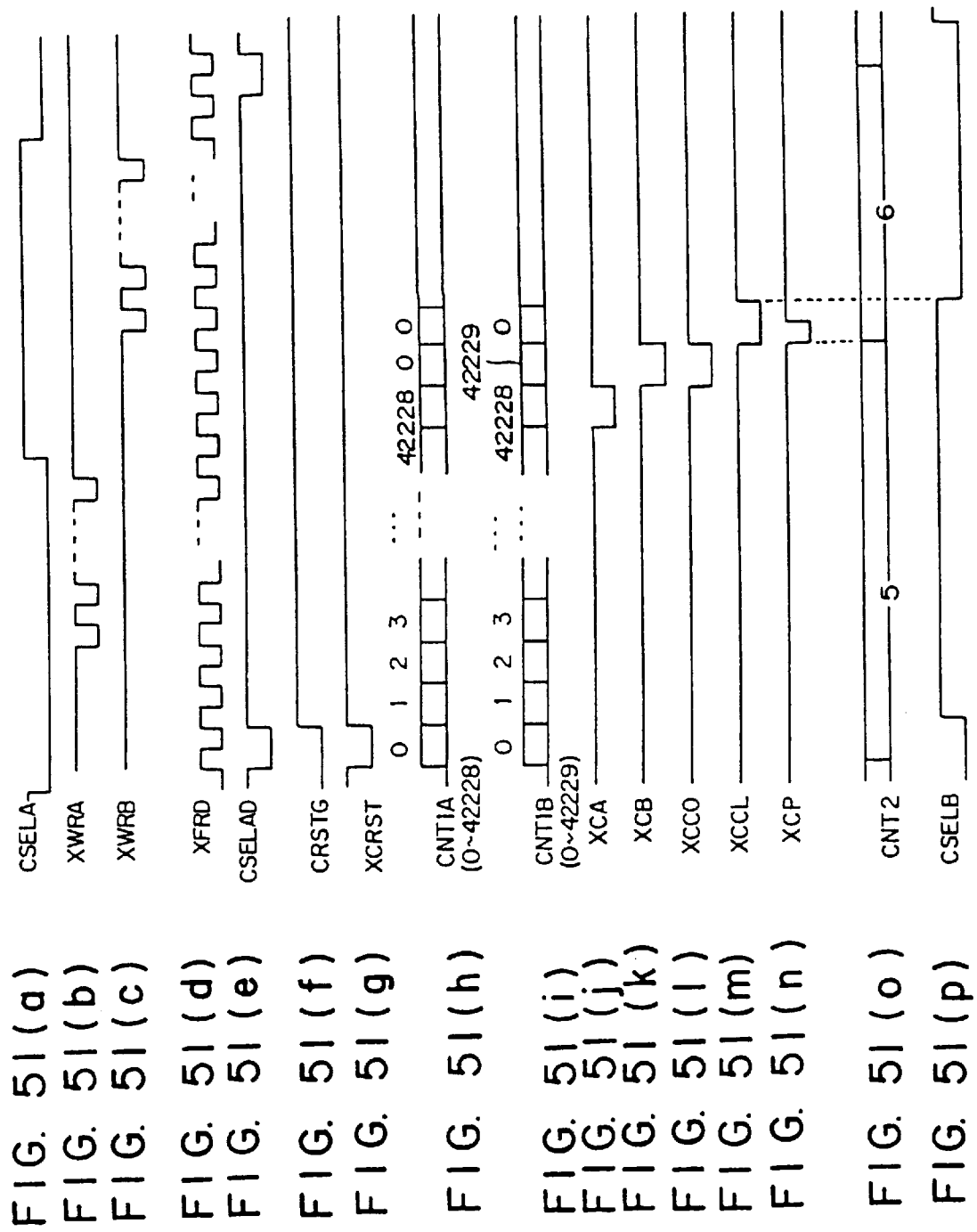
FIGS. 51(a) to 51(p) are timing charts illustrating another operation of the VBR to CBR conversion timing production section of FIG. 49.

The counter 25-24 repetitively counts the transmission FIFO read signal SFRD from 0 to 42,228 (refer to FIGS. 50(*h*) and 51(*h*)) and outputs, each time the count value 42,228 is reached, for example, an L level pulse signal XCA (refer to FIGS. 50(*j*) and 51(*j*)). The counter 25-25 repetitively counts the transmission FIFO read signal SFRD from 0 to 42,228 (refer to FIG. 50(*i*)) while the count value of the counter 25-28 remains between 0 to 4 both inclusive and outputs, each time the count value 42,228 is reached, an L level pulse signal XCA (refer to FIG. 51(*i*)). However, when the count value of the counter 25-28 is one of 5 to 15, the counter 25-25 repetitively counts the transmission FIFO read signal SFRD from 0 to 42,229 (refer to FIG. 51(*i*)) and outputs an L level pulse signal XCB (refer to FIG. 51(*k*)) each time the count value 42,229 is reached.

The selector 25-26 changes over its output in response to an output DECO4 of the decoder 25-29 so that it outputs a selection signal (counter carry-out signal XCCO, refer to FIGS. 50(*l*) and 51(*l*)) in response to a pulse signal XCA or XCB from the counter 25-24 or 25-25. Each of the invertors 25-27 and 25-30 inverts an input signal thereto and outputs the inverted signal. The counter 25-28 counts the output of the invertor 25-27 among 16 values from 0 to 15 and outputs a resulting count value CNT2 (refer to FIGS. 50(*o*), 51(*o*) and 52(*c*)).

The decoder 25-29 decodes 4 bits of the count value from the counter 25-28. When one of the count values of 0 to 4 is decoded, the decoder 25-29 outputs an H level pulse, but when one of the count values of 5 to 15 is decoded, the decoder 25-29 outputs an L level pulse, as a change-over signal DECO4 (refer to FIG. 52(*d*)) for the selector 25-26.

Figure 52:
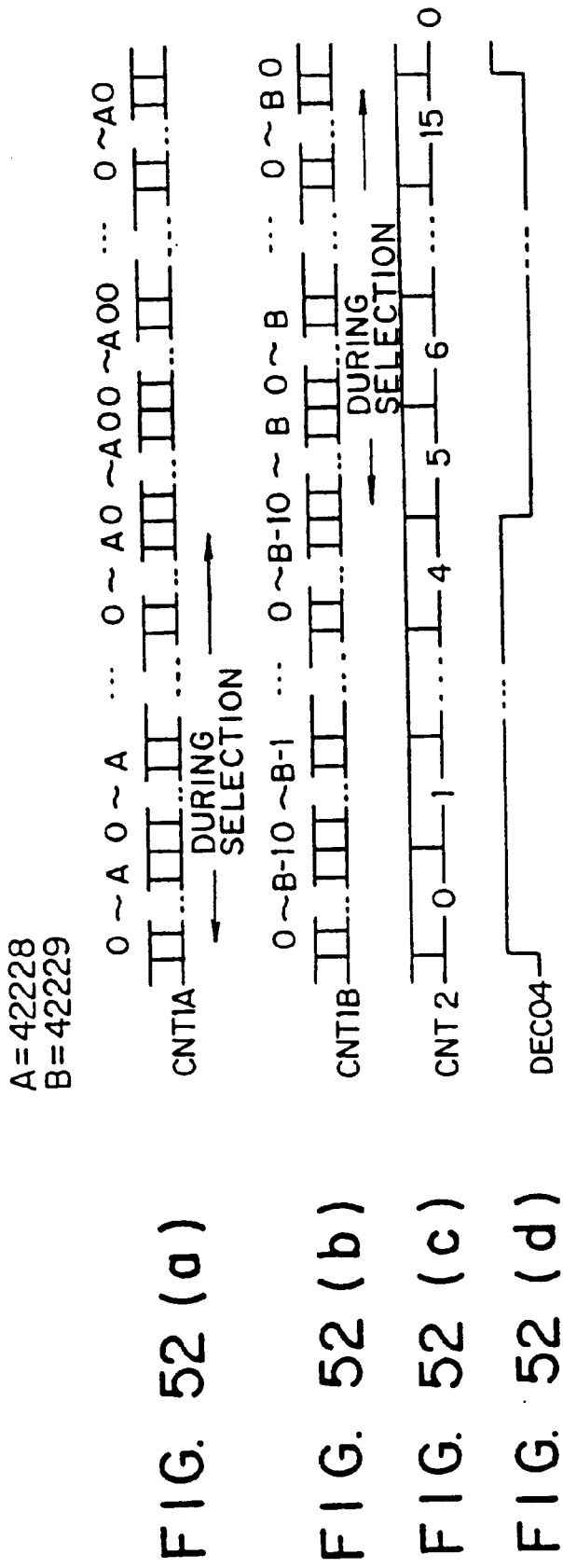
FIGS. 52(a) to 52(d) are timing charts illustrating a further operation of the VBR to CBR conversion timing production section of FIG. 49.

Consequently, while the counter 25-28 is counting within the count values from 0 to 4, the selector 25-26 is switchably connected to the counter 25-24 to select the output of the counter 25-24 as seen from FIG. 52(*a*), but while the counter 25-28 is counting within the count values from 5 to 15, the selector 25-26 is switchably connected to the counter 25-25 to select the output of the counter 25-25 as seen from FIG. 52(*a*).

The flip-flop circuit 25-31 and the AND gate 25-32 produce a clock pulse signal XCP (refer to FIGS. 50(*n*) and 51(*n*)) for the counters 25-24, 25-25 and 25-28 based on the selection signal XCCO from the selector 25-26 and the transmission FIFO read signal SFRD. The flip-flop circuit 25-33 delays the phase of the selection signal XCCO from the selector 25-26 by one clock interval of the transmission FIFO read signal SFRD to produce a clock signal XCCL (refer to FIGS. 50(*m*) and 51(*m*)) and outputs the clock signal XCCL. The flip-flop circuit 25-34 produces such a VBR to CBR conversion timing signal CSELB as illustrated in FIGS. 50(*p*) and 51(*p*), that is, a change-over signal for the selector 25-3, in response to the clock signal XCCL and the counter reset signal XCRST from the OR gate 25-21.

In the VBR to CBR conversion timing production section 25-16 having such a construction as described above, the output of the counter 25-28 is decoded by the decoder 25-29, and the output DECO4 of the decoder 25-29 is supplied to the selector 25-26. Consequently, the output of the selector 25-26 is chanted over for each 16 cycles to the counter 25-24 or 25-25 so that such a change-over signal CSELB for VBR to CBR conversion as described above is produced and supplied to the selector 25-3.

As a result, the VBR data in the transmission FIFO memory 25-7 or 25-8 are converted into CBR data of 42,229 bytes or 42,230 bytes by the selector 25-3 such that the ratio between the CBR data of 42,229 bytes and 42,230 bytes may be 5:11.

In short, the transmission buffer section 25 in this instance changes the data amounts of VBR data for the individual fields into predetermined data amounts and converts VBR data into CBR data so that the data amounts may have a predetermined ratio with respect to the data amount of the VBR data for all fields. Accordingly, the CBR data can be transmitted with a very high degree of certainty.

b-2-3. ATM Cell Transmission Section

Figure 23:
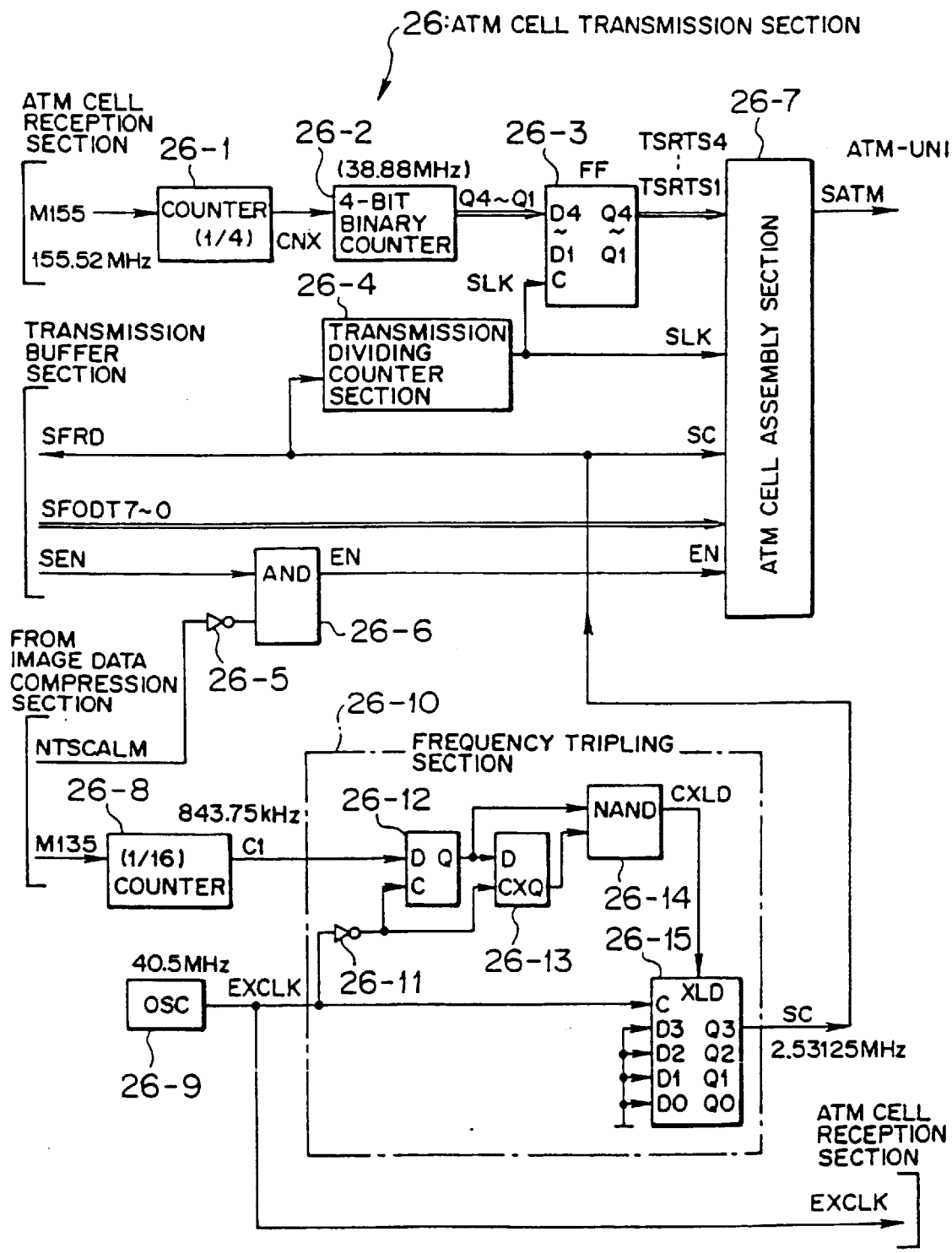
FIG. 23 is a block diagram showing a detailed construction of an ATM cell transmission section in the ATM image communication system of FIG. 3.

FIG. 23 shows in block diagram a detailed construction of the ATM cell transmission section 26 described hereinabove with reference to FIG. 2. Referring to FIG. 23, the ATM cell transmission section 26 shown includes a binary counter 26-1, a 4-bit binary counter 26-2, a flip-flop (FF) circuit 26-3, a transmission dividing counter section 26-4, an inversion gate 26-5, an AND gate 26-6, an ATM cell assembly section 26-7, a counter 26-8, an oscillator (OSC) 26-9 and a frequency tripling section 26-10.

The binary counter 26-1 divides the frequency (for example, 155.52 MHz) of a network clock signal M155 to ¼ to produce a reference clock signal CNX. The 4-bit binary counter 26-2 divides the reference clock signal CNX from the binary counter 26-1 to $2^{-4}$, $2^{-3}$, $2^{-2}$ and $2^{-1}$ to obtain 4-bit clock data Q4 to Q1. The flip-flop circuit 26-3 samples the clock data Q4 to Q1 from the 4-bit binary counter 26-2 using a clock signal SLK obtained by dividing a service clock signal SC of 2.53125 MHz to ⅟376 by the transmission dividing counter section 26-4 to produce transmission SRTS information of 4 bits.

The counter (dividing circuit) 26-8 divides the frequency (13.5 MHz) of the basic sampling clock signal M135 from the image data compression section 24 to ⅟16 to produce a clock signal C1 of 43.75 kHz. The oscillator 26-9 oscillates a clock signal EXCLK having a frequency three times that of the basic sampling clock signal M135. The frequency tripling section 26-10 triples the frequency (43.75 kHz) of the basic sampling clock signal M135 divided by the counter 26-8 to ⅟16 based on the output EXCLK of the oscillator 26-9 to produce a service clock signal SC of 2.53125 mentioned hereinabove.

To this end, the frequency tripling section 26-10 includes, as seen in FIG. 23, an inversion gate 26-11, a pair of flip-flop circuit 26-12 and 26-13 and a NAND gate 26-14 for cooperatively performing rising variation point differentiation of the clock signal C1 from the counter 26-8 with the clock signal EXCLK from the oscillator 26-9 to obtain a rising differentiation pulse signal CXLD, and a counter 26-15 for producing a service clock signal SC in response to the rising differentiation pulse signal CXLD and the output of the oscillator 26-9.

The AND gate 26-6 logically ANDs the transmission enable signal SEN from the transmission buffer section 25 and the NTSC alarm signal NTSCALM from the image data compression section 24. Here, the AND gate 26-6 outputs an enable signal EN (of the H level) for starting the ATM cell assembly section 26-7 when the transmission enable signal SEN has the H level and besides a signal obtained by inverting the NTSC alarm signal NTSCALM by the inversion gate 26-5 has the H level (that is, the NTSC alarm signal NTSCALM has the low level).

The ATM cell assembly section 26-7 assembles a transmission ATM cell SATM by placing transmission SRTS information TSRTS4 to TSRTS0 from the flip-flop circuit 26-3 and CBR data (transmission FIFO input data SFODT7 to SFODT0) read out from the transmission buffer section 25 into the data part of the ATM cell using the service clock signal SC produced by the frequency tripling section 26-10 and the clock signal SLK obtained by dividing the service clock signal SC to ⅟376 by the transmission dividing counter section 26-4 while the enable signal EN remains at the H level.

In the following, operation of the ATM cell transmission section 26 having the construction described above will be described in detail.

First, the ATM cell transmission section 26 must transmit a field timing together with transmission data of image data. Here, as described hereinabove, if compressed image data after compression can be transmitted with the basic sampling clock signal of 13.5 MHz, then the horizontal synchronizing frequency $f_H$ and the vertical synchronizing frequency $f_U$ can be regenerated from the basic sampling clock frequency $f_e$ ($f_e$=13.5 MHz) regenerated on the reception side based on the calculations of $f_H=f_e/858$ and $f_U=2f_H/525$, respectively.

Thus, in the ATM cell transmission section 26, an image clock (transmission rate information) signal based on the frequency of the basic sampling clock signal M135 is transmitted by the SRTS method of the AAL 1 by the counter 26-8, oscillator 26-9 and frequency tripling section 26-10 so that the data transmission rate may be equal to N times 1/M time the clock frequency to be transmitted. Consequently, on the reception side, the basic sampling clock signal M135 can be regenerated by increasing the frequency of the regenerated clock signal of the data transmission rate to N times and then decreasing the resulting increased frequency to 1/M.

For example, in the present embodiment, where M=2 and N=3, the basic sampling clock signal M135 is first reduced to ½ and then increased to three times to obtain a transmission user clock SCK of the 20.25 MHz. Consequently, effective utilization of a transmission line upon transmission of fixed length data can be achieved with certainty. It is to be noted that the transmission user clock SCK in this instance is further reduced to ⅛ in order to allow processing in units of one byte.

Actually, however, making use of the fact that only a transmission clock signal is used but the transmission user clock SCK itself is not used, the basic sampling clock signal M135 is first multiplied by ½ and then by ⅛ (that is, totally by ⅟16) by the counter 26-8 and further by 3 by the frequency tripling section 26-10.

In the frequency tripling section 26-10, a PLO (Phase-Locked Oscillator) or the like is not used, but a differentiation pulse signal CXLD obtained by detection of a rising edge of the output of the oscillator 26-9 having a frequency equal to ⅛ that of the image basic clock signal by means of the inversion gate 26-11, flip-flop circuits 26-12 and 26-13 and NAND gate 26-14 is inputted to a reset input XLD of the counter 26-15. Consequently, the output (EXCLK) of the oscillator 26-9 having a nominal value of K (in the present embodiment, for example, K=2) times that of the user clock signal is divided to ⅛K (that is, ⅟16) by the counter 26-15 based on the differentiation pulse signal CXLD.

For example, such a basic sampling clock signal M135 as seen in FIG. 24(a) is first frequency divided to ⅟16 by the counter 26-8 to produce such a clock signal C1 having a frequency of 843.75 MHz as seen in FIG. 24(b). The clock signal C1 is rising variation point differentiated by the inversion gate 26-11, flip-flop circuits 26-12 and 26-13 and NAND gate 26-14 using an oscillation clock signal EXCK outputted from the oscillator 26-9 of the nominal value of 40.5 MHz as seen in FIGS. 25(a) to 25(c) to produce a rising differentiation pulse signal CXLD.

Meanwhile, the oscillation clock signal EXCK is divided to ⅟16 by the counter 26-15 with the rising differentiation pulse signal CXLD inputted to the load input XLD thereof so that such a service clock signal SC as seen from FIG. 25(d) is produced. It is to be noted that the frequency of the service clock signal SC is 2.53125 MHz, and the service clock signal SC is outputted as a transmission FIFO read signal SFRD to the transmission buffer section 25 (refer to FIG. 20) described hereinabove.

Further, such a network clock signal MLSS as seen from FIG. 26(o) is divided to ½$^X$ (in the present embodiment X=2) by the binary counter 26-1 to produce such a reference clock signal CNX of a reference clock frequency fnx =33.88 MHz as seen from FIG. 26(d). In this instance, since the transmission user clock frequency fs is 20.25 MHz, the following equation is satisfied:

$$1 \leq fnx/fs < 2$$

Further, the reference clock signal CNX is counted by the 4-bit binary counter 26-2, and the count value Q4 to Q1

(refer to FIGS. 26(e) to 26(h)) of the 4-bit binary counter 26-2 is sampled by the flip-flop circuit 26-3 in response to a transmission load clock signal SLK (refer to FIG. 26(c)) divided to 1/376 the transmission clock signal (that is, to 1/3,008 the frequency of the transmission user clock signal) by the transmission dividing counter section 26-4 to produce transmission SRTS data TSRTS4 to TSRTS1 (refer to FIG. 26(i)).

On the other hand, in this instance, the transmission enable signal SEN (refer to FIG. 26(i)) inputted from the transmission buffer section 25 and a signal obtained by inverting the NTSC alarm signal NTSCALM (refer to FIG. 26(k)) by the inversion gate 26-5 are inputted to the AND gate 26-6 to produce an enable signal EN (refer to FIG. 26(l)). It is to be noted that the enable signal EN exhibits the L level when the transmission enable signal SEN has the L level or the NTSC alarm signal NTSCALM has the H level as seen from FIG. 26(l).

Then, the transmission clock signal SC (refer to FIG. 26(b)), the transmission FIFO output data SFODT7 to SFODT0 (refer to FIG. 26(a)) synchronized with a rising edge of the transmission clock signal SC, the transmission load clock signal SLK and the transmission SRTS data TSRTS4 to TSRTS1 synchronized with a rising edge of the transmission load clock signal SLK are inputted to the ATM cell assembly section 26-7.

The ATM cell assembly section 26-7 assembles ATM cells based on the data and the clock signals inputted thereto and outputs transmission ATM cells SATM (refer to FIGS. 26(m) and 26(n)) to the ATM-UNI. It is to be noted that, when the enable signal EN is at the L level (that is, when the transmission enable signal SEN is at the low level and no transmission request is received or when the NTSC alarm signal NTSCALM is at the H level and an alarm is generated), transmission of ATM cells is stopped.

Further, since the oscillation clock signal EXCLK of the oscillator 26-9 is used also by the ATM cell reception section 27, it is inputted to the ATM cell reception section 27.

In this manner, since the ATM cell reception section 27 described above is constructed such that the transmission rate of CBR data obtained by conversion by the transmission buffer section 25 is changed to N/M times (M and N are integers) the basic clock frequency to be transmitted, transmission of a clock signal of an arbitrary transmission rate other than the transmission rate of image data is permitted.

Further, since the ATM cell transmission section 26 includes the counter (dividing circuit) 26-8 for dividing the basic sampling clock signal M135 to 1/M, the oscillator 26-9 for oscillating a clock frequency equal to (N/M)×K times the frequency of the basic sampling clock signal M135, and the frequency tripling section 26-10 for multiplying the frequency of the basic sampling clock signal M135 divided to 1/M by the counter 26-8 by N based on the output of the oscillator 26-9, simplification in circuit construction and reduction in cost can be achieved.

Further, since the frequency tripling section 26-10 is constructed such that it includes the counter 26-15 for dividing an input clock signal thereto to 1/8K and a differentiation pulse signal obtained by detection of a rising edge of the basic sampling clock signal divided by the counter 26-8 using the clock frequency of the oscillator 26-9 is inputted to the reset input terminal of the counter 26-15, the circuit thereof is realized with a simple construction without using a PLO (Phase-Locked Oscillator) or a like circuit.

Further, in this instance, since the basic sampling clock signal can be transmitted by the SRTS method in response to the transmission rate of compressed image data to be transmitted as ATM cells, a clock signal of an arbitrary frequency other than the frequency of the image clock signal can be transmitted by the SRTS method.

b-3. Reception Section b-3-1. ATM Cell Reception Section

Figure 27:
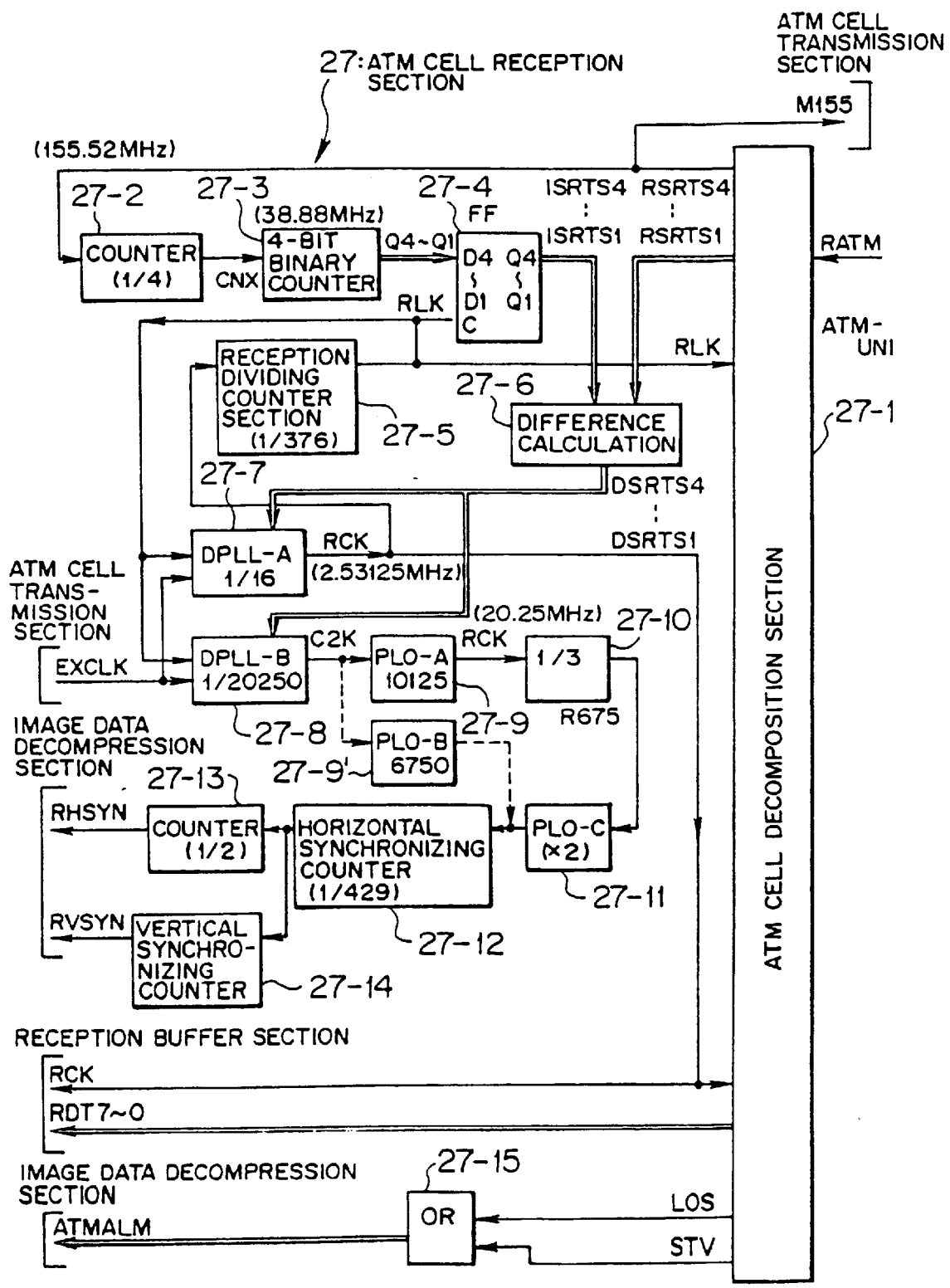
FIG. 27 is a block diagram showing a detailed construction of an ATM cell reception section in the ATM image communication system of FIG. 2.

FIG. 27 shows in block diagram a detailed construction of the ATM cell reception section 27 described hereinabove with reference to FIG. 2. Referring to FIG. 27, the ATM cell reception section 27 shown includes an ATM cell decomposition section 27-1, a binary counter 27-2, a 4-bit binary counter 27-3, a flip-flop (FF) circuit 27-4, a reception dividing counter section 27-5, a difference calculation section 27-6, a pair of digital phase-locked loops (DPLLs) 27-7 and 27-8 (DPLL-A and DPLL-B), a PLO circuit (PLO-A) 27-9, a dividing circuit 27-10, another PLO circuit (PLO-C) 27-11, a horizontal synchronizing counter 27-12, a binary counter 27-13, a vertical synchronizing counter 27-14 and an OR gate 27-15.

The binary counter 27-2, 4-bit binary counter 27-3 and FF circuit 27-4 construct an SRTS information production section (transmission rate information production section) which produces internal SRTS information. The difference calculation section 27-6 performs differential calculation between the internal SRTS information and SRTS information included in a received ATM cell. The DPLL (Digital Phase Locked Loop) circuit (internal clock producing PLL section) 27-7 produces an internal clock signal (2.53125 MHz) based on the differential SRTS information obtained by the difference calculation section 27-6.

The DPLL (sampling clock producing PLL section) 27-8 produces a sampling clock signal having a predetermined frequency (here, 2 kHz) for use for production of the basic sampling clock signal M135 based on the difference SRTS information obtained by the AND gate 26-6. The PLO circuit (reception user clock producing PLO section) 27-9 increases the frequency of the sampling clock signal from the DPLL circuit 27-8 to a predetermined number of times (here, to 10,125 times) to produce a reception user clock signal of a desired frequency (20.25 MHz). The dividing circuit 27-10 and PLO circuit 27-11 serve as a basic sampling clock production section which produces the basic sampling clock signal M135 from the reception user clock signal.

In the following, operation of the ATM cell reception section 27 having the construction described above will be described in detail.

Figure 28:
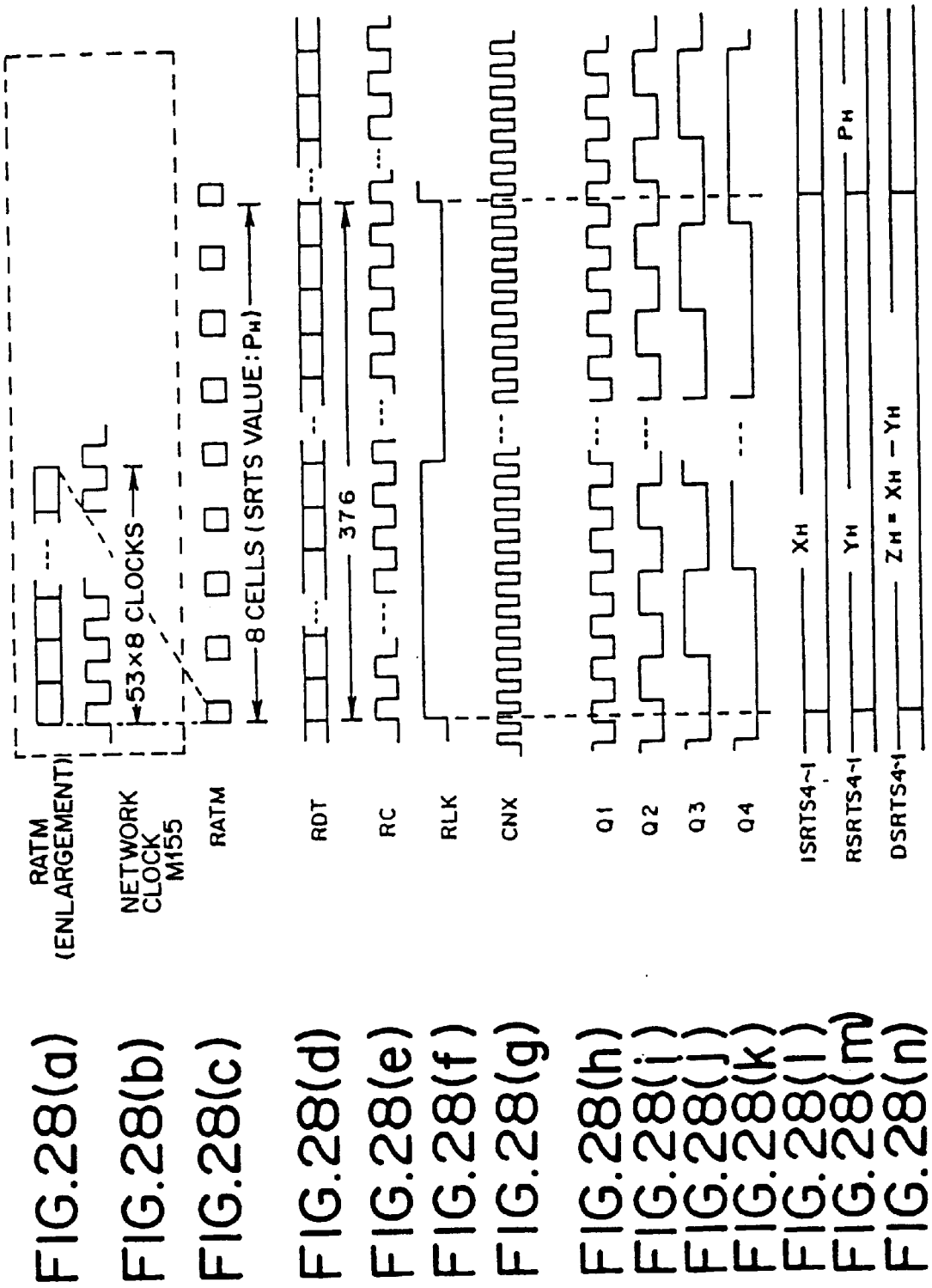
FIGS. 28(a) to 28(n) are timing charts illustrating an example of operation of the ATM cell reception section of FIG. 27.

First, if a reception ATM cell RATM (refer to FIGS. 28(a) to 28(c)) is inputted from the ATM-UNI to the ATM cell reception section 27, then the ATM cell reception section 27 outputs a reception clock signal RC (refer to FIG. 28(e)) and outputs reception data RDT7 to RDT0 (refer to FIG. 28(d)) in synchronism with a rising edge of the reception clock signal RC. Further, the ATM cell reception section 27 outputs reception RSRTS data RSRTS4 to RSRTS1 (refer to FIG. 28(m)) in synchronism with a rising edge of a reception load clock signal RLK (refer to FIG. 28(f)) inputted thereto. Further, in this instance, the ATM cell reception section 27 outputs also a network clock signal M155 (refer to FIG. 28(b)) of 155.52 MHz.

The network clock signal M155 is divided to $1/2^X$ (in the present embodiment, X=2) by the binary counter 27-2 so that a reference clock signal CNX (refer to FIG. 28(g)) of the reference clock frequency fnx=33.88 MHz is produced. In this instance, since the clock frequency fs is 20.25 MHz, the following expression $$1 \leq fnx/fs < 2$$

is satisfied similarly as on the transmission side.

The reference clock signal CNX is counted by the 4-bit binary counter 27-3, and the count value Q4 to Q1 (refer to FIGS. 28(h) to 28(k)) of the 4-bit binary counter 27-3 is sampled by the flip-flop circuit 27-4 in response to the reception load clock signal RLK obtained by dividing the reception clock signal RC to 1/376 by the reception dividing counter section 27-5 so that internal SRTS data ISRTS4 to ISRTS1 (refer to FIG. 28(l)) is produced.

It is to be noted that, in this instance, if reception of an optical signal from the ATM-UNI is stopped, then a silence signal LOS changes over its level to the H level, and if reception of a cell is stopped, then a starvation signal STV changes over its level to the H level. Then, the silence signal LOS and the starvation signal STV are inputted to the OR gate 27-15, by which an ATM alarm signal ATMALM is produced in response to them, and the ATM alarm signal ATMALM is outputted to the image data decompression section 29. In response to the reception ATM alarm signal ATMALM, the image data decompression section 29 outputs a fixed image pattern such as a blue pattern as an image after image data decompression processing as hereinafter described.

In short, the ATM cell reception section 27 includes the OR gate (logical OR calculation section) 27-15 which logically ORs the silence signal LOS indicating a state in which no ATM cell is received and the starvation signal STV indicating an empty state of the buffer for temporarily storing received ATM cells and outputs an ATM alarm signal ATMALM in accordance with a result of the calculation. The ATM cell reception section 27 is constructed such that, when the ATM alarm signal ATMALM is outputted from the OR gate 27-15, it notifies an alarm signal to the image data decompression section 29 so that the image data decompression section 29 may regenerate image data of the predetermined pattern such as a blue pattern as original moving picture data.

Accordingly, it can be notified that an ATM cell is not received regularly, and it can be prevented that an image after regeneration may become ugly.

Further, the reception RSRTS data RSRTS4 to RSRTS1 and the internal SRTS data ISRTS4 to ISRTS1 produced internally are inputted to the difference calculation section 27-6, by which difference calculation between them is performed to produce difference SRTS data DSRTS4 to DSRTS1 (refer to FIG. 28(n)).

The difference SRTS data DSRTS4 to DSRTS1 are fed back to the DPLL circuit (DPLL-A) 27-7 which divides the frequency of the oscillation clock signal EXCLK inputted thereto from the ATM cell transmission section 26 to 1/16 as described hereinabove to produce the reception clock signal RC described hereinabove. It is to be noted that the reception clock signal RC produced in such a manner as described above coincides in frequency with the service clock signal SC of the other party apparatus connected via the ATM-UNI based on the SRTS method.

Further, in order to regenerate the basic sampling clock signal of the transmission side, the ATM cell reception section 27 decreases the frequency of the reception user clock signal which is a regenerated clock signal of the data transmission rate of 20.25 MHz to 1/M and then increases it to N times. In particular, for example, where M=2 and N=3, in the ATM cell reception section 27, the oscillation clock signal EXCLK inputted from the ATM cell transmission section 26 is divided to 1/20,250 by the DPLL circuit (DPSS-B) 27-8 based on the difference SRTS data DSRTS4 to DSRTS1 fed back from the difference calculation section 27-6 so that a clock signal C2K of 2 kHz is produced.

The clock signal C2K is increased in frequency to 1,012 times by the PLO circuit 27-9 to produce a reception user clock signal RCK of 20.25 MHz. The reception user clock signal RCK is divided to 1/3 by the dividing circuit 27-10 and then increased to twice by the PLO circuit (PLO-C) 27-11 to produce a regeneration basic sampling clock signal R135 of 13.5 MHz.

In short, the ATM cell reception section 27 performs difference calculation between the internal SRTS data and the reception SRTS data by the difference calculation section 27-6 to obtain difference SRTS data, produces a reception user clock signal RCK (internal clock signal) for controlling the output of the flip-flop circuit 27-4 so that the difference SRTS data obtained by the difference calculation section 27-6 may be equal to "0" by means of the dividing circuit 27-10 and the PLO circuit 27-11, and produces a basic sampling clock signal M135 based on the reception user clock signal RCK.

Accordingly, the basic sampling clock signal M135 can be produced with certainty by a very simple construction.

It is to be noted that, since the reception user clock of 20.25 MHz is not used for image regeneration, the basic sampling clock signal R135 may be produced otherwise by increasing, using a PLO circuit (PLO-B) 27-9', the frequency of the clock signal C2K of 2 kHz to 6,750 times and then increasing the resulting frequency to two times along such a path indicated by a broken line in FIG. 27. Accordingly, in this instance, the basic sampling clock signal R135 can be regenerated without using the reception user clock signal RCK, which allows simplification of the circuit.

Then, from the clock frequency $f_e$ ($f_e$=13.5 MHz) of the basic sampling clock signal R135 regenerated on the reception side as described above, the horizontal synchronizing frequency $f_H$ and the vertical synchronizing frequency $f_U$ are regenerated by the calculations of $f_H=f_e/858$ and $f_U=2f_H/525$, respectively. In particular, the regeneration basic sampling clock signal R135 is first divided to 1/429 by the horizontal synchronizing counter 27-12 and then divided to ½ by the binary counter 27-13 to produce a reception horizontal synchronizing signal RHSYN. Meanwhile, the regeneration basic sampling clock signal R135 after divided to 1/429 by the horizontal synchronizing counter 27-12 is further divided to 1/525 by the vertical synchronizing counter 27-14 to produce a reception vertical synchronizing signal RVSYN.

In short, in order to allow the basic sampling clock signal R135 as an image clock signal of the transmission side to be regenerated on the reception side, the ATM cell reception section 27 includes a horizontal synchronizing signal regeneration section (the horizontal synchronizing counter 27-12 and binary counter 27-13) which divides the basic sampling clock signal R135 of 13.5 MHz to 1/858 to regenerate a horizontal synchronizing signal and a vertical 1synchronizing signal regeneration section (the horizontal synchronizing counter 27-12 and vertical synchronizing counter 27-14) which divides the basic sampling clock signal R135 to 1/429 and further dividing the thus divided basic sampling clock signal R135 to 1/525 to produce a vertical synchronizing signal. Consequently, field timing information which presents the same timing as that of the transmission side can be produced on the reception side, which makes real time communication possible.

Figure 29:
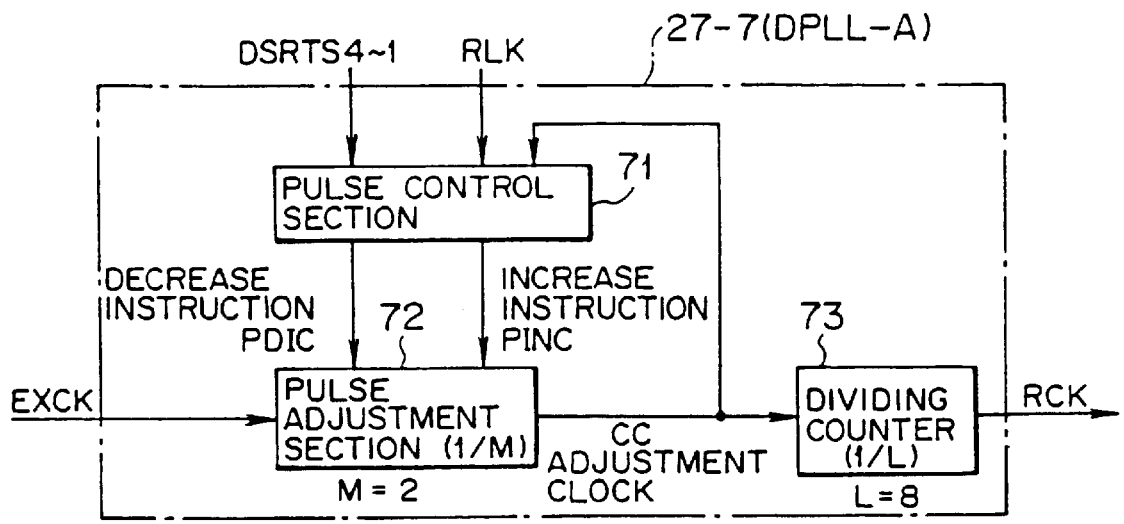
FIG. 29 is a block diagram showing a construction of a DPLL circuit used in the ATM cell reception section of FIG. 27.
Figure 30:
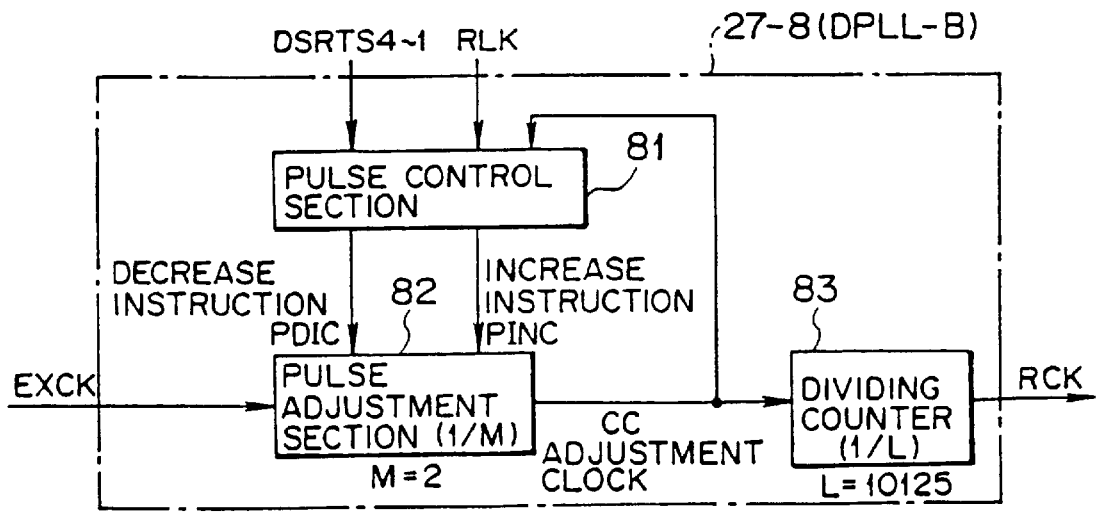
FIG. 30 is a block diagram showing a construction of another DPLL circuit used in the ATM cell reception section of FIG. 27.

FIGS. 29 and 30 show in block diagrams constructions of the DPLL circuits 27-7 and 27-8 described hereinabove, respectively. Referring to FIGS. 29 and 30, each of the DPLL circuits 27-7 and 27-8 includes a pulse control section 71 or 81, a pulse adjustment section 72 or 82 and a dividing counter 73 or 83 in order to divide an input clock signal (oscillation clock signal EXCLK inputted from the ATM cell transmission section 26) to 1/16 or 1/22,250 as described above to produce a reception user clock signal RCK and a clock signal C2K of 2 kHz.

The pulse control section 71 or 81 produces a decrease instruction signal PDIC or an increase instruction signal PINC for frequency adjustment of a clock pulse signal to be produced based on the difference SRTS data DSRTS4 to DSRTS1 from the difference calculation section 27-6, the reception load clock signal RLK obtained by dividing the reception user clock signal RCK fed back from the reception dividing counter section 27-5 to 1/376 and an adjustment clock signal CC fed back in the inside of the pulse control section 71 or 81.

Figure 31:
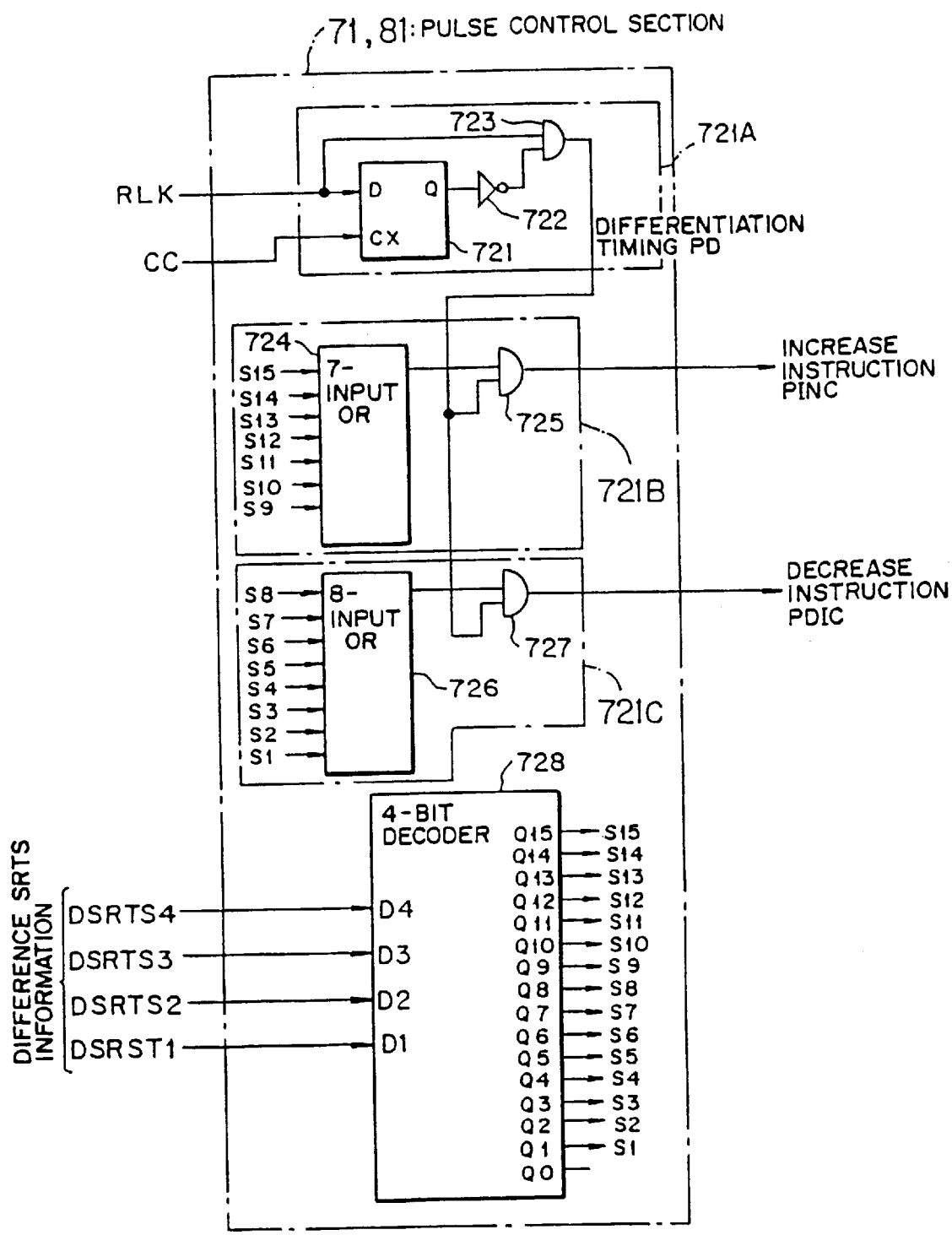
FIG. 31 is a block diagram showing a construction of a pulse control section used in the DPLL circuits of FIGS. 29 and 30.

To this end, referring to FIG. 31, the pulse control section 71 or 81 described above includes a differentiation timing detection section 721A for detecting a differentiation timing from the reception load clock signal RLK and the adjustment clock signal CC by means of a flip-flop circuit 721, an inversion gate 722 and an AND gate 723, an increase instruction signal production section 721B and a decrease instruction signal production section 721C for producing the increase instruction signal PINC and the decrease instruction signal PDIC by means of a 7-input OR gate 724, an AND gate 725 and an 8-input OR gate 726, an AND gate 727, respectively, based on the differentiation timing detected by the differentiation timing detection section 721A, and a 4-bit decoder 728.

It is to be noted that each of the pulse control sections 71 and 81 is constructed such that data S15 to S1 obtained by decoding each difference SRTS data DSRTS4 to DSRTS1 by the 4-bit decoder 728 is inputted to the 7-input OR gate 724 and the 8-input OR gate 726.

Further, in FIGS. 29 and 30, each of the pulse adjustment sections 72 and 82 divides the oscillation clock signal EXCLK from the ATM cell transmission section 26 to 1/M (M is a natural number) in response to the decrease instruction signal PDIC or increase instruction signal PINC from the pulse control section 71 or 81 to produce an adjustment clock signal CC.

Figure 33:
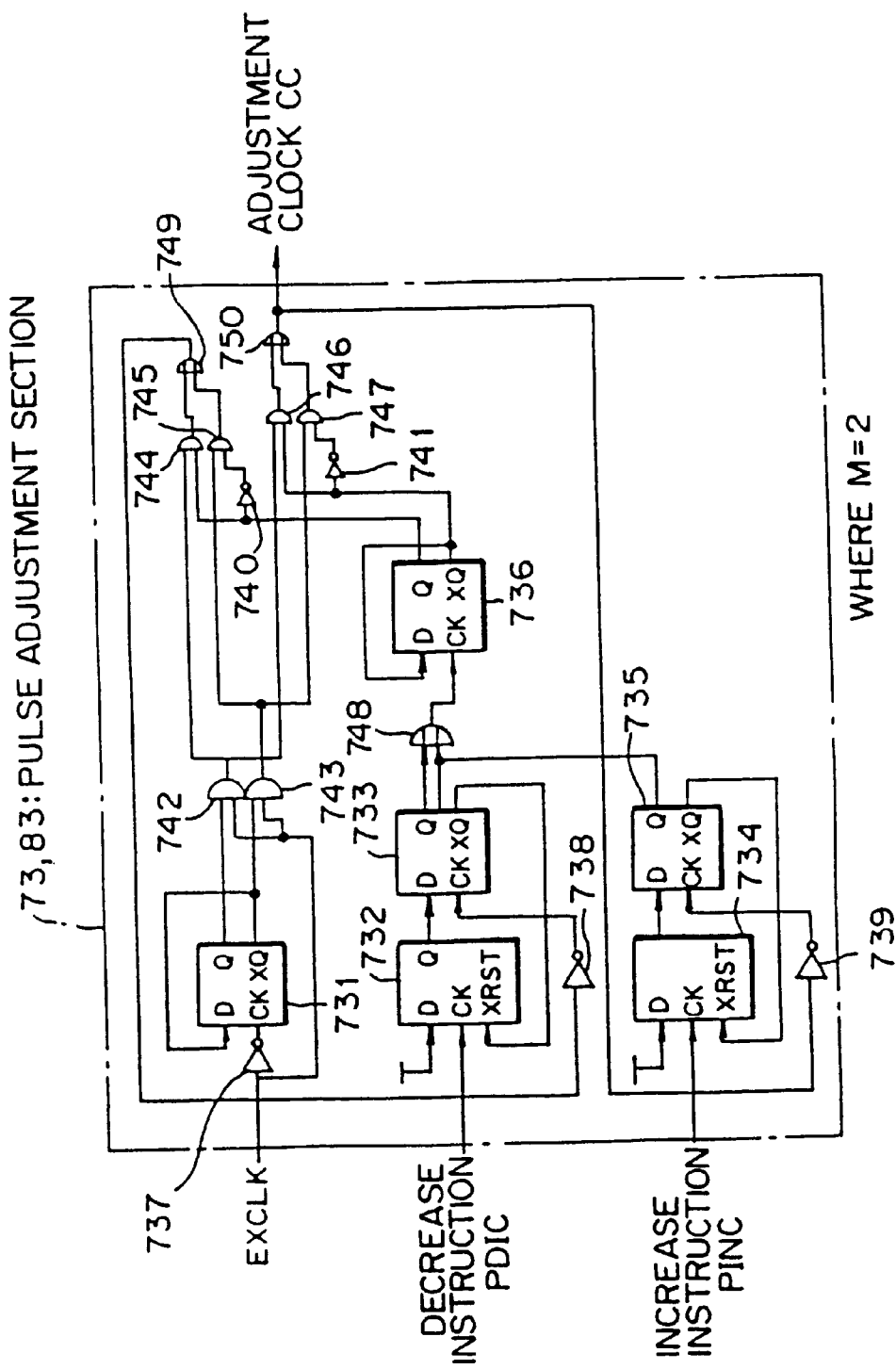
FIG. 33 is a block diagram showing a construction of a pulse adjustment section used in the DPLL circuits of FIGS. 29 and 30.
Figure 36C:
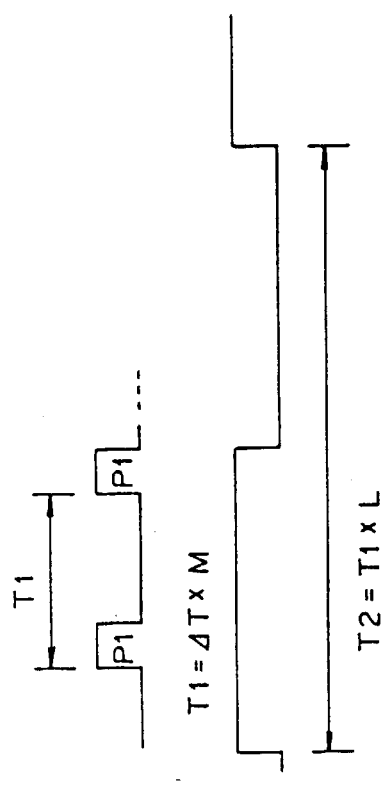

To this end, each of the pulse adjustment sections 72 and 82 includes, as seen in FIG. 33, flip-flop circuits 731 to 736, inversion gates 737 to 741, AND gates 742 to 747, and OR gates 748 to 750, and a clock signal corresponding to the decrease instruction signal PDIC or increase instruction signal PINC is selectively outputted as an adjustment clock signal CC from the OR gate 750. It is to be noted that FIGS. 34 to 37 illustrate in time charts different examples of operation timings of the pulse adjustment section 72 or 82.

Each of the dividing counters 73 and 83 divides the adjustment clock signal CC to 1/M (M is a natural number) to produce a reception user clock signal RCK.

Figure 32:
FIGS. 32(a) to 32(g) are timing charts illustrating an example of operation of the pulse control section of FIG. 31.

Consequently, first in the pulse control section 71 or 81, such an increase instruction signal PINC or decrease instruction signal PDIC as seen in FIG. 32(f) or 32(g) is produced in response to such timings of the clock signals and the data as illustrated in FIGS. 32(a) to 32(e), and in response to the increase instruction signal PINC or decrease instruction signal PDIC, the oscillation clock signal EXCLK is divided to 1/M (M is a natural number) by the pulse adjustment section 72 or 82 to produce an adjustment clock signal CC. The adjustment clock signal CC is divided to 1/L (L is a natural number) by the dividing counter 73 or 83 to produce a reception user clock signal RCK.

Figure 38:
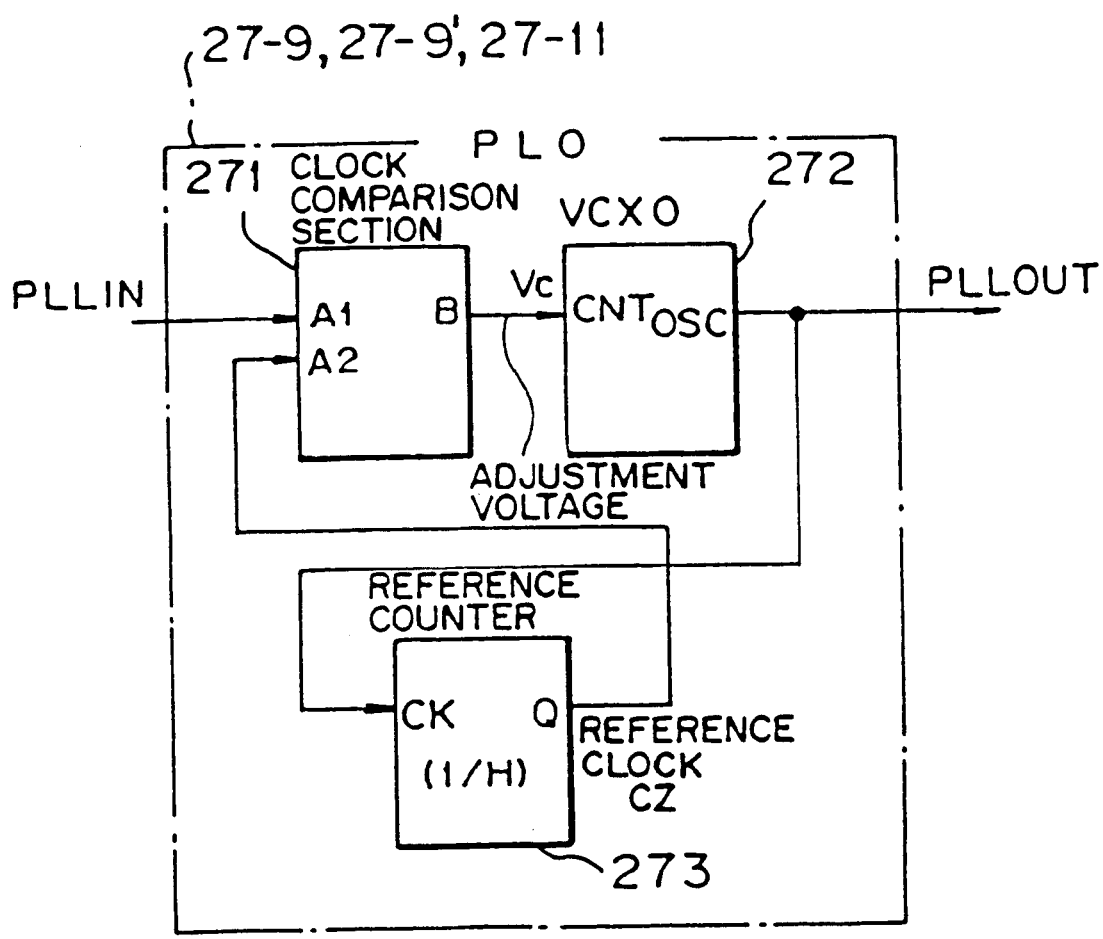
FIG. 38 is a block diagram showing a construction of a PLO circuit employed in the ATM cell reception section of FIG. 27.

FIG. 38 shows in block diagram a construction of the PLO circuit 27-9 (or the PLO circuit 27-9' or 27-11) described hereinabove with reference to FIG. 27. Referring to FIG. 38, the PLO circuit 27-9 includes a clock comparison section 271 which compares an input clock signal with a reference clock signal to produce a difference between them as an adjustment voltage Vc, a voltage controlled oscillator (VCXO) 272 which produces a clock signal having a frequency corresponding to the adjustment voltage Vc produced by the clock comparison section 271, and a reference counter 273 which divides the output of the voltage controlled oscillator 272 to 1/H (H is a natural number) to obtain a clock signal and outputs the clock signals a reference clock signal CZ for the clock comparison section 271.

Thus, with the PLO circuit 27-9 (or PLO circuit 27-9' or 27-11), if the setting of the division ratio 1/H of the reference counter 273 is varied, then an input clock signal PLLIN can be converted into a clock signal PLLOUT of a frequency equal to a desired multiple of the frequency of the input clock signal PLLIN to be outputted. For example, in the present embodiment, since the PLO circuit 27-9 increases the frequency of an input clock signal thereto to 10,125 times as described hereinabove with reference to FIG. 27, the number H should be set to H=10,125, and since the PLO circuits 27-9' and 27-11 increase the frequency of an input clock signal thereto to 67,510 times and 2 times, respectively, the value H should be set to H=67,510 and H=2, respectively.

Figure 39:
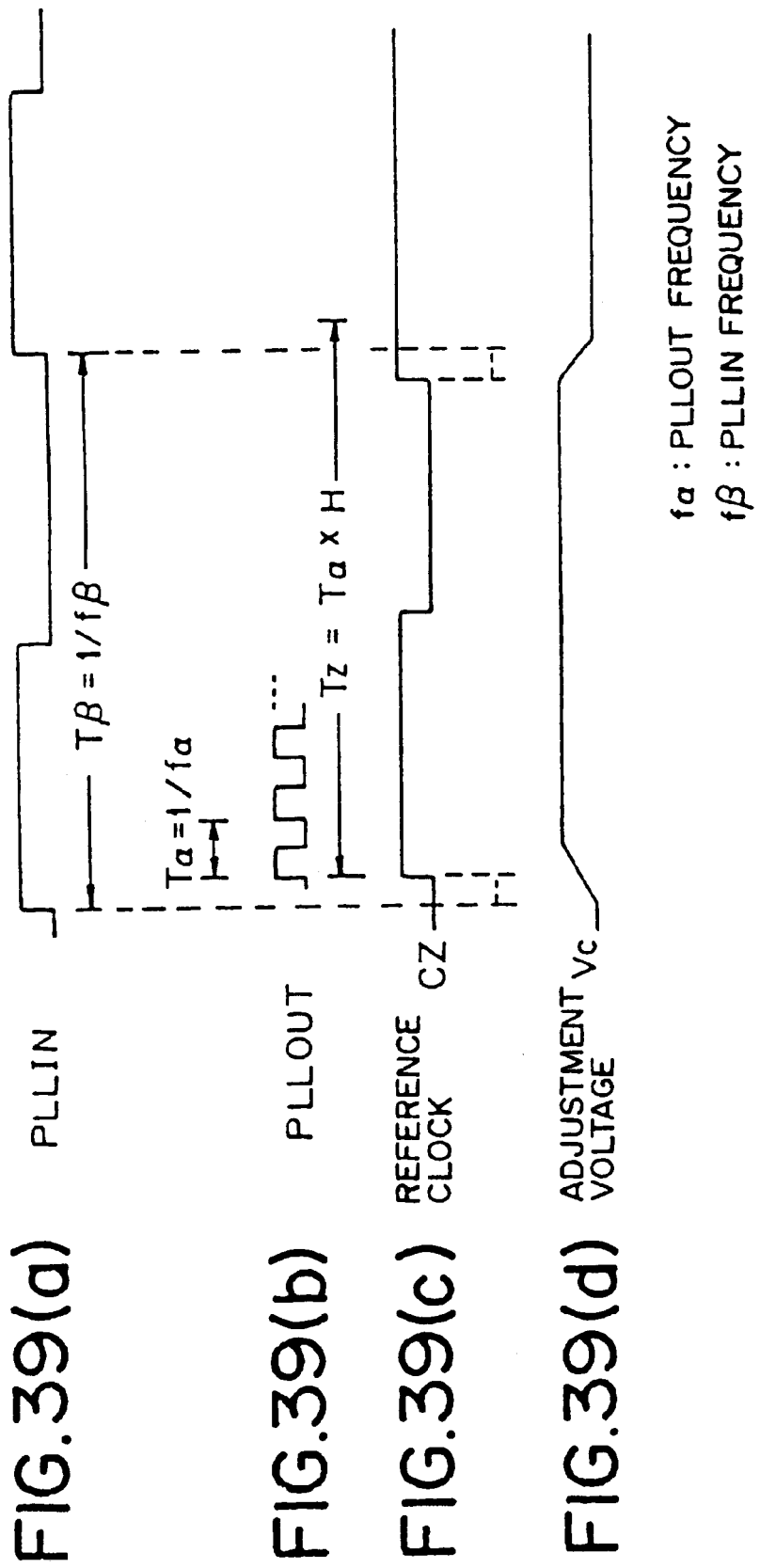
FIGS. 39(a) to 39(d) are timing charts illustrating an example of operation of the PLO circuit of FIG. 38.

Then, for example, if such a clock signal as seen in FIG. 39(a) is inputted as the input clock signal PLLIN to the PLO circuit 27-9, then in the PLO circuit 27-9, the input clock signal PLLIN is compared with such a reference clock signal CZ as seen from FIG. 39(c) by the clock comparison section 271 to produce such an adjustment voltage Vc as seen in FIG. 39(d). In response to the adjustment voltage Vc, such a clock signal PLLOUT of a frequency equal to a desired number of times the frequency of the input clock signal PLLIN as seen in FIG. 39(b) is outputted from the voltage controlled oscillator 272.

b-3-2. Reception Buffer Section

Figure 40:
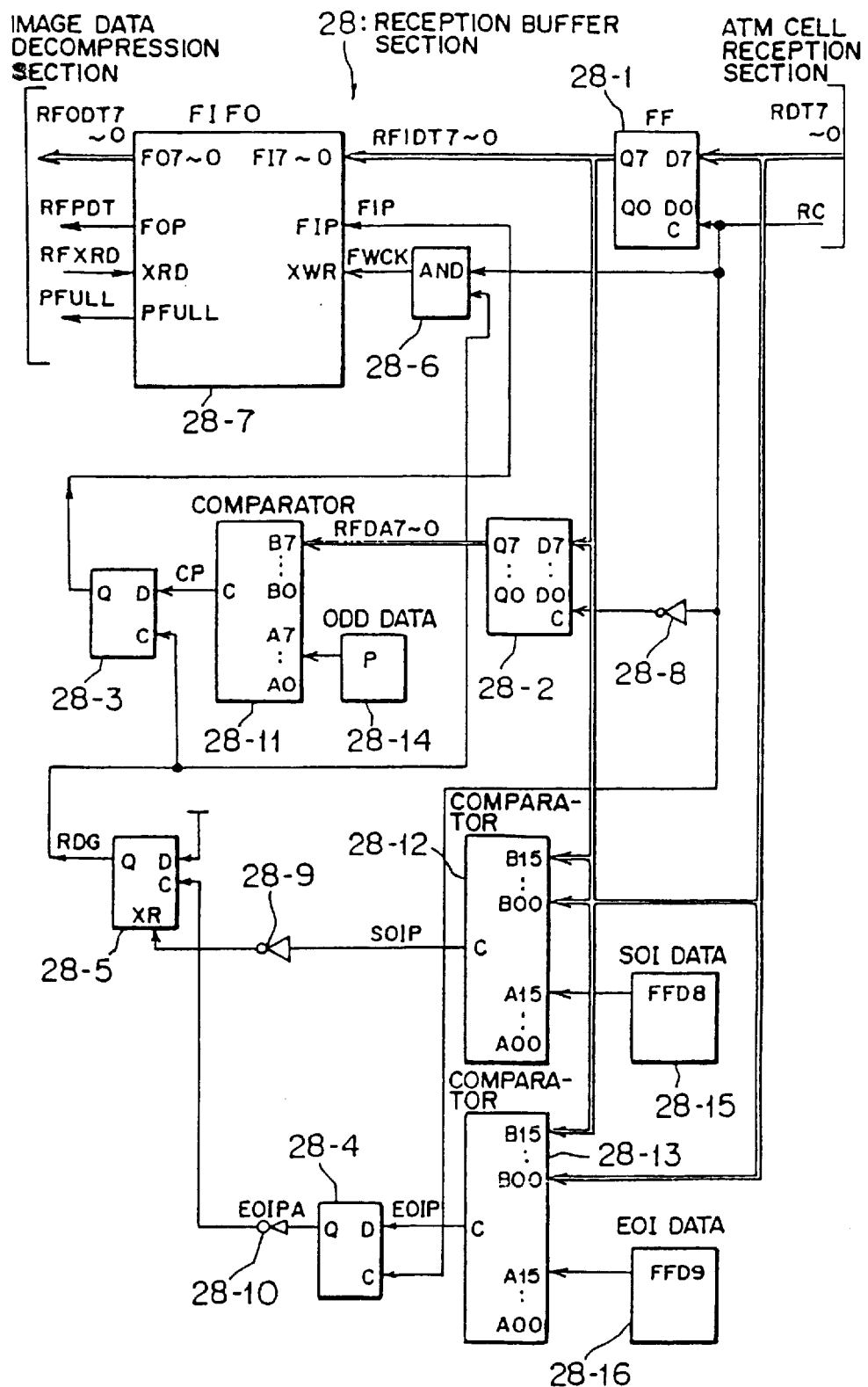
FIG. 40 is a block diagram showing a detailed construction of a reception buffer section in the ATM image communication system of FIG. 2.

FIG. 40 shows in block diagram a detailed construction of the reception buffer section 28 described hereinabove with reference to FIG. 2. Referring to FIG. 40, the reception buffer section 28 shown includes flip-flop circuits 28-1 to 28-5, an AND gate 28-6, a reception FIFO memory 28-7, inversion gates 28-8 to 28-10, comparators 28-11 to 28-13, and memories 28-14 to 28-16.

The flip-flop circuit 28-1 delays the phase of the reception data RDT7 to RDT0 (refer to FIG. 41(a)) from the ATM cell reception section 27 by one clock interval with the reception user clock signal RC (refer to FIG. 41(b)) from the ATM cell reception section 27 to obtain reception data RFIDT7 to RFIDT0 (refer to FIG. 41(c)). The flip-flop circuit 28-2 delays the phase of the reception data RFIDT7 to RFIDT0 further by one clock interval with the reception user clock signal RC inverted by the inversion gate 28-8.

The comparator 28-11 compares the reception data RFIDT7 to RFIDT0 from the flip-flop circuit 28-2 with odd-numbered field data (field identification information) stored in the memory 28-14 and outputs, when the result of comparison reveals coincidence between them, a clock pulse signal CP (refer to FIG. 41(j)) (that is, changes over its output to the H level). The flip-flop circuit 28-3 samples the clock pulse signal CP with a rising edge pulse of a reception data gate signal RDG from the flip-flop circuit 28-5 to produce a field identification signal FIP (refer to FIG. 41(k)) indicating distinction between odd- and even-numbers of the field.

Figure 41:
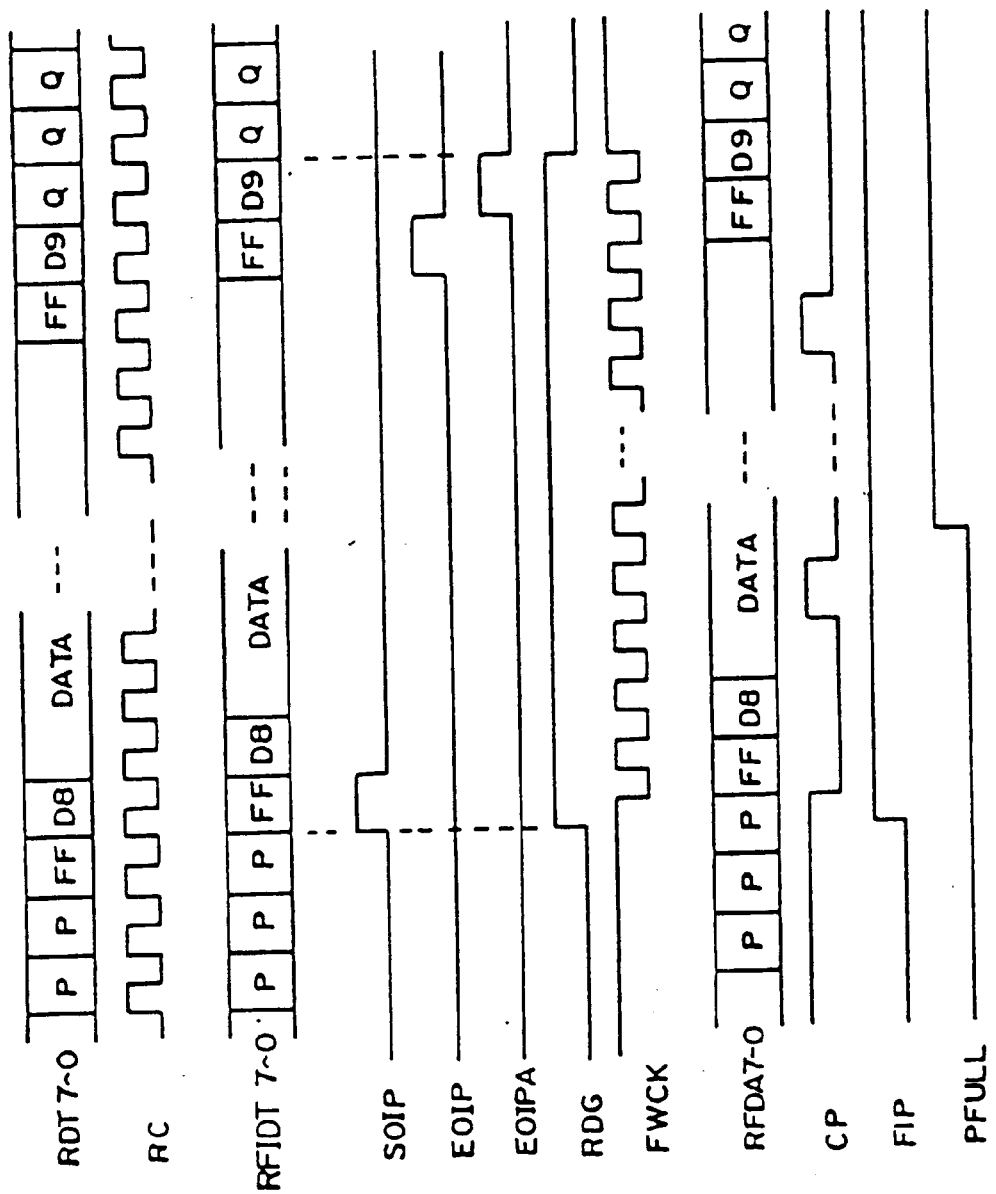
FIGS. 41(a) to 41(l) are timing charts illustrating an example of operation of the reception buffer section of FIG. 40.

The comparator (start point code detection section) 28-12 detects whether or not SOI data "FFD8" held in the memory 28-15 is included in the reception data RDT7 to RDT0 from the ATM cell reception section 27 and the reception data RFIDT7 to RFIDT0 (refer to FIG. 41(*b*)) obtained by delaying such reception data RDT7 to RDT0 by one clock interval of the reception clock signal RC. If the SOI code is detected, then an SOI detection signal SOIP (refer to FIG. 41(*d*)) is outputted from the comparator 28-12.

The comparator (end point code detection section) 28-13 similarly detects whether or not EOI data "FFD9" held in the memory 28-16 is included in the reception data RDT7 to RDT0 and the reception data RFIDT7 to RFIDT0. If the EOI code is detected, then an EOI detection signal EOIP (refer to FIG. 41(*e*)) is outputted from the comparator 28-13.

It is to be noted that, in the present embodiment, the field identification signal FIP represents an odd-numbered field when it has the H level, but represents an even-numbered field when it has the L level.

The inversion gate 28-9 inverts the SOI detection signal from the comparator 28-12. The flip-flop circuit 28-4 delays the phase of the EOI detection signal from the comparator 28-13 by one clock interval of the reception user clock signal RC from the ATM cell reception section 27 to obtain a clock signal EOIPA (refer to FIG. 41(*f*)) and outputs the clock signal EOIPA. The inversion gate 28-10 inverts the clock signal EOIPA.

The flip-flop circuit 28-5 produces a reception data gate signal RDG (refer to FIG. 41(*g*)) based on the SOI detection signal inverted by the inversion gate 28-9 and the EOI detection signal inverted by the inversion gate 28-10.

In the reception buffer section 28 having the construction described hereinabove with reference to FIG. 40, before received data from the ATM cell reception section 27 is written into the reception FIFO memory 28-7, discrimination of the SOI code and the EOI code of the received data is performed by the comparators 28-12 and 28-13, respectively. Consequently, only the data beginning with the SOI code and ending with the EOI code can be written into the reception FIFO memory 28-7.

In short, the reception buffer section 28 includes the reception FIFO memory 28-7 for temporarily storing ATM data from the ATM cell reception section 27, the memory (start point code detection section) 28-15 for detecting the SOI code (start point code) indicating the beginning of an effective data part of the received data (CBR data) in which actual image data are included, and the memory (end point code detection section) 28-16 for detecting the EOI code (end point code) indicating the end of the effective data part, and is constructed such that, before the CBR data are written into the reception FIFO memory 28-7, discrimination of the SOI code detected by the memory 28-15 and the EOI code detected by the memory 28-16 is performed so that only the effective data part beginning with the SOI code and ending with the EOI code is written into the reception FIFO memory 28-7.

Accordingly, unnecessary data can be selectively abandoned. Consequently, the capacity of the reception FIFO memory 28-7 can be minimized, and reading out of useless data can be prevented upon image decompression processing for a next field. Besides, an otherwise possible time lag after starting of image decompression until starting of actual decompression processing can be eliminated.

More particularly, for example, if such reception data RDT7 to RDT0 as seen in FIG. 41(*a*) and such a reception clock signal RC as seen in FIG. 41(*b*) are inputted from the ATM cell reception section 27 to the flip-flop circuit 28-1, then the flip-flop circuit 28-1 produces reception FIFO input data RFIDT7 to RFIDT0 displaced one phase from the reception data RDT7 to RDT0.

Then, the reception FIFO input data RFIDT7 to RFIDT0 and the reception data RDT7 to RDT0 are inputted to the comparator 28-12 and the comparator 28-13, by which they are compared with the SOI data "FFD8" from the memory 28-15 and the EOI data "FFD9" from the memory 28-16, respectively. Consequently, such an SOI detection signal SOIP representing detection of the SOI code as seen in FIG. 41(*d*) and such an EOI detection signal EOIP representing detection of the EOI code as seen in FIG. 41(*e*) are produced by the comparators 28-12 and 28-13, respectively.

The EOI detection signal EOIP is displaced one phase by the flip-flop circuit 28-4 to form such a clock signal EOIPA as seen in FIG. 41(*f*), and the clock signal EOIPA is inverted by the inversion gate 28-10 and then inputted to the flip-flop circuit 28-5. Meanwhile, the SOI detection signal SOIP is inverted by the inversion gate 28-9 and inputted to a reset terminal XR of the flip-flop circuit 28-5.

Consequently, the flip-flop circuit 28-5 produces such a reception data gate signal RDG which exhibits the H level within a period from the SOI code to the EOI code as seen in FIG. 41(*g*). The reception data gate signal RDG is inputted to the AND gate 28-6 together with the reception clock signal RC so that such a FIFO write clock signal FWCK as seen in FIG. 41(*h*) is produced by the AND gate 28-6. Then, in response to the FIFO write clock signal FWCK, the reception FIFO input data RFIDT7 to RFIDT0 are written into the reception FIFO memory 28-7. Consequently, only the data beginning with the SOI code and ending with the EOI code are written into the reception FIFO memory 28-7.

Further, in this instance, the reception buffer section 28 identifies the code (fixed value) P or Q for distinction between an even-numbered field and an odd-numbered field received between each two successive fields of the image data, and notifies the identified code P or Q to the image data decompression section 29.

In short, the reception buffer section 28 is constructed such that it receives the fixed value P or Q, which depends upon a field identification number allocated to each field, to identify the identification number of the field which makes an object of image decompression processing by the image data decompression section 29 and notifies a result of the identification to the image data decompression section 29. Consequently, the image data decompression section 29 can identify distinction between odd- and even-numbers of each field with certainty.

In particular, in this instance, the reception FIFO input data RFIDT7 to RFIDT0 are sampled with a clock signal obtained by inverting the reception clock signal RC by the inversion gate 28-8 and having the opposite phase by the flip-flop circuit 28-2 so that data RFDA7 to RFDA0 having a phase displaced by one half phase are produced, and the data RFDA7 to RFDA0 is compared with the data P representing an odd-numbered field by the comparator 28-11. Here, the value of the data P is "$FF_H$", and the value of the data Q is "$FE_H$".

When the result of comparison of the comparator 28-11 reveals coincidence, such a clock pulse signal CP as seen in FIG. 41(*j*) is outputted from the comparator 28-11. Then, the clock pulse signal CP is sampled with a rising edge of the reception data gate signal RDG by the flip-flop circuit 28-3 so that a field identification signal FIP indicating distinction between odd and even numbers of the field as seen in FIG. 41(*k*). The field identification signal FIP is outputted to the image data decompression section 29. It is to be noted that, in the present embodiment, the field identification signal FIP represents an odd-numbered field when it has the H level but represents an even-numbered field when it has the L level.

Further, in the present embodiment, in order to odd-/even-numbered field information to the image data decompression section 29, one bit is added to image data of 8 bits while the reception FIFO memory 28-7 has a 9-bit configuration such that, upon reading out from the reception FIFO memory 28-7, odd-/even-numbered field information may be read out. To this end, the field identification signal FIP is written into the reception FIFO memory 28-7 together with image data.

In particular, the reception buffer section 28 includes the reception FIFO memory 28-7 capable of storing received data (CBR data) from the ATM cell reception section 27 and field identification information representing distinction between odd and even numbers of a field, and is constructed such that, upon reading out of image data from the reception FIFO memory 28-7, the field identification information is read out and notified to the image data decompression section 29. Consequently, distinction between odd and even numbers of a field can be notified very readily to the image data decompression section 29.

Further, such a partial, FULL signal PFULL outputted from the reception FIFO memory 28-7 as seen in FIG. 41(1) exhibits the H level when the capacity of the reception FIFO memory 28-7 becomes a partially FULL (for example, FULL by one fourth) state, and the partial FULL signal PFULL is inputted to the image data decompression section 29. Consequently, the image data decompression section 29 starts image decompression processing at a point of time when the partial FULL signal PFULL is changed over to the H level.

In short, since the image data decompression section 29 is requested to start image decompression processing when the remaining capacity of the reception FIFO memory 28-7 becomes lower than a predetermined level, a processing rate difference between reception processing of ATM cells by the ATM cell reception section 27 and decompression processing by the image data decompression section 29 can be absorbed.

Further, when the capacity of the reception FIFO memory 28-7 becomes lower than the predetermined level (for example, lower than ¼) during reading out of data, the image data decompression section 29 is put into a waiting state to suppress its image decompression processing and reading out of the reception FIFO memory 28-7 is stopped.

In particular, when the remaining capacity of the reception FIFO memory 28-7 becomes higher than a predetermined level during reading out of CBR data from the reception FIFO memory 28-7, the image data decompression section 29 is requested to wait its image decompression processing and reading out of the CBR data from the reception FIFO memory 28-7 is stopped. Consequently, it can be prevented that the reception FIFO memory 28-7 becomes empty and the picture quality after regeneration is deteriorated.

It is to be noted that also reception FIFO output data RFODT7 to RFODT0, reception FIFO parity data RFPDT and a reception FIFO read signal XRFRD are communicated from and to the image data decompression section 29.

b-3-3. Image Data Compression Section

Figure 42:
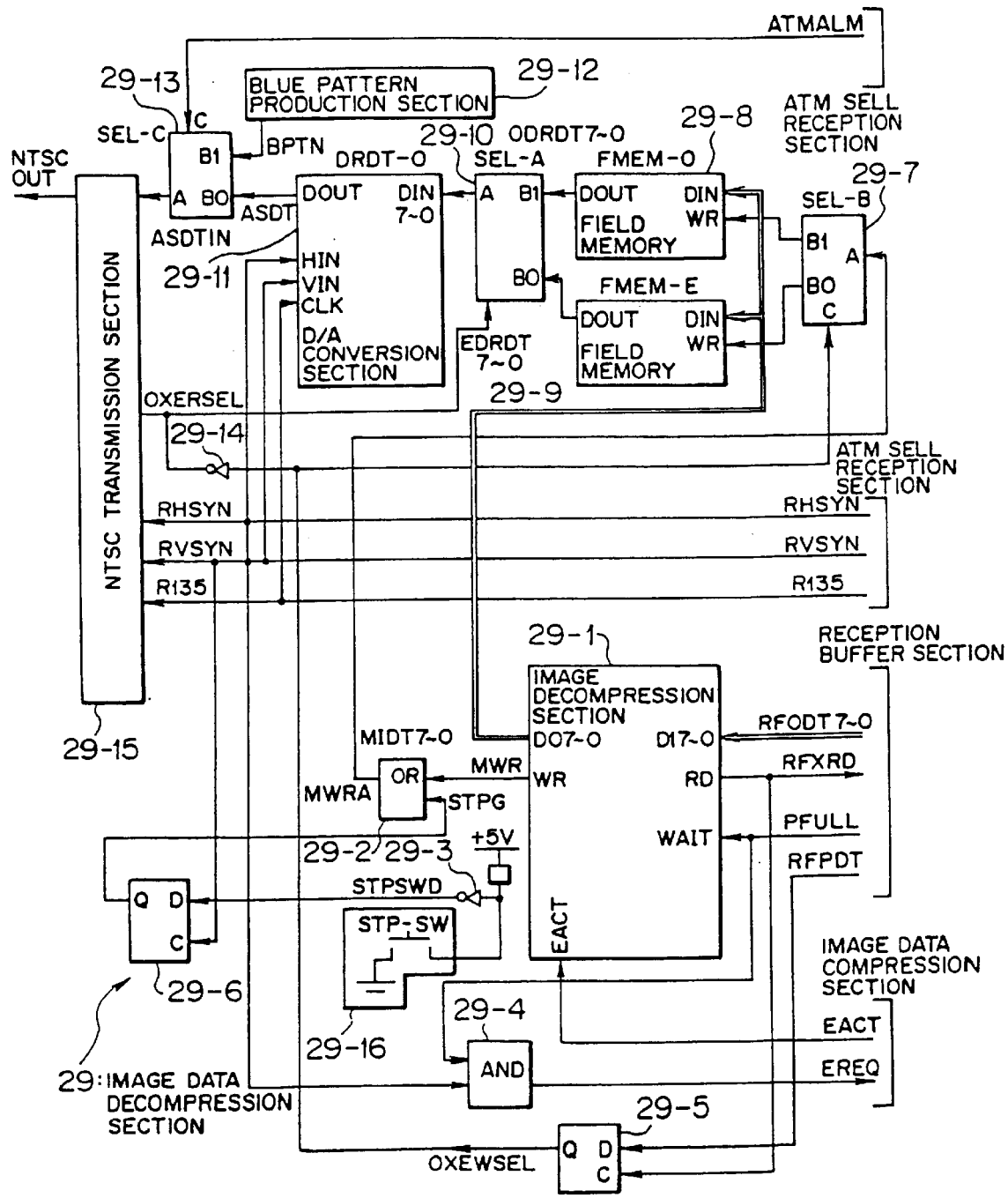
FIG. 42 is a block diagram showing a detailed construction of an image data decompression section in the ATM image communication system of FIG. 2.

FIG. 42 shows in block diagram a detailed construction of the image data decompression section 29 described hereinabove with reference to FIG. 2. Referring to FIG. 42, the image data decompression section 29 includes an image decompression section 29-1, an OR gate 29-2, inversion gates 29-3 and 29-14, an AND gate 29-4, flip-flop circuits 29-5 and 29-6, a selector (SEL-B) 29-7, field memories (FMEM-O and FMEM-E) 29-8 and 29-9, another selector (SEL-A) 29-10, a digital to analog conversion section (D/A) 29-11, a blue pattern production section 29-12, a further selector (SEL-C) 29-13, an NTSC transmission section 29-15 and a still picture switch (STP-SW) 29-16.

It is to be noted that abbreviated words in alphabet appearing in FIG. 43 denote as follows:

OXEWSEL: odd-/even-numbered field write select signal
OXERSEL: odd-/even-numbered field read-out select signal
NTSCOUT: NTSC output signal
ASDT: analog transmission data
BPTN: blue pattern signal
ASDTIN: analog transmission data input signal
RHSYN: reception horizontal synchronizing signal
RVSYN: reception vertical synchronizing signal
R135: reception basic sampling clock signal
DRDT7 to DRDT0: digital reception data
MIDT7 to MIDT0: memory input data
MWR: memory read signal
NTSCALM: NTSC alarm signal
RFODT7 to RFODT0: reception FIFO output data
RFXRD: reception FIFO read signal
EREQ: decompression request signal
EACT: decompression start signal
STPSWD: still picture switch data
STPG: still picture gate signal In the image data decompression section 29 having the construction described above, such a partial FULL signal PFULL from the reception buffer section 28 as seen in FIG. 43(b) and such a reception vertical synchronizing signal RVSYN from the ATM cell reception section 27 as seen in FIG. 43(a) are inputted to the AND gate 29-4. Then, if the partial FULL signal PFULL is changed over to the H level, then such a decompression request signal EREQ as seen in FIG. 43(c) is outputted from the AND gate 29-4 and notified to the CPU 248 (refer to FIG. 3).

Figure 45:
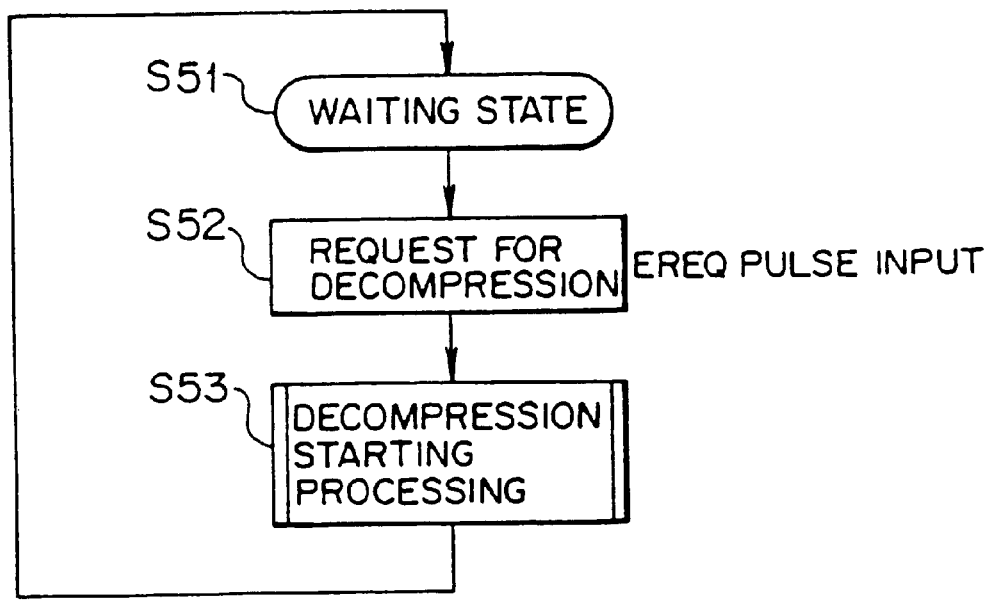
FIG. 45 is a flow chart illustrating an example of operation of an image decompression section of the image data decompression section of FIG. 42.
Figure 46:
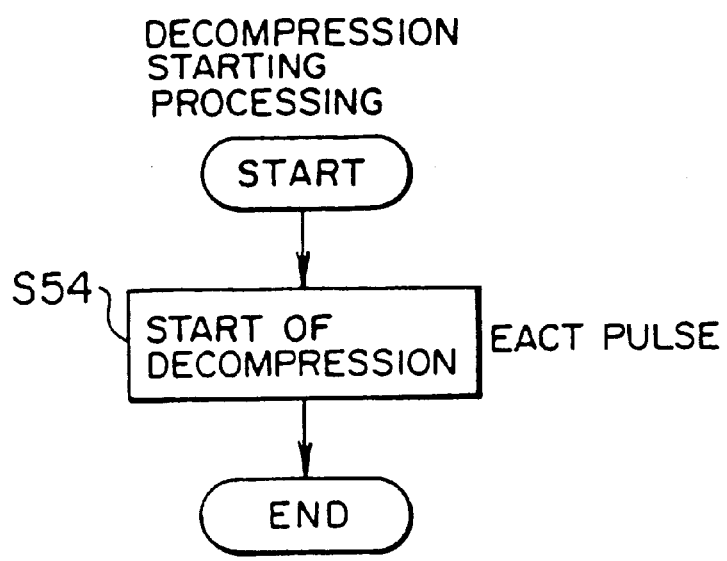
FIG. 46 is a flow chart illustrating another example of operation of the image decompression section of the image data decompression section of FIG. 42.

In response to the decompression request signal EREQ received, the CPU 248 inputs such a decompression start signal EACT as seen in in FIG. 43(d) to the image decompression section 29-1 in order to start decompression of the image decompression section 29-1. Consequently, the image decompression section 29-1 starts image decompression processing as seen from FIG. 43(e) and outputs such a reception FIFO read signal RFXRD as seen in FIG. 43(f) to start reading out of the reception FIFO output data RFODT7 to RFODT0 from the reception buffer section 28 as seen from FIG. 43(g). FIGS. 45 and 46 are flow charts (steps S51 to S53 and S54, respectively) illustrating such operation of the image decompression section 29-1 as described above.

In the meantime, the partial FULL signal PFULL is inputted to a wait input terminal WAIT of the image decompression section 29-1, and when the level of the partial FULL signal PFULL is changed over to the L level midway, the decompression processing of the image decompression section 29-1 is put into a temporary waiting state. Thereafter, when the partial FULL signal PFULL is changed over to the H level, decompression processing of the image decompression section 29-1 is re-started.

Further, from the reception FIFO memory 28-7 of the reception buffer section 28, such a reception FIFO parity data signal RFPDT indicating distinction between odd and even numbers of the field as seen in FIG. 43(h) is read out. Then, the reception FIFO parity data signal RFPDT is adjusted in timing with the reception FIFO read signal RFXRD to produce an odd-/even-numbered field write select signal OXEWSEL.

Further, the odd-/even-numbered field write select signal OXEWSEL is inputted to an control terminal A of the selector (SEL-B) 29-7 so that data are alternately written into the field memory (FMEM-O) 29-8 for an odd-numbered field and the field memory (FMEM-E) 29-9 for an even-numbered field.

Figure 43:
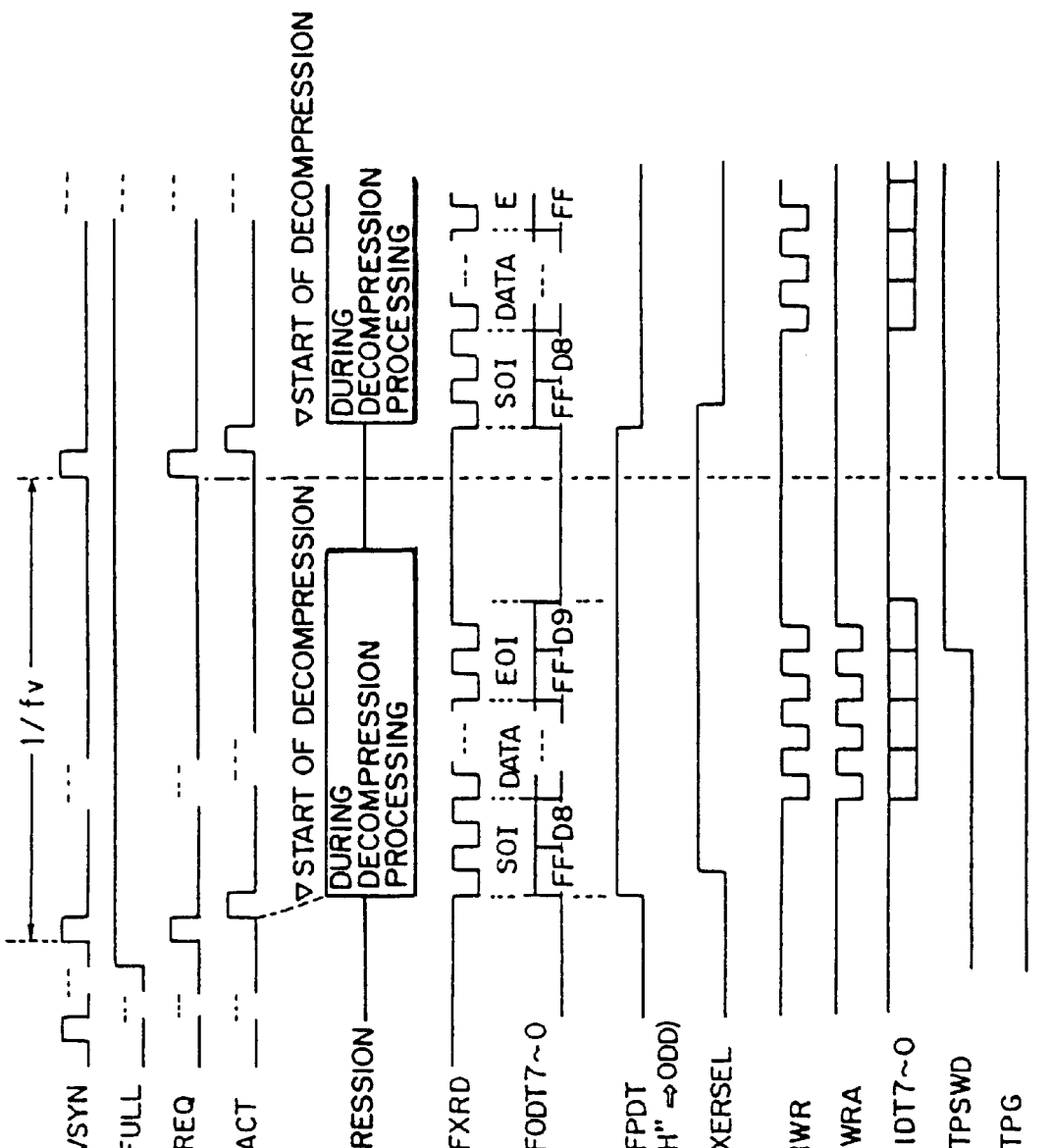
FIGS. 43(a) to 43(n) are timing charts illustrating an example of operation of the image data decompression section of FIG. 42.

On the other hand, in this instance, the odd-/even-numbered field write select signal OXEWSEL is inverted by the inversion gate 29-14 to produce such an odd-/even-numbered field read-out select signal OXERSEL as seen in FIG. 43(*i*). The odd-/even-numbered field read-out select signal OXERSEL is inputted to select signal terminals C of the NTSC transmission section 9-15 and the selector (SEL-B) 29-7.

Writing and reading out of the field memories 29-8 and 29-9 are performed in such a manner as described above.

Thereafter, the digital to analog conversion section 29-11 converts digital reception data DRDT7 to DRDT0 from the selector (SEL-A) 29-10 into analog transmission data ASDT based on the reception horizontal synchronizing signal RHSYN, the reception vertical synchronizing signal RVSYN and the reception basic sampling clock signal R135 supplied thereto from the ATM cell reception section 27.

Figure 44:
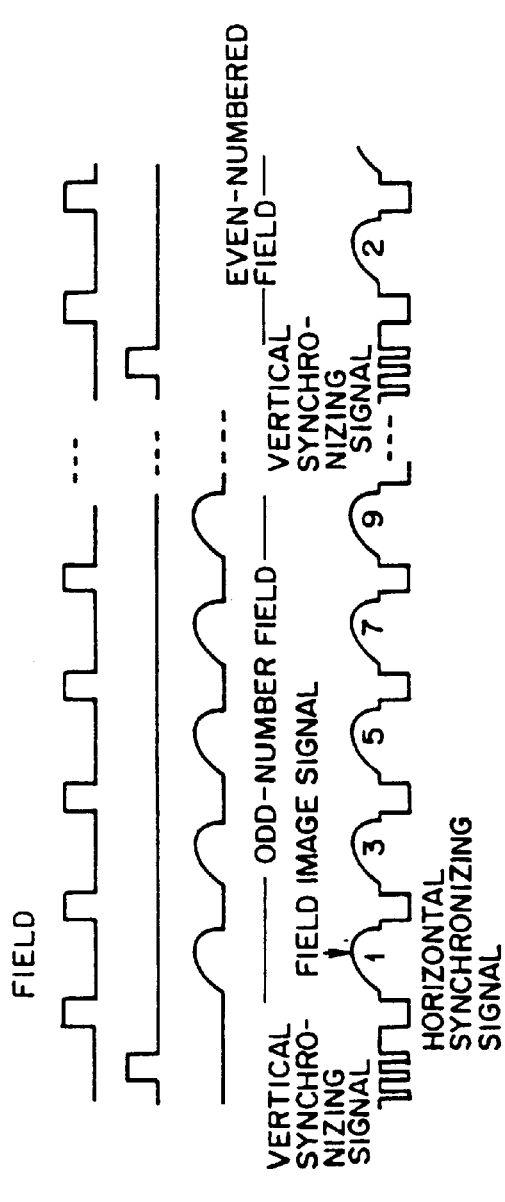
FIGS. 44(a) to 44(e) are timing charts illustrating an example of operation of an NTSC transmission section of the image data decompression section of FIG. 42.

The NTSC transmission section 29-15 produces, from the analog transmission data ASDT, reception horizontal synchronizing signal RHSYN, reception vertical synchronizing signal RVSYN, reception basic sampling clock signal R135 and odd-/even-numbered field read-out select signal OXERSEL, an analog signal NTSCOUT including a vertical synchronizing signal, a horizontal synchronizing signal and a field image signal. FIG. 44 illustrates in time chart an example of operation timings of the NTSC transmission section described above.

The blue pattern production section 29-12 outputs a fixed analog pattern for displaying a screen of blue. When the ATM alarm signal ATMALM from the ATM cell reception section 27 is changed over to the H level, then a blue pattern signal BPTN produced by the blue pattern production section 29-12 is selected by and outputted from the selector (SEL-C) 29-13.

Further, if the still picture switch (STP-SW) 29-16 is set to an ON state, then still picture switch data STPSWD changes its level to the H level as seen from FIG. 43(*m*), and a still picture gate signal STPG adjusted in timing with the vertical synchronizing signal is changed over to the H level in synchronism with the field timing. As a result, writing into the field memories 29-8 and 29-9 is stopped.

In this instance, since reading out processing of the field memory 29-8 or 29-9 is proceeding continuously, image data at the point of time when the still picture switch (STP-SW) 29-16 is set to an ON state are outputted as an analog signal NTSCOUT of a still picture.

In this manner, since the image data decompression section 29 described above starts JPEG image decompression processing for each field in response to the reception vertical synchronizing signal RVSYN included in the NTSC signal regenerated by the ATM cell reception section 27, received compression data can be regenerated in a synchronized timing relationship with image compression processing of the transmission side, and consequently, real time communication can be realized.

Further, since the image data decompression section 29 includes a plurality of field memories 29-8 and 29-9 corresponding to identification numbers of fields which make an object of image decompression and operates such that a field which makes an object of image decompression processing is discriminated from field identification information and the field is written into one of the field memories 29-8 and 29-9 in response to the field identification information while a different field is read out from one of the field memories 29-8 and 29-9 other than that with which writing is proceeding, field identification information can be processed simultaneously with decompression processing of received data (VBR data).

Further, in this instance, since the image data decompression section 29 begins JPEG image decompression processing for each field with a field inputted first, image decompression processing can be started automatically from a field with which the image compression processing has begun without the necessity for special processing.

Furthermore, since the image data decompression section 29 can put original moving picture data to be regenerated into a state of a still picture by stopping only writing of moving picture data after regeneration into the field memories 29-8 and 29-9 by writing operation of the still picture switch 29-16 into the field memories 29-8 and 29-9, a still picture can be provided at an arbitrary timing on the reception side with a very simple construction.

In this manner, with the ATM image communication apparatus 21 (transmission section 22 and reception section 23) in the present embodiment, by compressing moving picture data into data having a fixed transmission rate using a compression method (JPEG system) for a still picture and converting the data into ATM cells, image processing such as compression and/or decompression for the moving picture data can be performed at a high rate while keeping a high compression ratio and a high picture quality and the ATM image communication apparatus 21 can be realized in a small size at a reduced cost.

It is to be noted that, while, in the present embodiment, the ATM image communication apparatus 21 includes both of the transmission section 22 and the reception section 23, for example, only the transmission section 22 may be provided to construct an apparatus for exclusive use for transmission, or only the transmission section 22 may be provided to construct an apparatus for exclusive use for reception.

The present invention is not limited to the specifically described embodiment, and variations and modifications may be made without departing from the scope of the present invention.

What is claimed is:

1. A transmission apparatus for fixed length cell handling type image communication wherein image data are transmitted as fixed length cells each including a header part and a data part, comprising:

an image data compression section for compressing moving picture data, which define information of a plurality of screens individually divided into a plurality of fields to be transmitted per unit time, for every field serving as a transmission unit using an intra-field compression method for still picture compression to convert the moving picture data into variable length data, which in each field is independent of that in each other field;

a transmission buffer section for dividing each piece of the variable length data, which is obtained by said image data compression section, into a plurality of pieces of fixed length data;

a fixed length cell transmission section for generating fixed length cells each having a respective piece of said fixed length data as the data part, for transmission to a network and for sending the fixed length cells and residual information, between transmission rate information based on a basic sampling clock representative of a compression of the each field and network clock information of the network, using header parts of predetermined fixed length cells to the network to perform transmission to the network of the moving picture data; wherein each time the still picture compression processing for any field is performed, said image data compression section adjusts a compression ratio for the still picture compression processing so that a compressed image data amount per each unit field of the variable length data obtained is within a predetermined range.

2. A transmission apparatus for fixed length cell handling type image communication as claimed in claim 1, wherein said image data compression section starts the still picture compression processing for each of the fields in response to the corresponding field timing information.

3. A transmission apparatus for fixed length cell handling type image communication as claimed in claim 2, wherein said image data compression section starts the still picture compression processing for each of the fields in response to a vertical synchronizing signal as the field timing signal included in the moving picture data of an NTSC color television system.

4. A transmission apparatus for fixed length cell handling type image communication as claimed in claim 2, wherein said image data compression section starts the still picture compression processing for each of the fields from a selected one of the fields.

5. A transmission apparatus for fixed length cell handling type image communication as claimed in claim 4, wherein said image data compression section starts the still picture compression processing for each of the fields from a field inputted first as the selected field.

6. A transmission apparatus for fixed length cell handling type image communication as claimed in claim 1, wherein said image data compression section includes a threshold value setting section for setting a threshold value for the compressed image data amount per each unit field after the still picture compression processing obtained as the variable length data, and a scaling factor calculation processing section for comparing the compressed image data amount obtained by the still picture compression processing with the threshold value set by said threshold value setting section and performing calculation processing of a scaling factor value for adjustment of the compression ratio after the still picture compression processing based on a result of the comparison to update the scaling factor value for use for the still picture compression processing for a next field.

7. A transmission apparatus for fixed length cell handling type image communication as claimed in claim 6, wherein said threshold value setting section sets N different values $SF_i$ for the scaling factor value to be used as the threshold value, where N is a natural number and i=1, 2, . . . , N and then $SF_1 > SF_2 > \ldots > SF_N$, and an upper limit value and a lower limit value for the compressed image data amount in advance, and said scaling factor calculation processing section decrements, when the compressed image data amount exceeds the lower limit value, the parameter i by 1 to increase the scaling factor value by one step, but increments, when the compressed image data amount is lower than the lower limit value, the parameter i by 1 to decrease the scaling factor value by one step.

8. A transmission apparatus for fixed length cell handling type image communication as claimed in claim 6, wherein said threshold value setting section sets in advance an upper limit value, an aimed value and a lower limit value for the compressed image data amount to be used as the threshold value, and said scaling factor calculation processing section calculates the scaling factor value such that, when the compressed image data amount is lower than the aimed value, the scaling factor value is decreased by a first amount which is a positive real number, but when the compressed image data amount is equal to or higher than the aimed value, the scaling factor value is increased by a second amount which is a positive real number whereas, when the compressed image data amount is lower than the lower limit value, the scaling factor value is decreased by a third amount which is a positive real number larger than the first amount, but when the compressed image data amount is higher than the upper limit value, the scaling factor value is increased by a fourth amount which is a positive real number larger than the second amount.

9. A transmission apparatus for fixed length cell handling type image communication as claimed in claim 8, wherein the fourth amount is a value obtained by calculation of a function which increases in proportion to the compressed image data amount.

10. A transmission apparatus for fixed length cell handling type image communication as claimed in claim 8, wherein said threshold value setting section sets in advance an aimed lower limit value and an aimed upper limit value for the aimed value, and said scaling factor calculation processing section is constructed such that, when the compressed image data amount is lower than the aimed lower limit value, the scaling factor value is decreased by the first amount, but when the compressed image data amount is higher than the aimed upper limit value, the scaling factor value is increased by the second amount, whereas, when the compressed image data amount is between the aimed lower limit value and the aimed upper limit value both inclusive, the scaling factor value is not updated.

11. A transmission apparatus for fixed length cell handling type image communication as claimed in claim 8, wherein said scaling factor calculation processing section adds, when the compressed image data amount is higher than the upper limit value, an amount of an nth-order function of the compressed image data amount to the scaling factor value, n being a natural number, but subtracts, when the compressed image data amount is lower than the lower limit value, the nth-order function amount of the compressed image data amount from the scaling factor value.

12. A transmission apparatus for fixed length cell handling type image communication as claimed in claim 6, wherein said threshold value setting section sets in advance a maximum compressed image data amount to be used as the threshold value, and said scaling factor calculation processing section performs, when the compressed image data amount exceeds the maximum compressed image data amount, processing to transmit only those compressed data of an amount equal to or less than the maximum compressed image data amount and notifies the reception side of the compressed data that the compressed image data amount has exceeded the maximum compressed image data amount.

13. A transmission apparatus for fixed length cell handling type image communication as claimed in claim 1, wherein said image data compression section produces, when an out-of-synchronism state of the field timing information is detected, an alarm signal representing the detection and notifies the alarm signal to said fixed length cell transmission section so as to stop transmission of the fixed length cells by said fixed length cell transmission section.

14. A transmission apparatus for fixed length cell handling type image communication as claimed in claim 13, wherein said image data compression section produces, when an out-of-synchronism state of one of a horizontal synchronizing signal and a vertical synchronizing signal as the field timing information included in the moving picture data of an NTSC color television system is detected, an alarm signal representing the detection and notifies the alarm signal to said fixed length cell transmission section so as to stop transmission of the fixed length cells by said fixed length cell transmission section.

15. A transmission apparatus for fixed length cell handling type image communication as claimed in claim 1, wherein said transmission buffer section inserts an amount of an idle pattern as empty information subsequently to each effective data part of the variable length data obtained by said image data compression section to convert the variable length data obtained for each field into the fixed length data having the fixed transmission rate.

16. A transmission apparatus for fixed length cell handling type image communication as claimed in claim 15, wherein said transmission buffer section changes the data amounts of the variable length data for the individual fields into given data amounts and converts the variable length data into the fixed length data having the fixed transmission rate so that each of the data amounts may have a predetermined ratio with respect to the data amount of the variable length data for all of the fields.

17. A transmission apparatus for fixed length cell handling type image communication as claimed in claim 15, wherein said transmission buffer section includes a plurality of transmission FIFO memories, a writing selection section for changing over an output thereof in response to an end signal of the still picture compression processing from said image data compression section to selectively write the variable length data for each field inputted thereto as compressed data from said image data compression section into one of said transmission FIFO memories, and a reading selection section for changing over an output thereof in response to the end signal to read out the variable length data from one of said transmission FIFO memories other than that transmission FIFO memory with which writing of the variable data is proceeding and to insert the idle pattern into the read out variable length data.

18. A transmission apparatus for fixed length cell handling type image communication as claimed in claim 17, wherein said transmission buffer section inserts, when the transmission FIFO memory with which reading out of the variable length data for each field is proceeding is empty, fixed data as the idle pattern.

19. A transmission apparatus for fixed length cell handling type image communication as claimed in claim 18, wherein said transmission buffer section inserts, as the fixed data, a fixed value which is different depending upon the field identification information allocated to each field.

20. A transmission apparatus for fixed length cell handling type image communication as claimed in claim 1, wherein said fixed length cell transmission section changes a transmission rate of the fixed length data from said transmission buffer section to a transmission rate based on a frequency of a basic sampling clock signal used for the still picture compression processing by said image data compression section to transmit the fixed length data in the fixed length cells.

21. A transmission apparatus for fixed length cell handling type image communication as claimed in claim 20, wherein said fixed length cell transmission section changes the transmission rate of the fixed length data to a number of times the frequency of the basis sampling clock signal.

22. A transmission apparatus for fixed length cell handling type image communication as claimed in claim 21, wherein the frequency of the basic sampling clock signal is 13.5 MHz, and said fixed length cell transmission section multiplies the frequency of the basic sampling clock signal to 3/2 times to change the transmission rate of the fixed length data to 20.25 MHz.

23. A transmission apparatus for fixed length cell handling type image communication as claimed in claim 21, wherein said fixed length cell transmission section includes a dividing circuit for dividing the frequency of the basic sampling clock signal to 1/M, M being a positive real number, an oscillator for oscillating a clock frequency equal to N/M×K times the frequency of the basic sampling clock signal, N and K being natural numbers, and a frequency N multiplication circuit for multiplying the frequency of the basic sampling clock signal divided to 1/M by said dividing circuit by N based on an output of said oscillator.

24. A transmission apparatus for fixed length cell handling type image communication as claimed in claim 23, wherein said frequency N multiplication circuit includes a counter for dividing an input clock signal thereto to 1/8K, and a differentiation pulse obtained by detecting a rising edge of the basic sampling clock signal divided in frequency by said dividing circuit using a clock signal of the clock frequency of said oscillator is inputted to a reset input terminal of said counter.

25. A transmission apparatus for fixed length cell handling type image communication as claimed in claim 20, wherein said fixed length cell transmission section transmits transmission rate information of the transmission rate based on the frequency of the basic sampling clock signal in the fixed length cells together with the fixed length data.

26. A transmission apparatus for fixed length cell handling type image communication as claimed in claim 25, wherein said fixed length cell transmission section transmits the transmission rate information in accordance with an SRTS method.

27. A fixed length cell handling type image communication method wherein image data are communicated in fixed length cells each including a header part and a data part, comprising the steps of:

receiving, from a network, fixed length cells each including fixed length data obtained by dividing each piece of variable length data representing moving picture data in transmission end, which moving picture data defines information of a plurality of screens individually divided into a plurality of fields and compressed for every field serving as a transmission unit using an intra-field compression, and residual information, between transmission rate information based on a basic sampling clock representative of a compression of the each field and network clock information of the network, for transmission using header parts of particular fixed length cells;

regenerating the individual fixed length data by removing the header part of the received individual cells and the basic sampling clock based on the network clock information and the received residual information;

converting, based on the regenerated basic sampling clock, the plural pieces of regenerated fixed length data-into variable length data in each field is independent of that in each other field;

decompressing the variable length data based on the regenerated basic sampling clock, using an intra-field decompression method for still picture decompression, to regenerate the original moving picture data; wherein each time the still picture compression processing for any field is performed in the transmission end, a compression ratio for the still picture compression processing is adjusted so that a compressed image data amount per each unit field of the variable length data obtained is within a predetermined range.

28. A fixed length cell handling type image communication method as claimed in claim 27, wherein the intra-field decompression method is a JPEG system.

29. A fixed length cell handling type image communication method as claimed in claim 27, wherein the fixed length data and the field timing information are placed in the data parts of the fixed length cells.

30. A fixed length cell handling type image communication method as claimed in claim 27, wherein the fixed length cells are received making use of an adaptation layer 1 for transfer of the fixed length data.

31. A reception apparatus for fixed length cell handling type image communication wherein image data are transmitted as fixed length cells each including a header part and a data part, comprising:

a fixed length cell reception section for receiving fixed length cells from a network each including fixed length data obtained by dividing each piece of variable length data representing moving picture data in transmission end, which moving picture data define information of a plurality of screens individually divided into a plurality of screens individually divided into a plurality of fields and compressed for every field serving as a transmission unit using an intra-field compression method for still picture compression, and residual information, between transmission rate information based on a basic sampling clock representative of a compression of the each field and network clock information of the network, for transmission using header parts of particular fixed length cells and regenerating the individual fixed length data by removing the header part of the received individual cells and the basic sampling clock based on the network clock information and the received residual information;

a reception buffer section for converting, on the basis of sampling clock regenerated by said fixed length cell reception section, the plural pieces of regenerated fixed length data into variable length data which in each field is independent of that in each other field;

an image data decompression section for decompressing the variable length data from said reception buffer section based on the regenerated basic sampling clock, using an intra-field decompression method for still picture decompression to regenerate the original moving picture data; wherein each time the still picture compression processing for any field is performed in the transmission end, a compression ratio for the still picture compression processing is adjusted so that a compressed image data amount per each unit field of the variable length data obtained is within a predetermined range.

32. A reception apparatus for fixed length cell handling type image communication as claimed in claim 31, wherein said fixed length cell reception section produces an internal basic sampling clock signal to be used to regenerate, from received transmission rate information of the fixed length cells included in the data parts of the fixed length cells, the field timing information to be used for the still picture decompression processing by said image data decompression section.

33. A reception apparatus for fixed length cell handling type image communication as claimed in claim 32, wherein said fixed length cell reception section includes a transmission rate information production section for producing internal transmission rate information of the transmission rate originally in the inside thereof, a difference calculation section for calculating a difference between the internal transmission rate information produced in said transmission rate information production section and the received transmission rate information included in the data part of each of the received fixed length cells to obtain difference transmission rate information, and a basic sampling clock production section for producing an internal clock signal for controlling an output of said transmission rate information production section so that the difference transmission rate information obtained by said difference calculation section may be equal to 0 and producing the basic sampling clock signal to be used to regenerate the field timing information based on the internal clock signal.

34. A reception apparatus for fixed length cell handling type image communication as claimed in claim 33, wherein said basic sampling clock production section includes an internal clock production phase-locked loop section for producing the internal clock signal based on the difference transmission rate information obtained by said difference calculation section, a sampling clock production phase-locked loop section for producing a sampling clock signal based on the difference transmission rate information obtained by said difference calculation section, a reception user clock production phase-locked oscillation section for multiplying a frequency of the sampling clock signal from said sampling clock production phase-locked loop section by a first number to produce a reception user clock signal, and a frequency multiplication section for multiplying a frequency of the reception user clock signal produced by said reception user clock production phase-locked oscillation section by a second number to produce the basic sampling clock signal of a frequency.

35. A reception apparatus for fixed length cell handling type image communication as claimed in claim 33, wherein said basic sampling clock production section includes an internal clock production phase-locked loop section for producing the internal clock signal based on the difference transmission rate information obtained by said difference calculation section, a sampling clock production phase-locked loop section for producing a sampling clock signal based on the difference transmission rate information obtained by said difference calculation section, and a frequency multiplication section for multiplying a frequency of the sampling clock signal produced by said sampling clock production phase-locked loop section by a first number to produce the basic sampling clock signal of a frequency.

36. A reception apparatus for fixed length cell handling type image communication as claimed in claim 33, wherein said basic sampling clock production section includes an image data decompressing clock production section for producing, based on the regenerated basic sampling clock signal, an image data decompressing clock signal as the field timing information to be used for the still picture decompression processing by said image data decompression section.

37. A reception apparatus for fixed length cell handling type image communication as claimed in claim 36, wherein said image data decompressing clock production section includes a horizontal synchronizing signal regeneration section for regenerating, from the basic sampling clock signal, a horizontal synchronizing signal included in moving picture data of an NTSC color television system as the image data decompressing clock signal, and a vertical synchronizing signal regeneration section for regenerating, from the basic sampling clock signal, a vertical synchronizing signal included in the moving picture data of the NTSC color television system as the image data decompressing clock signal.

38. A reception apparatus for fixed length cell handling type image communication as claimed in claim 31, wherein said fixed length cell reception section includes a logical ORing section for logically ORing a signal representing a state in which reception of the fixed length cells is not proceeding and another signal representing an empty state of a buffer which temporarily stores the received fixed length cells and outputting a result of the logical ORing as an alarm signal, and is constructed so as to output, when the alarm signal is outputted from said logical ORing section, the alarm signal to said image data decompression section so that said image data decompression section regenerates image data of a pattern as original moving picture data.

39. A reception apparatus for fixed length cell handling type image communication as claimed in claim 31, wherein said reception buffer section includes a reception FIFO memory for temporarily storing the fixed length data from said fixed length cell reception section, and requests said image data decompression section to start the still picture decompression processing when a remaining capacity of said reception FIFO memory becomes lower than a fixed level.

40. A reception apparatus for fixed length cell handling type image communication as claimed in claim 31, wherein said reception buffer section includes a reception FIFO memory for temporarily storing the fixed length data from said fixed length cell reception section, and is constructed such that, when a remaining capacity of said reception FIFO memory becomes higher than a fixed level during reading out of the fixed length data from said reception FIFO memory, said reception buffer section requests said image data decompression section to stop the still picture decompression processing and then wait and stops the reading out of the fixed length data from said reception FIFO memory.

41. A reception apparatus for fixed length cell handling type image communication as claimed in claim 31, wherein said reception buffer section includes a reception FIFO memory for temporarily storing the fixed length data from said fixed length cell reception section, and an image data writing section for writing into said reception FIFO memory only data of an effective data part of the fixed length data which is to be subject to the still picture decompression processing by said image data decompression section.

42. A reception apparatus for fixed length cell handling type image communication as claimed in claim 41, wherein said image data writing section includes a start point detection section for detecting a start point code indicating a start point of the effective data part, and an end point code detection section for detecting an end point code indicating an end point of the effective data part, and is constructed such that, before the fixed length data are written into said reception FIFO memory, based on the start point code detected by said start point code detection and the end point code detected by said end code detection section, only the data of the effective data part beginning with the start point code and ending with the end point code are written into said reception FIFO memory.

43. A reception apparatus for fixed length cell handling type image communication as claimed in claim 31, wherein said reception buffer section receives a fixed value, which is different depending upon field identification information allocated to each field, to identify the field identification information of the field which makes an object of the still picture decompression processing by said image data decompression section and notifies a result of the identification to said image data decompression section.

44. A reception apparatus for fixed length cell handling type image communication as claimed in claim 31, wherein said reception buffer section includes a reception FIFO memory for storing the fixed length data from said fixed length cell reception section and field identification information of a field which makes an object of the still picture decompression processing by said image data decompression section, and is constructed such that, upon reading out of the fixed length data from said reception FIFO memory, the field identification information is read out and notified to said image data decompression section.

45. A reception apparatus for fixed length cell handling type image communication as claimed in claim 31, wherein said image data decompression section starts the still picture decompression processing for each field based on the field timing information.

46. A reception apparatus for fixed length cell handling type image communication as claimed in claim 45, wherein said image data decompression section starts the still picture decompression processing for each field based on a vertical synchronizing signal as the field timing information included in the moving picture data of a NTSC color television system regenerated by said fixed length cell reception section.

47. A reception apparatus for fixed length cell handling type image communication as claimed in claim 31, wherein said image data decompression section starts the still picture decompression processing for each field from a selected one of the fields.

48. A reception apparatus for fixed length cell handling type image communication as claimed in claim 47, wherein said image data decompression section starts the still picture decompression processing for each field from a field inputted first as the selected field.

49. A reception apparatus for fixed length cell handling type image communication as claimed in claim 31, wherein said image data decompression section includes a plurality of field memories for storing the variable length data for each field from said reception buffer section in accordance with field identification information allocated to each field, and is constructed such that said image data decompression section identifies, from the field identification information, a field which makes an object of the still picture decompression processing, writes the corresponding variable length data into one of said field memories corresponding to the field identification information, and reads out the variable length data from one of said field memories different from that field memory with which writing is proceeding.

50. A reception apparatus for fixed length cell handling type image communication as claimed in claim 49, wherein said image data decompression section includes a still picture switch for stopping writing of the variable data into said field memories, and is constructed such that, when an operation to stop writing of the variable length data into said field memories is performed by said still picture switch, only writing of the variable length data into any of said field memories is stopped so that original moving picture data regenerated last are displayed as a still picture.

51. A transmission apparatus for fixed length cell handling type image communication as claimed in claim 1, wherein, for the still picture compression processing, an intra-field compression method wherein image compression processing for the screen information in each field is performed independently for the individual fields is employed.

52. A reception apparatus for fixed length cell handling type image communication as claimed in claim 31, wherein, for the still picture compression processing, an intra-field decompression method wherein image decompression processing for the screen information in each field is performed independently for each field is employed.

53. A transmission apparatus for fixed length cell handling type image communication as claimed in claim 51, wherein the intra-field compression method is a JPEG system.

54. A reception apparatus for fixed length cell handling type image communication as claimed in claim 52, wherein the intra-field decompression method is a JEPG system.

55. A fixed length cell handling type image communication method wherein image data are communicated in fixed length cells each including a header part and a data part, comprising the steps of:

compressing moving picture data, which define information of a plurality of screens individually divided into a plurality of fields to be transmitted per unit time, for every field serving as a transmission unit using an intra-field compression method for still picture compression to convert the moving picture data into variable length data, which in each field is independent of that in each other field;

dividing each piece of the variable length data into a plurality of pieces of fixed length data;

generating fixed length cells, each having a respective piece of said fixed length data as the data part, for transmission to a network;

sending the plurality of said fixed length cells and residual information, between transmission rate information based on a basic sampling clock representative of a compression of the individual field and network clock information of the network, using header parts of particular fixed length cells to perform transmission to the network of the moving picture data; wherein each time the still picture compression processing for any field is performed, a compression ratio for the still picture compression processing is adjusted so that a compressed image data amount per each unit field of the variable length data obtained is within a predetermined range.

56. A fixed length cell handling type image communication method as claimed in claim 55, wherein the intra-field compression method is a JPEG system.

57. A fixed length cell handling type image communication method as claimed in claim 55, wherein the fixed length data and the field timing information are placed in the data parts of the fixed length cells to be transmitted.

58. A fixed length cell handling type image communication method as claimed in claim 55, wherein the fixed length cells are transmitted making use of an adaptation layer 1 for transfer of the fixed length data.

\* \* \* \* \*